US011212514B2

(12) United States Patent
Karafin et al.

(10) Patent No.: US 11,212,514 B2
(45) Date of Patent: Dec. 28, 2021

(54) LIGHT FIELD DISPLAY SYSTEM FOR CINEMAS

(71) Applicant: Light Field Lab, Inc., San Jose, CA (US)

(72) Inventors: Jonathan Sean Karafin, Morgan Hill, CA (US); Brendan Elwood Bevensee, San Jose, CA (US); John Dohm, Beverly Hills, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 16/362,993

(22) Filed: Mar. 25, 2019

(65) Prior Publication Data

US 2020/0314415 A1    Oct. 1, 2020

(51) Int. Cl.
*H04N 13/32*    (2018.01)
*H04N 13/363*    (2018.01)
(Continued)

(52) U.S. Cl.
CPC ........... *H04N 13/32* (2018.05); *G03H 1/0005* (2013.01); *G03H 1/2205* (2013.01); *G09G 3/003* (2013.01);
(Continued)

(58) Field of Classification Search
CPC .... H04N 13/32; H04N 13/363; H04N 13/161; G09G 3/003; G09G 2370/022; G03H 1/0005; G03H 1/2205; G03H 2210/30; G03H 2001/0088; G03H 2001/0061; G03H 2223/16
See application file for complete search history.

(56) References Cited

U.S. PATENT DOCUMENTS 5,187,360 A    2/1993    Pasco
5,374,976 A    12/1994    Spannenburg
(Continued)

FOREIGN PATENT DOCUMENTS

GB    2550137 A  *  11/2017    ........... H04N 13/307
WO    WO 2014/188149 A1    11/2014
(Continued)

OTHER PUBLICATIONS

PCT International Search Report and Written Opinion, PCT Application No. PCT/US17/42275, dated Dec. 4, 2017, 21 pages.
(Continued)

*Primary Examiner* — Richard A Hansell, Jr.
(74) *Attorney, Agent, or Firm* — Charles C. Yang

(57) ABSTRACT

A light filed (LF) display system for displaying holographic content (e.g., a holographic film or holographic content to augment a film) to viewers in a cinema. The LF display system in the cinema includes LF display modules tiled together to form an array of LF modules. The array of LF modules create a holographic object volume for displaying the holographic content in the cinema. The array of LF modules displays the holographic content to viewers in viewing volumes. The LF display system can be included in a LF film network. The LF film network allows holographic content to be created at one location and presented at another location. The LF film network includes a network system to manage the digital rights of the holographic performance content.

18 Claims, 19 Drawing Sheets

(51) Int. Cl.
*G09G 3/00* (2006.01)
*H04N 13/161* (2018.01)
*G03H 1/00* (2006.01)
*G03H 1/22* (2006.01)

(52) U.S. Cl.
CPC ......... *H04N 13/161* (2018.05); *H04N 13/363* (2018.05); *G03H 2001/0061* (2013.01); *G03H 2001/0088* (2013.01); *G03H 2210/30* (2013.01); *G03H 2223/16* (2013.01); *G09G 2370/022* (2013.01)

(56) References Cited

U.S. PATENT DOCUMENTS

| | | | |
|---|---|---|---|
| 5,481,385 | A | 1/1996 | Zimmerman et al. |
| 5,822,125 | A | 10/1998 | Meyers |
| 6,556,280 | B1 | 4/2003 | Kelsey et al. |
| 6,680,761 | B1 | 1/2004 | Greene et al. |
| 7,329,982 | B2 | 2/2008 | Conner et al. |
| 7,490,941 | B2 * | 2/2009 | Mintz .................. H04N 13/393 353/7 |
| 8,442,397 | B2 | 5/2013 | Kang et al. |
| 8,743,466 | B2 | 6/2014 | Yamamoto |
| 8,953,012 | B2 | 2/2015 | Williams et al. |
| 9,179,134 | B2 | 11/2015 | Ranieri et al. |
| 2003/0030912 | A1 | 2/2003 | Gleckman et al. |
| 2004/0108806 | A1 | 6/2004 | Cok et al. |
| 2004/0135100 | A1 | 7/2004 | Menon et al. |
| 2005/0243275 | A1 | 11/2005 | Curatu |
| 2005/0260677 | A1 | 11/2005 | Saaski |
| 2006/0191566 | A1 | 8/2006 | Schaafsma |
| 2008/0068372 | A1 * | 3/2008 | Krah ................... H04N 13/302 345/419 |
| 2008/0192313 | A1 | 8/2008 | Matsumura et al. |
| 2009/0141022 | A1 * | 6/2009 | Kimpe ................. H04N 13/324 345/419 |
| 2010/0157399 | A1 | 6/2010 | Kroll et al. |
| 2010/0278480 | A1 | 11/2010 | Vasylyev |
| 2011/0012895 | A1 * | 1/2011 | Lucente .................... G03H 1/08 345/419 |
| 2011/0032329 | A1 | 2/2011 | Bauza et al. |
| 2011/0134040 | A1 | 6/2011 | Duparre et al. |
| 2011/0211256 | A1 * | 9/2011 | Connor ............... G09G 3/3473 359/463 |
| 2011/0228040 | A1 * | 9/2011 | Blanche ............... G03H 1/0005 348/14.07 |
| 2012/0057040 | A1 | 3/2012 | Park et al. |
| 2012/0206726 | A1 | 8/2012 | Pervez et al. |
| 2012/0268950 | A1 | 10/2012 | Parkyn et al. |
| 2012/0300044 | A1 | 11/2012 | Thomas et al. |
| 2013/0027512 | A1 | 1/2013 | Aronsson et al. |
| 2013/0163089 | A1 | 6/2013 | Bohn |
| 2013/0176407 | A1 * | 7/2013 | Curtis .................. H04N 13/363 348/52 |
| 2013/0019541 | A1 | 8/2013 | Karbasivalashani et al. |
| 2013/0216123 | A1 | 8/2013 | Shroff et al. |
| 2013/0265485 | A1 | 10/2013 | Kang |
| 2014/0126322 | A1 | 5/2014 | Cipolla et al. |
| 2014/0132694 | A1 | 5/2014 | Shacham et al. |
| 2014/0293385 | A1 * | 10/2014 | Smithwick ........... G03H 1/2205 359/9 |
| 2014/0320530 | A1 | 10/2014 | Gruber et al. |
| 2014/0347361 | A1 * | 11/2014 | Alpaslan ............. H04N 13/307 345/426 |
| 2014/0371353 | A1 | 12/2014 | Mitchell et al. |
| 2015/0016777 | A1 | 1/2015 | Abovitz et al. |
| 2015/0178939 | A1 | 6/2015 | Bradski et al. |
| 2015/0219940 | A1 | 8/2015 | Kim et al. |
| 2015/0241608 | A1 | 8/2015 | Shian et al. |
| 2015/0331241 | A1 | 11/2015 | Haddick |
| 2016/0014395 | A1 | 1/2016 | Murray et al. |
| 2016/0037146 | A1 | 2/2016 | McGrew |
| 2016/0070059 | A1 | 3/2016 | Chen et al. |
| 2016/0070356 | A1 * | 3/2016 | Aguirre ................ H04N 13/363 345/156 |
| 2016/0180511 | A1 | 6/2016 | Zhou et al. |
| 2016/0205394 | A1 | 7/2016 | Meng et al. |
| 2016/0274539 | A1 | 9/2016 | Smithwick |
| 2016/0373701 | A1 * | 12/2016 | Ferri ..................... H04N 9/312 |
| 2017/0223344 | A1 * | 8/2017 | Kaehler ............... H04N 13/393 |
| 2018/0372926 | A1 | 12/2018 | Karafin et al. |
| 2019/0041797 | A1 | 2/2019 | Christmas et al. |
| 2019/0043447 | A1 | 2/2019 | Chung et al. |

FOREIGN PATENT DOCUMENTS

| | | |
|---|---|---|
| WO | WO 2016/046514 A1 | 3/2016 |
| WO | WO 2018/014009 A1 | 1/2018 |
| WO | WO 2018/014010 A1 | 1/2018 |
| WO | WO 2018/014027 A1 | 1/2018 |
| WO | WO 2018/014036 A1 | 1/2018 |
| WO | WO 2018/014040 A1 | 1/2018 |
| WO | WO 2018/014044 A1 | 1/2018 |
| WO | WO 2018/014045 A2 | 1/2018 |
| WO | WO 2018/014046 A1 | 1/2018 |
| WO | WO 2018/014047 A1 | 1/2018 |
| WO | WO 2018/014048 A2 | 1/2018 |
| WO | WO 2018/014049 A1 | 1/2018 |

OTHER PUBLICATIONS

PCT International Search Report and Written Opinion, PCT Application No. PCT/US17/42276, dated Nov. 24, 2017, 14 pages.
PCT International Search Report and Written Opinion, PCT Application No. PCT/US17/42418, dated Dec. 20, 2017, 11 pages.
PCT International Search Report and Written Opinion, PCT Application No. PCT/US17/42452, dated Nov. 17, 2017, ten pages.
PCT International Search Report and Written Opinion, PCT Application No. PCT/US17/42462, dated Oct. 30, 2017, eight pages.
PCT International Search Report and Written Opinion, PCT Application No. PCT/US17/42466, dated Nov. 28, 2017, 12 pages.
PCT International Search Report and Written Opinion, PCT Application No. PCT/US17/42467, dated Dec. 27, 2017, seven pages.
PCT International Search Report and Written Opinion, PCT Application No. PCT/US17/42468, dated Nov. 27, 2017, 11 pages.
PCT International Search Report and Written Opinion, PCT Application No. PCT/US17/42469, dated Oct. 12, 2017, ten pages.
PCT International Search Report and Written Opinion, PCT Application No. PCT/US17/42470, dated Dec. 28, 2017, 18 pages.
PCT International Search Report and Written Opinion, PCT Application No. PCT/US17/42679, dated Nov. 9, 2017, eight pages.
Wetzstein, G et al., "On Plenoptic Multiplexing and Reconstruction," International Journal on Computer Vistion (IJCV), vol. 101, No. 2, Nov. 5, 2013, pp. 384-400.
PCT Invitation to Pay, PCT Application No. PCT/US20/21998, dated May 21, 2020, two pages.
PCT International Search Report and Written Opinion, PCT Application No. PCT/US20/21998, dated Jul. 23, 2020, 23 pages.

* cited by examiner

LIGHT FIELD DISPLAY SYSTEM FOR CINEMAS

CROSS REFERENCE TO RELATED APPLICATIONS

This application is related to International Application Nos. PCT/US2017/042275, PCT/US2017/042276, PCT/US2017/042418, PCT/US2017/042452, PCT/US2017/042462, PCT/US2017/042466, PCT/US2017/042467, PCT/US2017/042468, PCT/US2017/042469, PCT/US2017/042414, and PCT/US2017/042679, all of which are incorporated by reference herein in their entirety.

BACKGROUND

The present disclosure relates to presenting films in a cinema, and specifically relates to light field display systems for displaying films in a cinema.

Traditionally, cinemas are configured to allow viewers attending the cinema to view a film on a two-dimensional theater screen. Unfortunately, limiting the content of a film two the two-dimensional theater screen is a less than immersive viewing experience. Even theaters that have been augmented with advanced display technology (e.g., 3-D, augmented reality, etc.) can detract from the viewing experience and leave much to be desired. For example, in theaters with these systems, viewers may be required to wear additional glasses, viewers may become sick from how the film is presented, or the film quality may be degraded when using advanced technology. As such, cinemas configured to the augment the viewing experience of a viewer viewing a film without detracting from the overall experience would be beneficial.

SUMMARY

This disclosure describes a light field (LF) display system for displaying holographic content of a film, or holographic content that augments a traditional film, in a cinema. The LF display system includes LF display modules that form a surface (e.g., walls) in the cinema, the LF display modules each have a display area, and the LF display modules are tiled together to form a seamless display surface that has an effective display area that is larger than the display area of an individual LF display module. The LF display modules display holographic content in a holographic object volume such that viewers in the cinema can perceive the holographic content.

The holographic content may be created by a LF film generation system, by a LF processing engine, or any other system capable of creating holographic content for display in a cinema. The holographic content can be managed by a network system responsible for managing the digital rights of the holographic content.

The LF display engine presents the holographic content in a holographic object volume. The holographic object volume can be at any location in the cinema. For example, the holographic viewing volume may be above viewer's heads in the cinema, on the walls of the cinema, or "behind" walls of the cinema. The LF display system may display certain holographic content to viewers in one viewing volume while displaying different or additional holographic content to viewers in another viewing volume. The holographic content can be displayed before, during, and/or after the film is displayed in the theater.

In some embodiments, the LF display system includes a tracking system and/or a viewer profiling system. The tracking system and viewer profiling system can monitor and store characteristics of viewers in the venue, a viewer profile describing a viewer, and/or responses of viewers to the holographic content in the venue. The holographic content created for display in a venue can be based on any of the monitored or stored information.

In some embodiments, a user may interact with the holographic content, and the interaction can act as input for the LF processing engine. For example, in some embodiments, some or all of the LF display system includes a plurality of ultrasonic speakers. The plurality of ultrasonic speakers are configured to generate a haptic surface that coincides with at least a portion of the holographic content. The tracking system is configured to track an interaction of a user with the holographic object (e.g., via images captured by imaging sensors of the LF display modules and/or some other cameras). And the LF display system is configured to provide to create holographic content based on the interaction.

Figure 1:
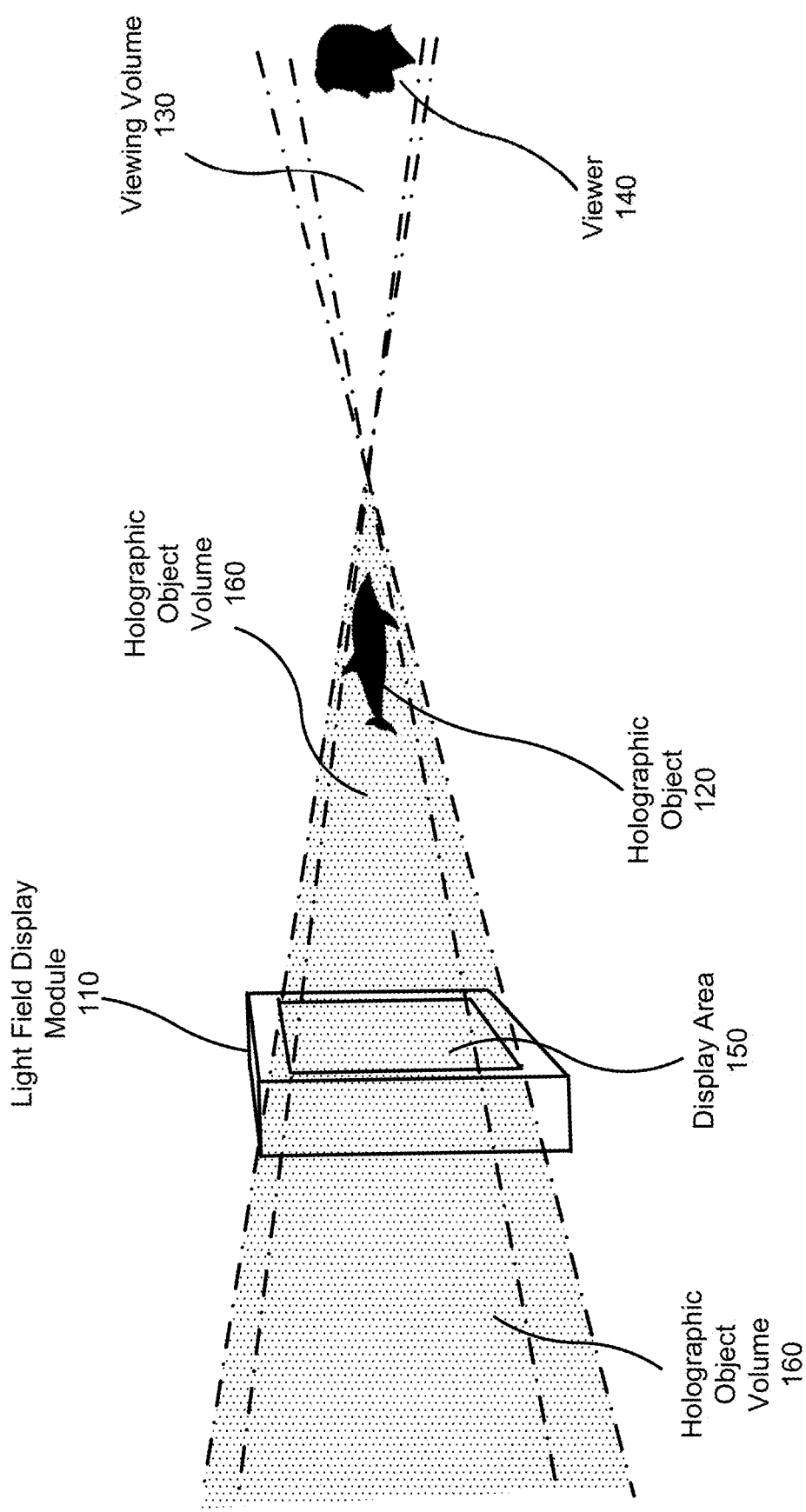
FIG. 1 is a diagram of a light field display module presenting a holographic object, in accordance with one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein."

DETAILED DESCRIPTION

Overview

A light field (LF) display system is implemented in a cinema. The LF display system is configured for displaying films to viewers. The LF display system comprises a LF display assembly configured to present holographic content including one or more holographic objects that would be visible to one or more viewers in a viewing volume of the LF display system. A LF display assembly may form a multi-sided seamless surface over some or all of one or more surfaces in the cinema (e.g., a wall). Generally, a viewer is a person attending a screening of the film in the cinema, but may be any person within the cinema that can view the holographic content.

Holographic content presented by the LF display system may also be augmented with other sensory stimuli (e.g., tactile and/or audio). For example, ultrasonic sources in the LF display system may project ultrasonic pressure waves that create a volumetric haptic projection. The volumetric haptic projection provides a tactile surface that corresponds to some or all of the holographic objects that are projected. Holographic content may also include additional visual content (i.e., 2D or 3D visual content). The coordination of energy sources that enables a cohesive experience is part of the LF system in implementations with multiple energy sources (i.e., holographic objects providing the correct haptic feel and sensory stimuli at any given point in time). For example, a LF system may include a controller to coordinate presentation of holographic content and haptic surfaces.

In some embodiments, the LF display system may include elements that enable the system to project at least one type of energy, and, simultaneously, sense at least one type of energy. Sensed energy may be used for recording how a viewer responds to the holographic content. For example, a LF display system can project both holographic objects for viewing as well as ultrasonic waves for haptic perception, and simultaneously record imaging information for tracking of viewers and other scene analysis. As an example, such a system may project a holographic ticker-tape during a parade in a film such that when the ticker-tape virtually "lands" on a viewer's head, the ticker-tape gives the viewer the illusion that the ticker-tape is landing on their head. The LF display system components that perform energy sensing of the environment may be integrated into the display surface, or they may be dedicated sensors that are separate from the display surface.

In some embodiments, the LF display system includes a plurality of LF display modules that form a surface in the cinema. The surface may cover, for example, the walls and/or ceiling of the cinema. The LF display modules forming the surface may be configured to project holographic content of a film. For example, rather than a projector projecting a film on a theater screen such that it can be viewed by viewers in the cinema, the LF display modules may present the film such that it may be viewed by viewers in the cinema.

A LF display module displaying holographic content of a film may provide an experience with a realism that is hard to distinguish from reality. For example, when viewing holographic content of a film using LF display modules, a viewer is not required to wear 3D glasses or any other head gear to view the holographic content. Furthermore, the holographic content presented by the LF display modules may respond to the viewer actions (e.g., gestures, eye motion, etc.) and viewers may be able to touch the holographic content presented by the LF display modules.

Alternatively or additionally, in some embodiments, the LF display modules may be configured to present holographic content augmenting a film. For example, the LF display modules may present holographic content in the cinema concurrently with a film being presented such that viewers in the cinema may perceive both the film and the augmenting holographic content simultaneously. Here, the set of LF display modules displaying holographic content concurrently to a film enhances the atmosphere of the theater and provides additional content for the film. More generally, a LF display system in a cinema enhances the viewing experience for viewers in the cinema relative to a cinema without a LF display system.

The LF display system can be part of a LF film distribution network. The LF film distribution network allows holographic content to be recorded and/or created in one location, encoded, and transmitted to a different location. Once received, the holographic content may be decoded and displayed as holographic content to viewers in a cinema. The holographic content may be the film itself or holographic content that augments the film. The LF film distribution network allows distribution of holographic content to multiple cinemas. In some embodiments, the LF display system includes a network system that manages the digital rights of the films and/or holographic content.

Light Field Display System

FIG. 1 is a diagram 100 of a light field (LF) display module 110 presenting a holographic object 120, in accordance with one or more embodiments. The LF display module 110 is part of a light field (LF) display system. The LF display system presents holographic content including at least one holographic object using one or more LF display modules. The LF display system can present holographic content to one or multiple viewers. In some embodiments, the LF display system may also augment the holographic content with other sensory content (e.g., touch, audio, smell, temperature, etc.). For example, as discussed below, the projection of focused ultrasonic sound waves may generate a mid-air tactile sensation that can simulate a surface of some or all of a holographic object. The LF display system includes one or more LF display modules 110, and is discussed in detail below with regard to FIGS. 2-5.

The LF display module 110 is a holographic display that presents holographic objects (e.g., the holographic object 120) to one or more viewers (e.g., viewer 140). The LF display module 110 includes an energy device layer (e.g., an emissive electronic display or acoustic projection device) and an energy waveguide layer (e.g., optical lens array). Additionally, the LF display module 110 may include an energy relay layer for the purpose of combining multiple energy sources or detectors together to form a single surface. At a high-level, the energy device layer generates energy (e.g., holographic content) that is then directed using the energy waveguide layer to a region in space in accordance with one or more four-dimensional (4D) light field functions. The LF display module 110 may also project and/or sense one or more types of energy simultaneously. For example, LF display module 110 may be able to project a holographic image as well as an ultrasonic tactile surface in a viewing volume, while simultaneously detecting imaging data from the viewing volume. The operation of the LF display module 110 is discussed in more detail below with regard to FIGS. 2-3.

The LF display module 110 generates holographic objects within a holographic object volume 160 using one or more 4D light field functions (e.g., derived from a plenoptic function). The holographic objects can be three-dimensional (3D), two-dimensional (2D), or some combination thereof. Moreover, the holographic objects may be polychromatic (e.g., full color). The holographic objects may be projected in front of the screen plane, behind the screen plane, or split by the screen plane. A holographic object 120 can be presented such that it is perceived anywhere within the holographic object volume 160. A holographic object within the holographic object volume 160 may appear to a viewer 140 to be floating in space.

A holographic object volume 160 represents a volume in which holographic objects may be perceived by a viewer 140. The holographic object volume 160 can extend in front of the surface of the display area 150 (i.e., towards the viewer 140) such that holographic objects can be presented in front of the plane of the display area 150. Additionally, the holographic object volume 160 can extend behind the surface of the display area 150 (i.e., away from the viewer 140), allowing for holographic objects to be presented as if they are behind the plane of the display area 150. In other words, the holographic object volume 160 may include all the rays of light that originate (e.g., are projected) from a display area 150 and can converge to create a holographic object. Herein, light rays may converge at a point that is in front of the display surface, at the display surface, or behind the display surface. More simply, the holographic object volume 160 encompasses all of the volume from which a holographic object may be perceived by a viewer.

A viewing volume 130 is a volume of space from which holographic objects (e.g., holographic object 120) presented within a holographic object volume 160 by the LF display system are fully viewable. The holographic objects may be presented within the holographic object volume 160, and viewed within a viewing volume 130, such that they are indistinguishable from actual objects. A holographic object is formed by projecting the same light rays that would be generated from the surface of the object were it physically present.

In some cases, the holographic object volume 160 and the corresponding viewing volume 130 may be relatively small—such that it is designed for a single viewer. In other embodiments, as discussed in detail below with regard to, e.g., FIGS. 4, 6, 7, 8, and 9, the LF display modules may be enlarged and/or tiled to create larger holographic object volumes and corresponding viewing volumes that can accommodate a large range of viewers (e.g., 1 to thousands). The LF display modules presented in this disclosure may be built so that the full surface of the LF display contains holographic imaging optics, with no inactive or dead space, and without any need for bezels. In these embodiments, the LF display modules may be tiled so that the imaging area is continuous across the seam between LF display modules, and the bond line between the tiled modules is virtually undetectable using the visual acuity of the eye. Notably, in some configurations, some portion of the display surface may not include holographic imaging optics, although they are not described in detail herein.

The flexible size and/or shape of a viewing volume 130 allows for viewers to be unconstrained within the viewing volume 130. For example, a viewer 140 can move to a different position within a viewing volume 130 and see a different view of the holographic object 120 from the corresponding perspective. To illustrate, referring to FIG. 1, the viewer 140 is at a first position relative to the holographic object 120 such that the holographic object 120 appears to be a head-on view of a dolphin. The viewer 140 may move to other locations relative to the holographic object 120 to see different views of the dolphin. For example, the viewer 140 may move such that he/she sees a left side of the dolphin, a right side of the dolphin, etc., much like if the viewer 140 was looking at an actual dolphin and changed his/her relative position to the actual dolphin to see different views of the dolphin. In some embodiments, the holographic object 120 is visible to all viewers within the viewing volume 130 that have an unobstructed line (i.e., not blocked by an object/person) of sight to the holographic object 120. These viewers may be unconstrained such that they can move around within the viewing volume to see different perspectives of the holographic object 120. Accordingly, the LF display system may present holographic objects such that a plurality of unconstrained viewers may simultaneously see different perspectives of the holographic objects in real-world space as if the holographic objects were physically present.

In contrast, conventional displays (e.g., stereoscopic, virtual reality, augmented reality, or mixed reality) generally require each viewer to wear some sort of external device (e.g., 3-D glasses, a near-eye display, or a head-mounted display) in order to see content. Additionally and/or alternatively, conventional displays may require that a viewer be constrained to a particular viewing position (e.g., in a chair that has fixed location relative to the display). For example, when viewing an object shown by a stereoscopic display, a viewer always focuses on the display surface, rather than on the object, and the display will always present just two views of an object that will follow a viewer who attempts to move around that perceived object, causing distortions in the perception of that object. With a light field display, however, viewers of a holographic object presented by the LF display system do not need to wear an external device, nor be confined to a particular position, in order to see the holographic object. The LF display system presents the holographic object in a manner that is visible to viewers in much the same way a physical object would be visible to the viewers, with no requirement of special eyewear, glasses, or a head-mounted accessory. Further, the viewer may view holographic content from any location within a viewing volume.

Notably, potential locations for holographic objects within the holographic object volume 160 are limited by the size of the volume. In order to increase the size of the holographic object volume 160, a size of a display area 150 of the LF display module 110 may be increased and/or multiple LF display modules may be tiled together in a manner that forms a seamless display surface. The seamless display surface has an effective display area that is larger than the display areas of the individual LF display modules. Some embodiments relating to tiling LF display modules are discussed below with regard to FIGS. 4, and 6-9. As illustrated in FIG. 1, the display area 150 is rectangular resulting in a holographic object volume 160 that is a pyramid. In other embodiments, the display area may have some other shape (e.g., hexagonal), which also affects the shape of the corresponding viewing volume.

Additionally, while the above discussion focuses on presenting the holographic object 120 within a portion of the holographic object volume 160 that is between the LF display module 110 and the viewer 140, the LF display module 110 can additionally present content in the holographic object volume 160 behind the plane of the display area 150. For example, the LF display module 110 may make the display area 150 appear to be a surface of the ocean that the holographic object 120 is jumping out of. And the displayed content may be such that the viewer 140 is able to look through the displayed surface to see marine life that is under the water. Moreover, the LF display system can generate content that seamlessly moves around the holographic object volume 160, including behind and in front of the plane of the display area 150.

Figure 2A:
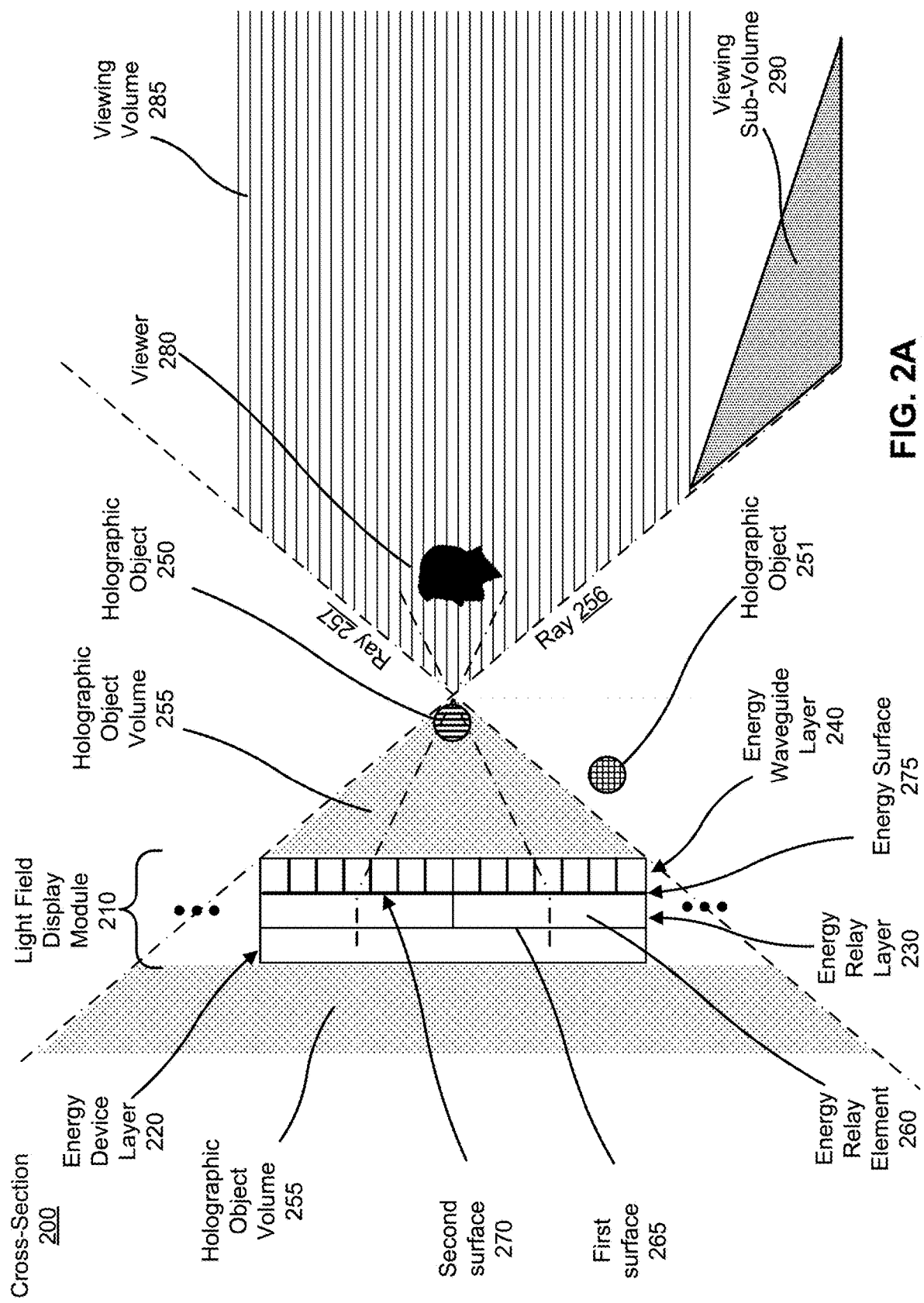
FIG. 2A is a cross section of a portion of a light field display module, in accordance with one or more embodiments.

FIG. 2A illustrates a cross section 200 of a portion of a LF display module 210, in accordance with one or more embodiments. The LF display module 210 may be the LF display module 110. In other embodiments, the LF display module 210 may be another LF display module with a different display area shape than display area 150. In the illustrated embodiment, the LF display module 210 includes an energy device layer 220, an energy relay layer 230, and an energy waveguide layer 240. Some embodiments of the LF display module 210 have different components than those described here. For example, in some embodiments, the LF display module 210 does not include the energy relay layer 230. Similarly, the functions can be distributed among the components in a different manner than is described here.

The display system described here presents an emission of energy that replicates the energy normally surrounding an object in the real world. Here, emitted energy is directed towards a specific direction from every coordinate on the display surface. In other words, the various coordinates on the display surface act as a projection locations for emitted energy. The directed energy from the display surface enables convergence of many rays of energy, which, thereby, can create holographic objects. For visible light, for example, the LF display will project a very large number of light rays from the projection locations that may converge at any point in the holographic object volume so they will appear to come from the surface of a real-world object located in this region of space from the perspective of a viewer that is located further away than the object being projected. In this way, the LF display is generating the rays of reflected light that would leave such an object's surface from the perspective of the viewer. The viewer perspective may change on any given holographic object, and the viewer will see a different view of that holographic object.

The energy device layer 220 includes one or more electronic displays (e.g., an emissive display such as an OLED) and one or more other energy projection and/or energy receiving devices as described herein. The one or more electronic displays are configured to display content in accordance with display instructions (e.g., from a controller of a LF display system). The one or more electronic displays include a plurality of pixels, each with an intensity that is individually controlled. Many types of commercial displays, such as emissive LED and OLED displays, may be used in the LF display.

The energy device layer 220 may also include one or more acoustic projection devices and/or one or more acoustic receiving devices. An acoustic projection device generates one or more pressure waves that complement the holographic object 250. The generated pressure waves may be, e.g., audible, ultrasonic, or some combination thereof. An array of ultrasonic pressure waves may be used for volumetric tactile sensation (e.g., at a surface of the holographic object 250). An audible pressure wave is used for providing audio content (e.g., immersive audio) that can complement the holographic object 250. For example, assuming the holographic object 250 is a dolphin, one or more acoustic projection devices may be used to (1) generate a tactile surface that is collocated with a surface of the dolphin such that viewers may touch the holographic object 250; and (2) provide audio content corresponding to noises a dolphin makes such as clicks, chirping, or chatter. An acoustic receiving device (e.g., a microphone or microphone array) may be configured to monitor ultrasonic and/or audible pressure waves within a local area of the LF display module 210.

The energy device layer 220 may also include one or more imaging sensors. An imaging sensor may be sensitive to light in a visible optical band, and in some cases may be sensitive to light in other bands (e.g., infrared). The imaging sensor may be, e.g., a complementary metal oxide semiconductor (CMOS) array, a charged coupled device (CCD), an array of photodetectors, some other sensor that captures light, or some combination thereof. The LF display system may use data captured by the one or more imaging sensor for position location tracking of viewers.

In some configurations, the energy relay layer 230 relays energy (e.g., electromagnetic energy, mechanical pressure waves, etc.) between the energy device layer 220 and the energy waveguide layer 240. The energy relay layer 230 includes one or more energy relay elements 260. Each energy relay element includes a first surface 265 and a second surface 270, and it relays energy between the two surfaces. The first surface 265 of each energy relay element may be coupled to one or more energy devices (e.g., electronic display or acoustic projection device). An energy relay element may be composed of, e.g., glass, carbon, optical fiber, optical film, plastic, polymer, or some combination thereof. Additionally, in some embodiments, an energy relay element may adjust magnification (increase or decrease) of energy passing between the first surface 265 and the second surface 270. If the relay offers magnification, then the relay may take the form of an array of bonded tapered relays, called tapers, where the area of one end of the taper may be substantially larger than the opposite end. The large end of the tapers can be bonded together to form a seamless energy surface 275. One advantage is that space is created on the multiple small ends of each taper to accommodate the mechanical envelope of multiple energy sources, such as the bezels of multiple displays. This extra room allows the energy sources to be placed side-by-side on the small taper side, with each energy source having their active areas directing energy into the small taper surface and relayed to the large seamless energy surface. Another advantage to using tapered relays is that there is no non-imaging dead space on the combined seamless energy surface formed by the large end of the tapers. No border or bezel exists, and so the seamless energy surfaces can then be tiled together to form a larger surface with virtually no seams according to the visual acuity of the eye.

The second surfaces of adjacent energy relay elements come together to form an energy surface 275. In some embodiments, a separation between edges of adjacent energy relay elements is less than a minimum perceptible contour as defined by a visual acuity of a human eye having, for example, 20/40 vision, such that the energy surface 275 is effectively seamless from the perspective of a viewer 280 within a viewing volume 285.

In some embodiments, the second surfaces of adjacent energy relay elements are fused together with processing steps that may include one or more of pressure, heat, and a chemical reaction, in such a way no seam exists between them. And still in other embodiments, an array of energy relay elements is formed by molding one side of a continuous block of relay material into an array of small taper ends, each configured to transport energy from an energy device attached to the small tapered end into a single combined surface with a larger area which is never subdivided.

In some embodiments, one or more of the energy relay elements exhibit energy localization, where the energy transport efficiency in the longitudinal direction substantially normal to the surfaces 265 and 270 is much higher than the transport efficiency in the perpendicular transverse plane, and where the energy density is highly localized in this transverse plane as the energy wave propagates between surface 265 and surface 270. This localization of energy allows an energy distribution, such as an image, to be efficiently relayed between these surfaces without any significant loss in resolution.

The energy waveguide layer 240 directs energy from a location (e.g., a coordinate) on the energy surface 275 into a specific energy propagation path outward from the display surface into the holographic viewing volume 285 using waveguide elements in the energy waveguide layer 240. The energy propagation path is defined by two angular dimensions determined at least by the energy surface coordinate location relative to the waveguide. The waveguide is associated with a spatial 2D coordinate. Together, these four coordinates form a four-dimensional (4D) energy field. As an example, for electromagnetic energy, the waveguide elements in the energy waveguide layer 240 direct light from positions on the seamless energy surface 275 along different propagation directions through the viewing volume 285. In various examples, the light is directed in accordance with a 4D light field function to form the holographic object 250 within the holographic object volume 255.

Each waveguide element in the energy waveguide layer 240 may be, for example, a lenslet composed of one or more elements. In some configurations, the lenslet may be a positive lens. The positive lens may have a surface profile that is spherical, aspherical, or freeform. Additionally, in some embodiments, some or all of the waveguide elements may include one or more additional optical components. An additional optical component may be, e.g., an energy-inhibiting structure such as a baffle, a positive lens, a negative lens, a spherical lens, an aspherical lens, a freeform lens, a liquid crystal lens, a liquid lens, a refractive element, a diffractive element, or some combination thereof. In some embodiments, the lenslet and/or at least one of the additional optical components is able to dynamically adjust its optical power. For example, the lenslet may be a liquid crystal lens or a liquid lens. Dynamic adjustment of a surface profile the lenslet and/or at least one additional optical component may provide additional directional control of light projected from a waveguide element.

In the illustrated example, the holographic object volume 255 of the LF display has boundaries formed by light ray 256 and light ray 257, but could be formed by other rays. The holographic object volume 255 is a continuous volume that extends both in front (i.e., towards the viewer 280) of the energy waveguide layer 240 and behind it (i.e., away from the viewer 280). In the illustrated example, ray 256 and ray 257 are projected from opposite edges of the LF display module 210 at the highest angle relative to the normal to the display surface 277 that may be perceived by a user, but these could be other projected rays. The rays define the field-of-view of the display, and, thus, define the boundaries for the holographic viewing volume 285. In some cases, the rays define a holographic viewing volume where the full display can be observed without vignetting (e.g., an ideal viewing volume). As the field of view of the display increases, the convergence point of ray 256 and ray 257 will be closer to the display. Thus, a display having a larger field of view allows a viewer 280 to see the full display at a closer viewing distance. Additionally, ray 256 and 257 may form an ideal holographic object volume. Holographic objects presented in an ideal holographic object volume can be seen anywhere in the viewing volume 285.

In some examples, holographic objects may be presented to only a portion of the viewing volume 285. In other words, holographic object volumes may be divided into any number of viewing sub-volumes (e.g., viewing sub-volume 290). Additionally, holographic objects can be projected outside of the holographic object volume 255. For example, holographic object 251 is presented outside of holographic object volume 255. Because the holographic object 251 is presented outside of the holographic object volume 255 it cannot be viewed from every location in the viewing volume 285. For example, holographic object 251 may be visible from a location in viewing sub-volume 290, but not visible from the location of the viewer 280.

Figure 2B:
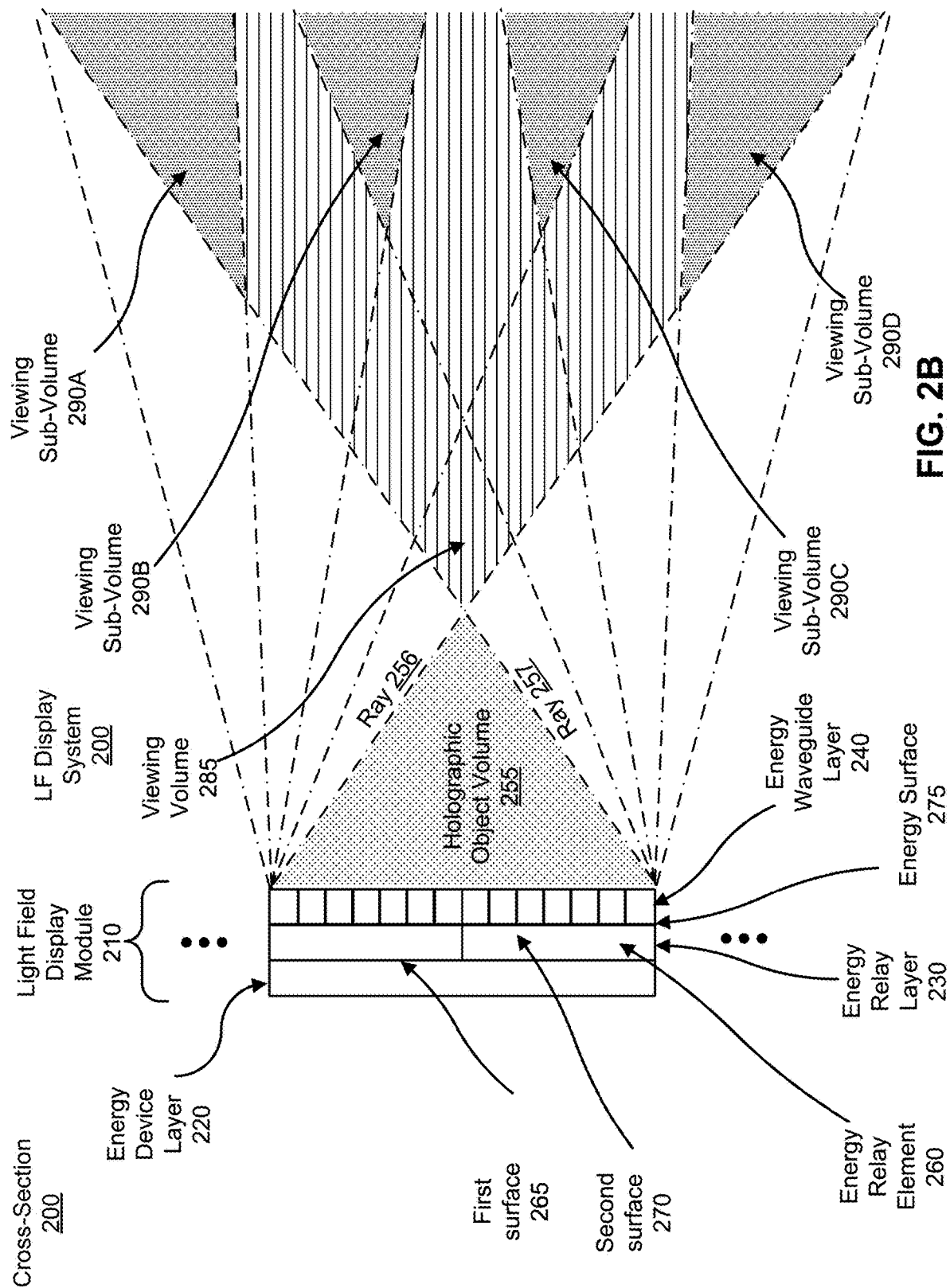
FIG. 2B is a cross section of a portion of a light field display module, in accordance with one or more embodiments.

For example, we turn to FIG. 2B to illustrate viewing holographic content from different viewing sub-volumes. FIG. 2B illustrates a cross section 200 of a portion of a LF display module, in accordance with one or more embodiments. The cross-section of FIG. 2B is the same as the cross-section of FIG. 2A. However, FIG. 2B illustrates a different set of light rays projected from the LF display module 210. Ray 256 and ray 257 still form a holographic object volume 255 and a viewing volume 285. However, as shown, rays projected from the top of the LF display module 210 and the bottom of the LF display module 210 overlap to form various viewing sub-volumes (e.g., view sub-volumes 290A, 290B, 290C, and 290D) within the viewing volume 285. A viewer in the first viewing sub-volume (e.g., 290A) may be able to perceive holographic content presented in the holographic object volume 255 that viewers in the other viewing sub-volumes (e.g., 290B, 290C, and 290D) are unable to perceive.

More simply, as illustrated in FIG. 2A, holographic object volume 255 is a volume in which holographic objects may be presented by LF display system such that they may be perceived by viewers (e.g., viewer 280) in viewing volume 285. In this way, the viewing volume 285 is an example of an ideal viewing volume, while the holographic object volume 255 is an example of an ideal object volume. However, in various configurations, viewers may perceive holographic objects presented by LF display system 200 in other example holographic object volumes. More generally, an "eye-line guideline" applies when viewing holographic content projected from an LF display module. The eye-line guideline asserts that the line formed by a viewer's eye position and a holographic object being viewed must intersect a LF display surface.

When viewing holographic content presented by the LF display module 210, each eye of the viewer 280 sees a different perspective of the holographic object 250 because the holographic content is presented according to a 4D light field function. Moreover, as the viewer 280 moves within the viewing volume 285 he/she would also see different perspectives of the holographic object 250 as would other viewers within the viewing volume 285. As will be appreciated by one of ordinary skill in the art, a 4D light field function is well known in the art and will not be elaborated further herein.

As described in more detail herein, in some embodiments, the LF display can project more than one type of energy. For example, the LF display may project two types of energy, such as, for example, mechanical energy and electromagnetic energy. In this configuration, energy relay layer 230 may include two separate energy relays which are interleaved together at the energy surface 275, but are separated such that the energy is relayed to two different energy device layers 220. Here, one relay may be configured to transport electromagnetic energy, while another relay may be configured to transport mechanical energy. In some embodiments, the mechanical energy may be projected from locations between the electromagnetic waveguide elements on the energy waveguide layer 240, helping form structures that inhibit light from being transported from one electromagnetic waveguide element to another. In some embodiments, the energy waveguide layer 240 may also include waveguide elements that transport focused ultrasound along specific propagation paths in accordance with display instructions from a controller.

Note that in alternate embodiments (not shown), the LF display module 210 does not include the energy relay layer 230. In this case, the energy surface 275 is an emission surface formed using one or more adjacent electronic displays within the energy device layer 220. And in some embodiments, with no energy relay layer, a separation between edges of adjacent electronic displays is less than a minimum perceptible contour as defined by a visual acuity of a human eye having 20/40 vision, such that the energy surface is effectively seamless from the perspective of the viewer 280 within the viewing volume 285.

LF Display Modules

Figure 3A:
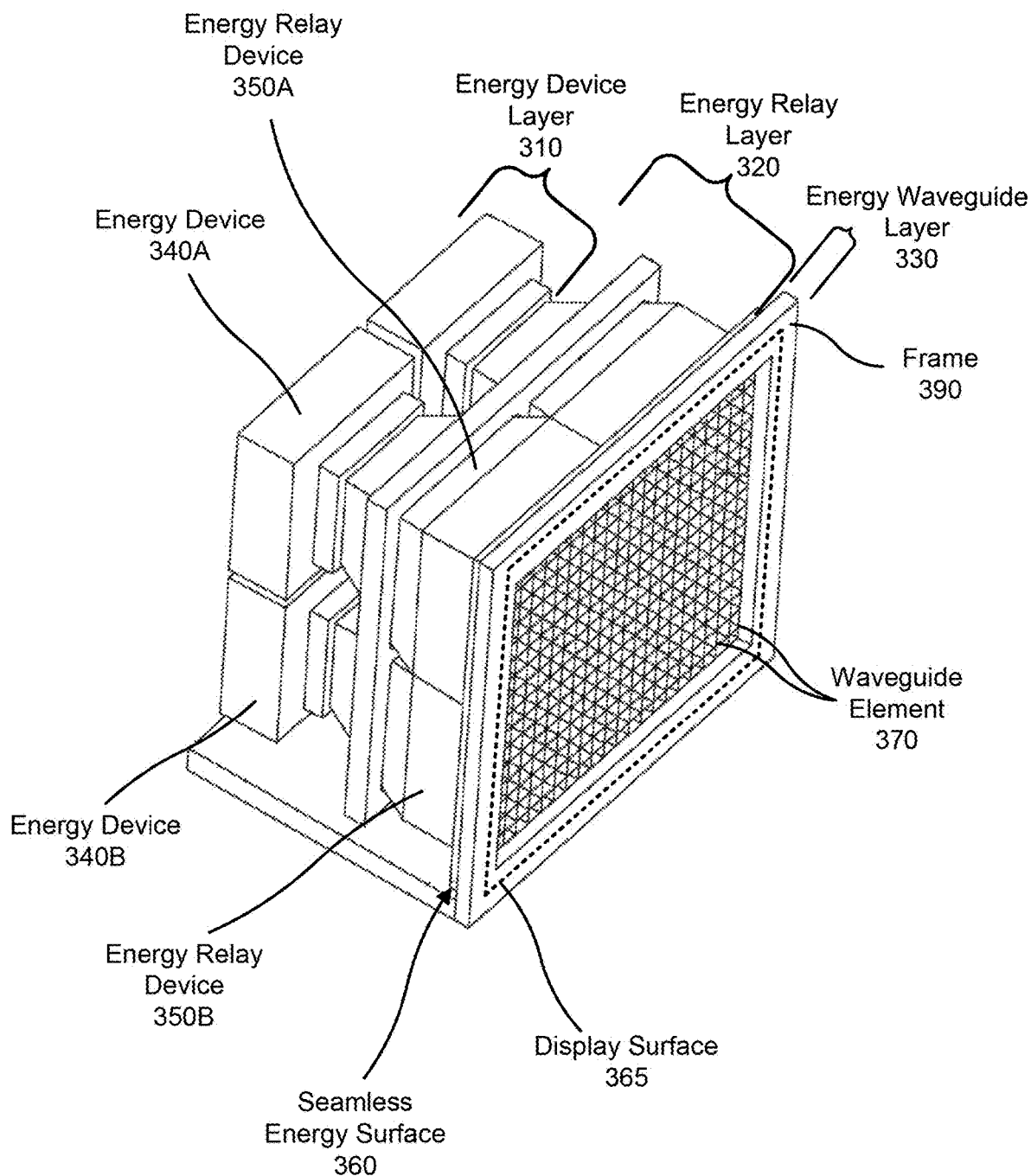
FIG. 3A is a perspective view of a light field display module, in accordance with one or more embodiments.

FIG. 3A is a perspective view of a LF display module 300A, in accordance with one or more embodiments. The LF display module 300A may be the LF display module 110 and/or the LF display module 210. In other embodiments, the LF display module 300A may be some other LF display module. In the illustrated embodiment, the LF display module 300A includes an energy device layer 310, and energy relay layer 320, and an energy waveguide layer 330. The LF display module 300A is configured to present holographic content from a display surface 365 as described herein. For convenience, the display surface 365 is illustrated as a dashed outline on the frame 390 of the LF display module 300A, but is, more accurately, the surface directly in front of waveguide elements bounded by the inner rim of the frame 390. The display surface 365 includes a plurality of projection locations from which energy can be projected. Some embodiments of the LF display module 300A have different components than those described here. For example, in some embodiments, the LF display module 300A does not include the energy relay layer 320. Similarly, the functions can be distributed among the components in a different manner than is described here.

The energy device layer 310 is an embodiment of the energy device layer 220. The energy device layer 310 includes four energy devices 340 (three are visible in the figure). The energy devices 340 may all be the same type (e.g., all electronic displays), or may include one or more different types (e.g., includes electronic displays and at least one acoustic energy device).

The energy relay layer 320 is an embodiment of the energy relay layer 230. The energy relay layer 320 includes four energy relay devices 350 (three are visible in the figure). The energy relay devices 350 may all relay the same type of energy (e.g., light), or may relay one or more different types (e.g., light and sound). Each of the relay devices 350 includes a first surface and a second surface, the second surface of the energy relay devices 350 being arranged to form a singular seamless energy surface 360. In the illustrated embodiment, each of the energy relay devices 350 are tapered such that the first surface has a smaller surface area than the second surface, which allows accommodation for the mechanical envelopes of the energy devices 340 on the small end of the tapers. This also allows the seamless energy surface to be borderless, since the entire area can project energy. This means that this seamless energy surface can be tiled by placing multiple instances of LF display module 300A together, without dead space or bezels, so that the entire combined surface is seamless. In other embodiments, the first surface and the second surface have the same surface area.

The energy waveguide layer 330 is an embodiment of the energy waveguide layer 240. The energy waveguide layer 330 includes a plurality of waveguide elements 370. As discussed above with respect to FIG. 2, the energy waveguide layer 330 is configured to direct energy from the seamless energy surface 360 along specific propagation paths in accordance with a 4D light field function to form a holographic object. Note that in the illustrated embodiment the energy waveguide layer 330 is bounded by a frame 390. In other embodiments, there is no frame 390 and/or a thickness of the frame 390 is reduced. Removal or reduction of thickness of the frame 390 can facilitate tiling the LF display module 300A with additional LF display modules.

Note that in the illustrated embodiment, the seamless energy surface 360 and the energy waveguide layer 330 are planar. In alternate embodiments, not shown, the seamless energy surface 360 and the energy waveguide layer 330 may be curved in one or more dimensions.

The LF display module 300A can be configured with additional energy sources that reside on the surface of the seamless energy surface, and allow the projection of an energy field in additional to the light field. In one embodiment, an acoustic energy field may be projected from electrostatic speakers (not illustrated) mounted at any number of locations on the seamless energy surface 360. Further, the electrostatic speakers of the LF display module 300A are positioned within the light field display module 300A such that the dual-energy surface simultaneously projects sound fields and holographic content. For example, the electrostatic speakers may be formed with one or more diaphragm elements that are transmissive to some wavelengths of electromagnetic energy, and driven with one or more conductive elements (e.g., planes which sandwich the one or more diaphragm elements). The electrostatic speakers may be mounted on to the seamless energy surface 360, so that the diaphragm elements cover some of the waveguide elements. The conductive electrodes of the speakers may be co-located with structures designed to inhibit light transmission between electromagnetic waveguides, and/or located at positions between electromagnetic waveguide elements (e.g., frame 390). In various configurations, the speakers can project an audible sound and/or many sources of focused ultrasonic energy that produces a haptic surface.

In some configurations an energy device 340 may sense energy. For example, an energy device may be a microphone, a light sensor, an acoustic transducer, etc. As such, the energy relay devices may also relay energy from the seamless energy surface 360 to the energy device layer 310. That is, the seamless energy surface 360 of the LF display module forms a bidirectional energy surface when the energy devices and energy relay devices 340 are configured to simultaneously emit and sense energy (e.g., emit light fields and sense sound).

More broadly, an energy device 340 of a LF display module 340 can be either an energy source or an energy sensor. The LF display module 300A can include various types of energy devices that act as energy sources and/or energy sensors to facilitate the projection of high quality holographic content to a user. Other sources and/or sensors may include thermal sensors or sources, infrared sensors or sources, image sensors or sources, mechanical energy transducers that generate acoustic energy, feedback sources, etc. Many other sensors or sources are possible. Further, the LF display modules can be tiled such that the LF display module can form an assembly that projects and senses multiple types of energy from a large aggregate seamless energy surface In various embodiments of LF display module 300A, the seamless energy surface 360 can have various surface portions where each surface portion is configured to project and/or emit specific types of energy. For example, when the seamless energy surface is a dual-energy surface, the seamless energy surface 360 includes one or more surface portions that project electromagnetic energy, and one or more other surface portions that project ultrasonic energy. The surface portions that project ultrasonic energy may be located on the seamless energy surface 360 between electromagnetic waveguide elements, and/or co-located with structures designed to inhibit light transmission between electromagnetic waveguide elements. In an example where the seamless energy surface is a bidirectional energy surface, the energy relay layer 320 may include two types of energy relay devices interleaved at the seamless energy surface 360. In various embodiments, the seamless energy surface 360 may be configured such that portions of the surface under any particular waveguide element 370 are all energy sources, all energy sensors, or a mix of energy sources and energy sensors.

Figure 3B:
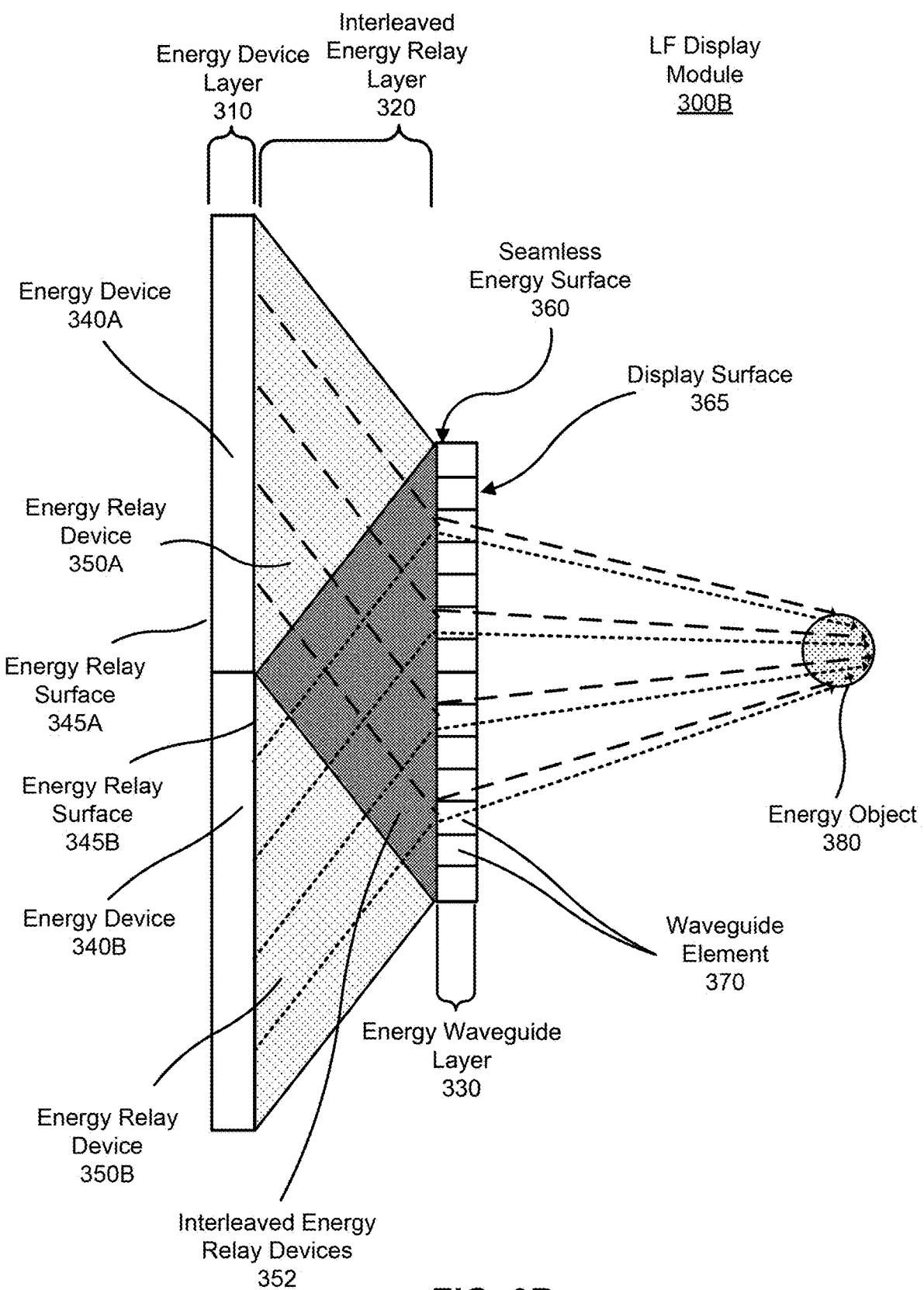
FIG. 3B is a cross-sectional view of a light field display module which includes interleaved energy relay devices, in accordance with one or more embodiments.

FIG. 3B is a cross-sectional view of a LF display module 300B which includes interleaved energy relay devices, in accordance with one or more embodiments. Energy relay device 350A transports energy between the energy relay first surface 345A connected to energy device 340A, and the seamless energy surface 360. Energy relay 350B transports energy between the energy relay first surface 345B connected to energy device 340B, and the seamless energy surface 360. Both relay devices are interleaved at interleaved energy relay device 352, which is connected to the seamless energy surface 360. In this configuration, surface 360 contains interleaved energy locations of both energy devices 340A and 340B, which may be energy sources or energy sensors. Accordingly, the LF display module 300B may be configured as either a dual energy projection device for projecting more than one type of energy, or as a bidirectional energy device for simultaneously projecting one type of energy and sensing another type of energy. The LF display module 300B may be the LF display module 110 and/or the LF display module 210. In other embodiments, the LF display module 300B may be some other LF display module.

The LF display module 300B includes many components similarly configured to those of LF display module 300A in FIG. 3A. For example, in the illustrated embodiment, the LF display module 300B includes an energy device layer 310, energy relay layer 320, a seamless energy surface 360, and an energy waveguide layer 330 including at least the same functionality of those described in regard to FIG. 3A. Additionally, the LF display module 300B may present and/or receive energy from the display surface 365. Notably, the components of the LF display module 300B are alternatively connected and/or oriented than those of the LF display module 300A in FIG. 3A. Some embodiments of the LF display module 300B have different components than those described here. Similarly, the functions can be distributed among the components in a different manner than is described here. FIG. 3B illustrates the design of a single LF display module 300B that may be tiled to produce a dual energy projection surface or a bidirectional energy surface with a larger area.

In an embodiment, the LF display module 300B is a LF display module of a bidirectional LF display system. A bidirectional LF display system may simultaneously project energy and sense energy from the display surface 365. The seamless energy surface 360 contains both energy projecting and energy sensing locations that are closely interleaved on the seamless energy surface 360. Therefore, in the example of FIG. 3B, the energy relay layer 320 is configured in a different manner than the energy relay layer of FIG. 3A. For convenience, the energy relay layer of LF display module 300B will be referred to herein as the "interleaved energy relay layer."

The interleaved energy relay layer 320 includes two legs: a first energy relay device 350A and a second energy relay device 350B. Each of the legs are illustrated as a lightly shaded area in FIG. 3B. Each of the legs may be made of a flexible relay material, and formed with a sufficient length to use with energy devices of various sizes and shapes. In some regions of the interleaved energy relay layer, the two legs are tightly interleaved together as they approach the seamless energy surface 360. In the illustrated example, the interleaved energy relay devices 352 are illustrated as a darkly shaded area.

While interleaved at the seamless energy surface 360, the energy relay devices are configured to relay energy to/from different energy devices. The energy devices are at energy device layer 310. As illustrated, energy device 340A is connected to energy relay device 350A and energy device 340B is connected to energy relay device 350B. In various embodiments, each energy device may be an energy source or energy sensor.

An energy waveguide layer 330 includes waveguide elements 370 to steer energy waves from the seamless energy surface 360 along projected paths towards a series of convergence points. In this example, a holographic object 380 is formed at the series of convergence points. Notably, as illustrated, the convergence of energy at the holographic object 380 occurs on the viewer side (i.e., the front side), of the display surface 365. However, in other examples, the convergence of energy may be anywhere in the holographic object volume, which extends both in front of the display surface 365 and behind the display surface 365. The waveguide elements 370 can simultaneously steer incoming energy to an energy device (e.g., an energy sensor), as described below.

In one example embodiment of LF display module 300B, an emissive display is used as an energy source (e.g., energy device 340A) and an imaging sensor is used as an energy sensor (e.g., energy device 340B). In this manner, the LF display module 300B can simultaneously project holographic content and detect light from the volume in front of the display surface 365. In this manner, this embodiment of the LF display module 300B functions as both a LF display and an LF sensor.

In an embodiment, the LF display module 300B is configured to simultaneously project a light field from projection locations on the display surface to the front of the display surface and capture a light field from front of the display surface at the projection locations. In this embodiment, the energy relay device 350A connects a first set of locations at the seamless energy surface 360 positioned under the waveguide elements 370 to an energy device 340A. In an example, energy device 340A is an emissive display having an array of source pixels. The energy relay device 340B connects a second set of locations at the seamless energy surface 360 positioned under waveguide elements 370 to an energy device 340B. In an example, the energy device 340B is an imaging sensor having an array of sensor pixels. The LF display module 300B may be configured such that the locations at the seamless energy surface 365 that are under a particular waveguide element 370 are all emissive display locations, all imaging sensor locations, or some combination of these locations. In other embodiments, the bidirectional energy surface can project and receive various other forms of energy.

In another example embodiment of the LF display module 300B, the LF display module is configured to project two different types of energy. For example, in an embodiment, energy device 340A is an emissive display configured to emit electromagnetic energy and energy device 340B is an ultrasonic transducer configured to emit mechanical energy. As such, both light and sound can be projected from various locations at the seamless energy surface 360. In this configuration, energy relay device 350A connects the energy device 340A to the seamless energy surface 360 and relays the electromagnetic energy. The energy relay device is configured to have properties (e.g. varying refractive index) which make it efficient for transporting electromagnetic energy. Energy relay device 350B connects the energy device 340B to the seamless energy surface 360 and relays mechanical energy. Energy relay device 350B is configured to have properties for efficient transport of ultrasound energy (e.g. distribution of materials with different acoustic impedance). In some embodiments, the mechanical energy may be projected from locations between the waveguide elements 370 on the energy waveguide layer 330. The locations that project mechanical energy may form structures that serve to inhibit light from being transported from one electromagnetic waveguide element to another. In one example, a spatially separated array of locations that project ultrasonic mechanical energy can be configured to create three-dimensional haptic shapes and surfaces in mid-air. The surfaces may coincide with projected holographic objects (e.g., holographic object 380). In some examples, phase delays and amplitude variations across the array can assist in creating the haptic shapes.

In various embodiments, the LF display module 300B with interleaved energy relay devices may include multiple energy device layers with each energy device layer including a specific type of energy device. In these examples, the energy relay layers are configured to relay the appropriate type of energy between the seamless energy surface 360 and the energy device layer 310.

Tiled LF Display Modules

Figure 4A:
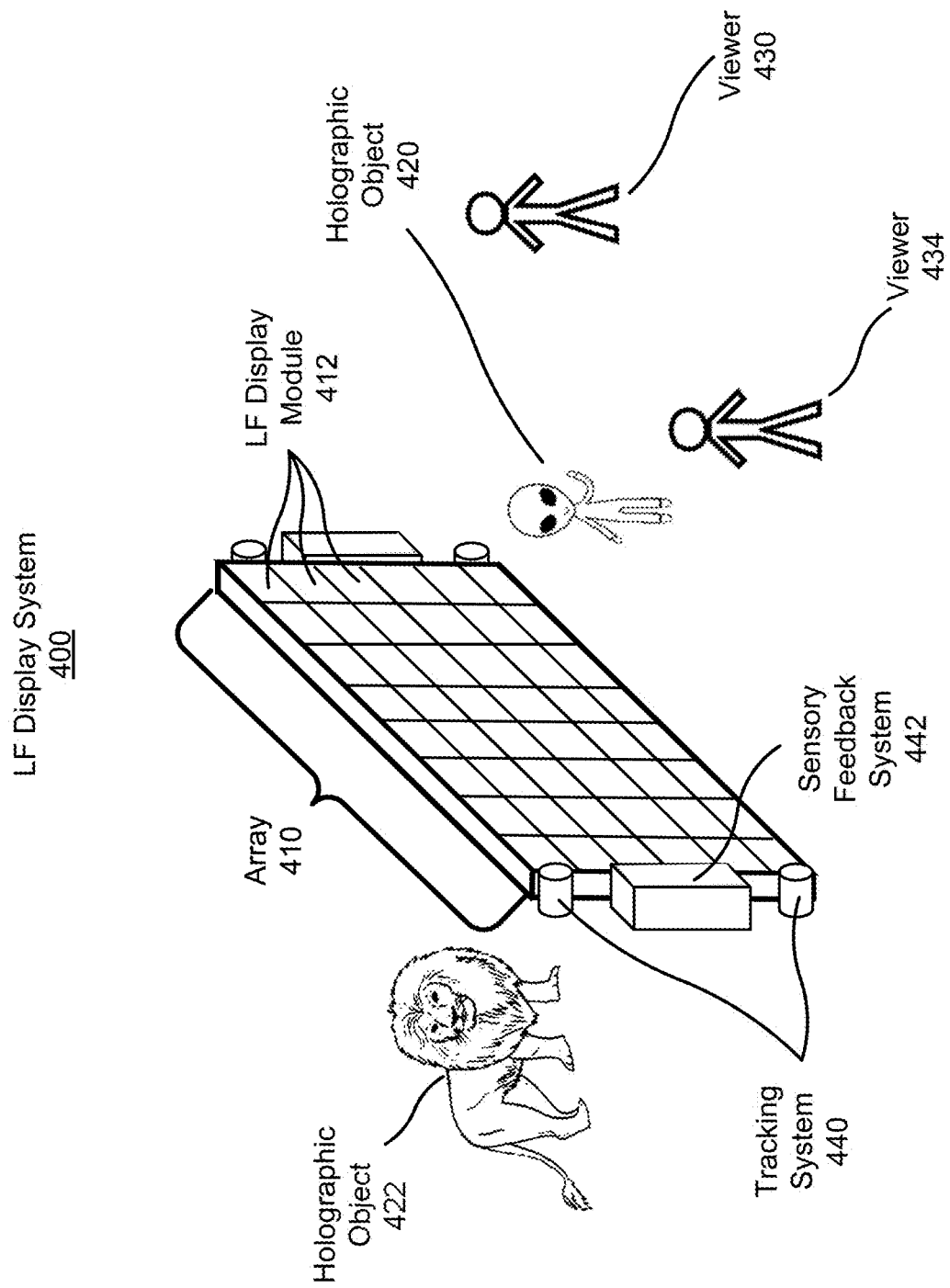
FIG. 4A is a perspective view of portion of a light field display system that is tiled in two dimensions to form a single-sided seamless surface environment, in accordance with one or more embodiments.

FIG. 4A is a perspective view of a portion of LF display system 400 that is tiled in two dimensions to form a single-sided seamless surface environment, in accordance with one or more embodiments. The LF display system 400 includes a plurality of LF display modules that are tiled to form an array 410. More explicitly, each of the small squares in the array 410 represents a tiled LF display module 412. The LF display module 412 may be the same as LF display module 300A or 300B. The array 410 may cover, for example, some or all of a surface (e.g., a wall) of a room. The LF array may cover other surfaces, such as, for example, a table top, a billboard, a rotunda, etc.

The array 410 may project one or more holographic objects. For example, in the illustrated embodiment, the array 410 projects a holographic object 420 and a holographic object 422. Tiling of the LF display modules 412 allows for a much larger viewing volume as well as allows for objects to be projected out farther distances from the array 410. For example, in the illustrated embodiment, the viewing volume is, approximately, the entire area in front of and behind the array 410 rather than a localized volume in front of (and behind) a LF display module 412.

In some embodiments, the LF display system 400 presents the holographic object 420 to a viewer 430 and a viewer 434. The viewer 430 and the viewer 434 receive different perspectives of the holographic object 420. For example, the viewer 430 is presented with a direct view of the holographic object 420, whereas the viewer 434 is presented with a more oblique view of the holographic object 420. As the viewer 430 and/or the viewer 434 move, they are presented with different perspectives of the holographic object 420. This allows a viewer to visually interact with a holographic object by moving relative to the holographic object. For example, as the viewer 430 walks around a holographic object 420, the viewer 430 sees different sides of the holographic object 420 as long as the holographic object 420 remains in the holographic object volume of the array 410. Accordingly, the viewer 430 and the viewer 434 may simultaneously see the holographic object 420 in real-world space as if it is truly there. Additionally, the viewer 430 and the viewer 434 do not need to wear an external device in order to see the holographic object 420, as the holographic object 420 is visible to viewers in much the same way a physical object would be visible. Additionally, here, the holographic object 422 is illustrated behind the array because the viewing volume of the array extends behind the surface of the array. In this manner, the holographic object 422 may be presented to the viewer 430 and/or viewer 434.

In some embodiments, the LF display system 400 may include a tracking system that tracks positions of the viewer 430 and the viewer 434. In some embodiments, the tracked position is the position of a viewer. In other embodiments, the tracked position is that of the eyes of a viewer. The position tracking of the eye is different from gaze tracking which tracks where an eye is looking (e.g., uses orientation to determine gaze location). The eyes of the viewer 430 and the eyes of the viewer 434 are in different locations.

In various configurations, the LF display system 400 may include one or more tracking systems. For example, in the illustrated embodiment of FIG. 4A, LF display system includes a tracking system 440 that is external to the array 410. Here, the tracking system may be a camera system coupled to the array 410. External tracking systems are described in more detail in regard to FIG. 5A. In other example embodiments, the tracking system may be incorporated into the array 410 as described herein. For example, an energy device (e.g., energy device 340) of one or more LF display modules 412 containing a bidirectional energy surface included in the array 410 may be configured to capture images of viewers in front of the array 410. In whichever case, the tracking system(s) of the LF display system 400 determines tracking information about the viewers (e.g., viewer 430 and/or viewer 434) viewing holographic content presented by the array 410.

Tracking information describes a position in space (e.g., relative to the tracking system) for the position of a viewer, or a position of a portion of a viewer (e.g. one or both eyes of a viewer, or the extremities of a viewer). A tracking system may use any number of depth determination techniques to determine tracking information. The depth determination techniques may include, e.g., structured light, time of flight, stereo imaging, some other depth determination technique, or some combination thereof. The tracking system may include various systems configured to determine tracking information. For example, the tracking system may include one or more infrared sources (e.g., structured light sources), one or more imaging sensors that can capture images in the infrared (e.g., red-blue-green-infrared camera), and a processor executing tracking algorithms. The tracking system may use the depth estimation techniques to determine positions of viewers. In some embodiments, the LF display system 400 generates holographic objects based on tracked positions, motions, or gestures of the viewer 430 and/or the viewer 434 as described herein. For example, the LF display system 400 may generate a holographic object responsive to a viewer coming within a threshold distance of the array 410 and/or a particular position.

The LF display system 400 may present one or more holographic objects that are customized to each viewer based in part on the tracking information. For example, the viewer 430 may be presented with the holographic object 420, but not the holographic object 422. Similarly, the viewer 434 may be presented with the holographic object 422, but not the holographic object 420. For example, the LF display system 400 tracks a position of each of the viewer 430 and the viewer 434. The LF display system 400 determines a perspective of a holographic object that should be visible to a viewer based on their position relative to where the holographic object is to be presented. The LF display system 400 selectively projects light from specific pixels that correspond to the determined perspective. Accordingly, the viewer 434 and the viewer 430 can simultaneously have experiences that are, potentially, completely different. In other words, the LF display system 400 may present holographic content to viewing sub-volumes of the viewing volume (i.e., similar to the viewing sub-volumes 290A, 290B, 290C, and 290D shown in FIG. 2B). For example, as illustrated, because the LF display system 400 can track the position of the viewer 430, the LF display system 400 may present space content (e.g., holographic object 420) to a viewing sub-volume surrounding the viewer 430 and safari content (e.g., holographic object 422) to a viewing sub-volume surrounding the viewer 434. In contrast, conventional systems would have to use individual headsets to provide a similar experience.

In some embodiments the LF display system 400 may include one or more sensory feedback systems. The sensory feedback systems provide other sensory stimuli (e.g., tactile, audio, or smell) that augment the holographic objects 420 and 422. For example, in the illustrated embodiment of FIG. 4A, the LF display system 400 includes a sensory feedback system 442 external to the array 410. In one example, the sensory feedback system 442 may be an electrostatic speaker coupled to the array 410. External sensory feedback systems are described in more detail in regard to FIG. 5A. In other example embodiments, the sensory feedback system may be incorporated into the array 410 as described herein. For example, an energy device (e.g., energy device 340A in FIG. 3B) of a LF display module 412 included in the array 410 may be configured to project ultrasonic energy to viewers in front of the array and/or receive imaging information from viewers in front of the array. In whichever case, the sensory feedback system presents and/or receives sensory content to/from the viewers (e.g., viewer 430 and/or viewer 434) viewing holographic content (e.g., holographic object 420 and/or holographic objected 422) presented by the array 410.

The LF display system 400 may include a sensory feedback system 442 that includes one or more acoustic projection devices external to the array. Alternatively or additionally, the LF display system 400 may include one or more acoustic projection devices integrated into the array 410 as described herein. The acoustic projection devices may consist of an array of ultrasonic sources configured to project a volumetric tactile surface. In some embodiments, the tactile surface may be coincident with a holographic object (e.g., at a surface of the holographic object 420) for one or more surfaces of a holographic object if a portion of a viewer gets within a threshold distance of the one or more surfaces. The volumetric tactile sensation may allow the user to touch and feel surfaces of the holographic object. The plurality of acoustic projection devices may also project an audible pressure wave that provides audio content (e.g., immersive audio) to viewers. Accordingly, the ultrasonic pressure waves and/or the audible pressure waves can act to complement a holographic object.

In various embodiments, the LF display system 400 may provide other sensory stimuli based in part on a tracked position of a viewer. For example, the holographic object 422 illustrated in FIG. 4A is a lion, and the LF display system 400 may have the holographic object 422 roar both visually (i.e., the holographic object 422 appears to roar) and audibly (i.e., one or more acoustic projection devices project a pressure wave that the viewer 430 perceives as a lion's roar emanating from the holographic object 422.

Note that, in the illustrated configuration, the holographic viewing volume may be limited in a manner similar to the viewing volume 285 of the LF display system 200 in FIG. 2. This can limit the amount of perceived immersion that a viewer will experience with a single wall display unit. One way to address this is to use multiple LF display modules that are tiled along multiple sides as described below with respect to FIG. 4B-4F.

Figure 4B:
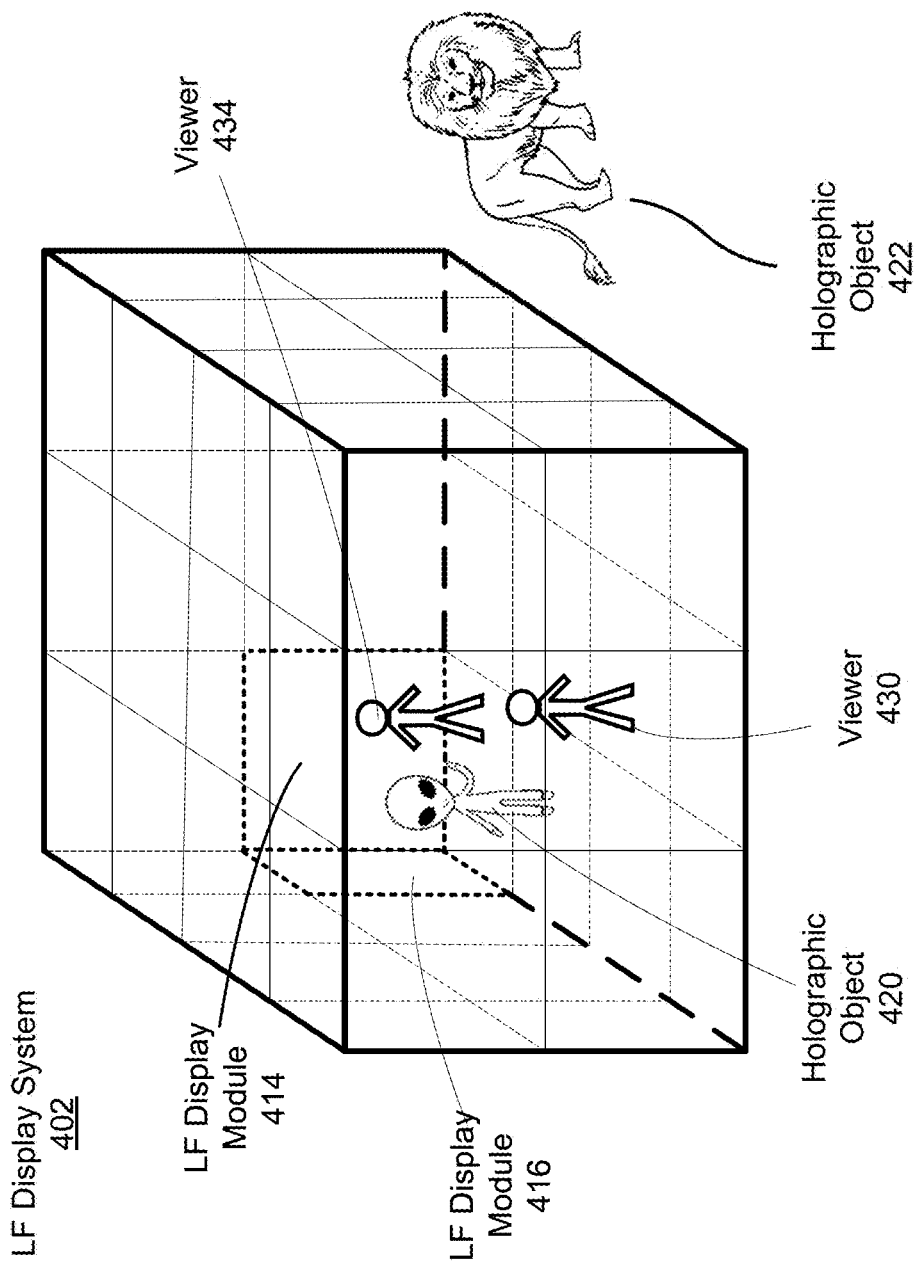
FIG. 4B is a perspective view of a portion of light field display system in a multi-sided seamless surface environment, in accordance with one or more embodiments.

FIG. 4B is a perspective view of a portion of a LF display system 402 in a multi-sided seamless surface environment, in accordance with one or more embodiments. The LF display system 402 is substantially similar to the LF display system 400 except that the plurality of LF display modules are tiled to create a multi-sided seamless surface environment. More specifically, the LF display modules are tiled to form an array that is a six-sided aggregated seamless surface environment. In FIG. 4B, the plurality of LF display modules cover all the walls, the ceiling, and the floor of a room. In other embodiments, the plurality of LF display modules may cover some, but not all of a wall, a floor, a ceiling, or some combination thereof. In other embodiments, a plurality of LF display modules are tiled to form some other aggregated seamless surface. For example, the walls may be curved such that a cylindrical aggregated energy environment is formed. Moreover, as described below with regard to FIGS. 6-9, in some embodiments, the LF display modules may be tiled to form a surface in a cinema (e.g., walls, etc.).

The LF display system 402 may project one or more holographic objects. For example, in the illustrated embodiment the LF display system 402 projects the holographic object 420 into an area enclosed by the six-sided aggregated seamless surface environment. In this example, the viewing volume of the LF display system is also contained within the six-sided aggregated seamless surface environment. Note that, in the illustrated configuration, the viewer 434 may be positioned between the holographic object 420 and a LF display module 414 that is projecting energy (e.g., light and/or pressure waves) that is used to form the holographic object 420. Accordingly, the positioning of the viewer 434 may prevent the viewer 430 from perceiving the holographic object 420 formed from energy from the LF display module 414. However, in the illustrated configuration there is at least one other LF display module, e.g., a LF display module 416, that is unobstructed (e.g., by the viewer 434) and can project energy to form the holographic object 420 and be observed by viewer 430. In this manner, occlusion by viewers in the space can cause some portion of the holographic projections to disappear, but the effect is much less than if only one side of the volume was populated with holographic display panels. Holographic object 422 is illustrated "outside" the walls of the six-sided aggregated seamless surface environment because the holographic object volume extends behind the aggregated surface. Thus, the viewer 430 and/or the viewer 434 can perceive the holographic object 422 as "outside" of the enclosed six-sided environment which they can move throughout.

As described above in reference to FIG. 4A, in some embodiments, the LF display system 402 actively tracks positions of viewers and may dynamically instruct different LF display modules to present holographic content based on the tracked positions. Accordingly, a multi-sided configuration can provide a more robust environment (e.g., relative to FIG. 4A) for providing holographic objects where unconstrained viewers are free to move throughout the area enclosed by the multi-sided seamless surface environment.

Notably, various LF display systems may have different configurations. Further, each configuration may have a particular orientation of surfaces that, in aggregate, form a seamless display surface ("aggregate surface"). That is, the LF display modules of a LF display system can be tiled to form a variety of aggregate surfaces. For example, in FIG. 4B, the LF display system 402 includes LF display modules tiled to form a six-sided aggregate surface that approximates the walls of a room. In some other examples, an aggregate surface may only occur on a portion of a surface (e.g., half of a wall) rather than a whole surface (e.g., an entire wall). Some examples are described herein.

In some configurations, the aggregate surface of a LF display system may include an aggregate surface configured to project energy towards a localized viewing volume. Projecting energy to a localized viewing volume allows for a higher quality viewing experience by, for example, increasing the density of projected energy in a specific viewing volume, increasing the FOV for the viewers in that volume, and bringing the viewing volume closer to the display surface.

Figure 4C:
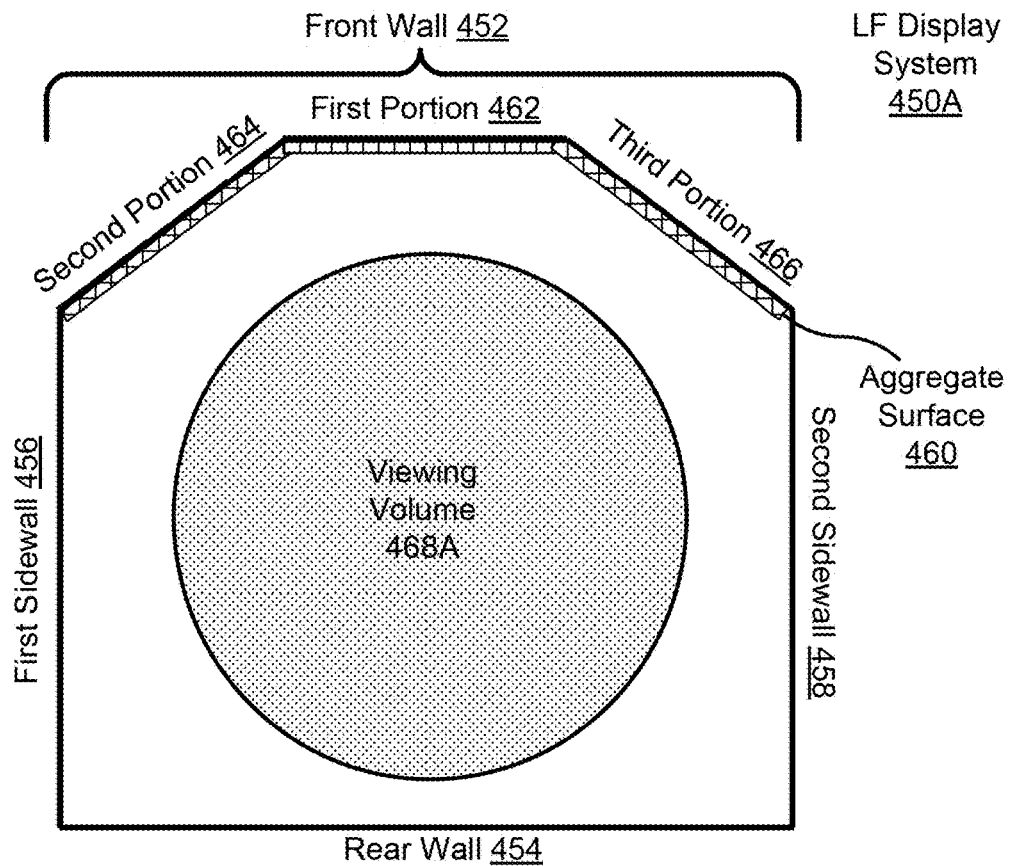
FIG. 4C is a top-down view of a light field display system with an aggregate surface in a winged configuration, in accordance with one or more embodiments.
Figure 4D:
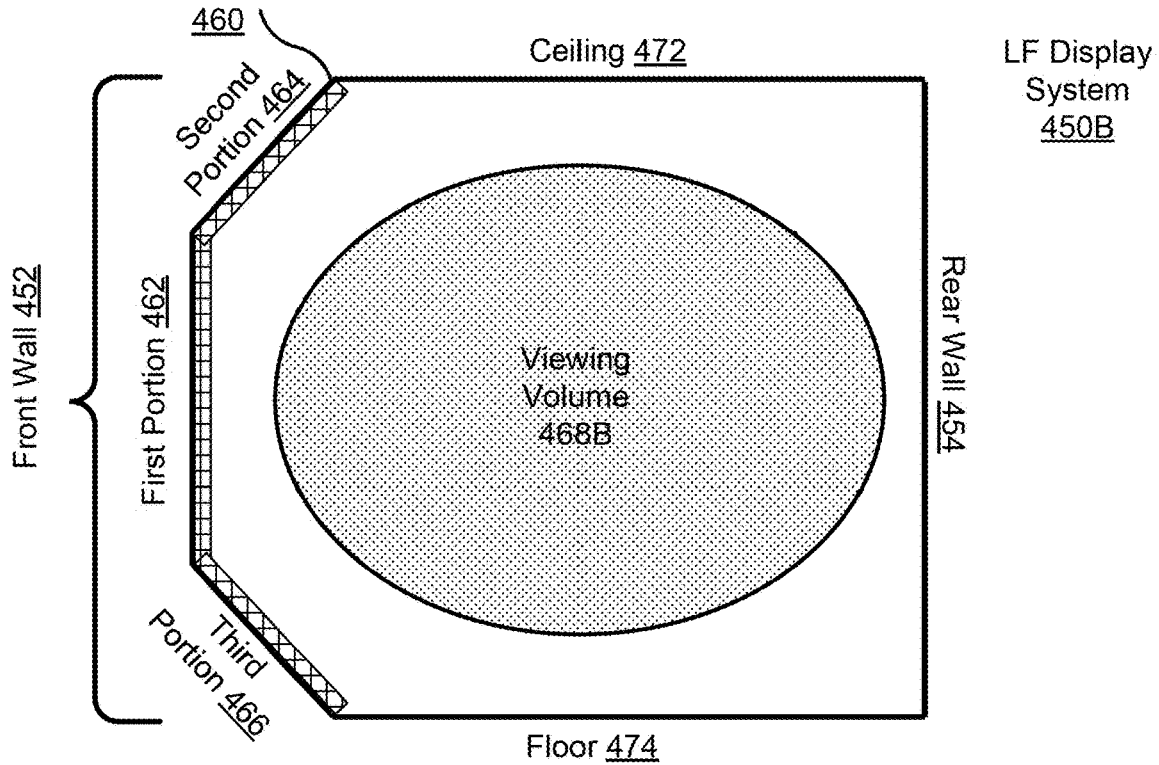
FIG. 4D is a side view of a light field display system with an aggregate surface in a sloped configuration, in accordance with one or more embodiments.

For example, FIG. 4C illustrates top down view of a LF display system 450A with an aggregate surface in a "winged" configuration. In this example, the LF display system 450A is located in a room with a front wall 452, a rear wall 454, a first sidewall 456, a second sidewall 458, a ceiling (not shown), and a floor (not shown). The first sidewall 456, the second sidewall 458, the rear wall 454, floor, and the ceiling are all orthogonal. The LF display system 450A includes LF display modules tiled to form an aggregate surface 460 covering the front wall. The front wall 452, and thus the aggregate surface 460, includes three portions: (i) a first portion 462 approximately parallel with the rear wall 454 (i.e., a central surface), (ii) a second portion 464 connecting the first portion 462 to the first sidewall 456 and placed at an angle to project energy towards the center of the room (i.e., a first side surface), and (iii) a third portion 466 connecting the first portion 462 to the second sidewall 458 and placed at an angle to project energy towards the center of the room (i.e., a second side surface). The first portion is a vertical plane in the room and has a horizontal and a vertical axis. The second and third portions are angled towards the center of the room along the horizontal axis.

In this example, the viewing volume 468A of the LF display system 450A is in the center of the room and partially surrounded by the three portions of the aggregate surface 460. An aggregate surface that at least partially surrounds a viewer ("surrounding surface") increases the immersive experience of the viewers.

To illustrate, consider, for example, an aggregate surface with only a central surface. Referring to FIG. 2A, the rays that are projected from either end of the display surface create an ideal holographic volume and ideal viewing volumes as described above. Now consider, for example, if the central surface included two side surfaces angled towards the viewer. In this case, ray 256 and ray 257 would be projected at a greater angle from a normal of the central surface. Thus, the field of view of the viewing volume would increase. Similarly, the holographic viewing volume would be nearer the display surface. Additionally, because the two second and third portions tilted nearer the viewing volume, the holographic objects that are projected at a fixed distance from the display surface are closer to that viewing volume.

To simplify, a display surface with only a central surface has a planar field of view, a planar threshold separation between the (central) display surface and the viewing volume, and a planar proximity between a holographic object and the viewing volume. Adding one or more side surfaces angled towards the viewer increases the field of view relative to the planar field of view, decreases the separation between the display surface and the viewing volume relative to the planar separation, and increases the proximity between the display surface and a holographic object relative to the planar proximity. Further angling the side surfaces towards the viewer further increases the field of view, decreases the separation, and increases the proximity. In other words, the angled placement of the side surfaces increases the immersive experience for viewers.

Additionally, as described below in regards to FIG. 6, deflection optics may be used to optimize the size and position of the viewing volume for LF display parameters (e.g., dimensions and FOV).

Returning to FIG. 4D, in a similar example, FIG. 4D illustrates a side view of a LF display system 450B with an aggregate surface in a "sloped" configuration. In this example, the LF display system 450B is located in a room with a front wall 452, a rear wall 454, a first sidewall (not shown), a second sidewall (not shown), a ceiling 472, and a floor 474. The first sidewall, the second sidewall, the rear wall 454, floor 474, and the ceiling 472 are all orthogonal. The LF display system 450B includes LF display modules tiled to form an aggregate surface 460 covering the front wall. The front wall 452, and thus the aggregate surface 460, includes three portions: (i) a first portion 462 approximately parallel with the rear wall 454 (i.e., a central surface), (ii) a second portion 464 connecting the first portion 462 to the ceiling 472 and angled to project energy towards the center of the room (i.e., a first side surface), and (iii) a third portion 464 connecting the first portion 462 to the floor 474 and angled to project energy towards the center of the room (i.e., a second side surface). The first portion is a vertical plane in the room and has a horizontal and a vertical axis. The second and third portions are angled towards the center of the room along the vertical axis.

In this example, the viewing volume 468B of the LF display system 450B is in the center of the room and partially surrounded by the three portions of the aggregate surface 460. Similar to the configuration shown in FIG. 4C, the two side portions (e.g., second portion 464, and third portion 466) are angled to surround the viewer and form a surrounding surface. The surrounding surface increases the viewing FOV from the perspective of any viewer in the holographic viewing volume 468B. Additionally, the surrounding surface allows the viewing volume 468B to be closer to the surface of the displays such that projected objects appear closer. In other words, the angled placement of the side surfaces increases the field of view, decreases the separation, and increases the proximity of the aggregate surface, thereby increasing the immersive experience for viewers. Further, as will be discussed below, deflection optics may be used to optimize the size and position of the viewing volume 468B.

The sloped configuration of the side portions of the aggregate surface 460 enables holographic content to be presented closer to the viewing volume 468B than if the third portion 466 was not sloped. For example, the lower extremities (e.g., legs) of a character presented form a LF display system in a sloped configuration may seem closer and more realistic than if a LF display system with a flat front wall were used.

Additionally, the configuration of the LF display system and the environment which it is located may inform the shape and locations of the viewing volumes and viewing sub-volumes.

Figure 4E:
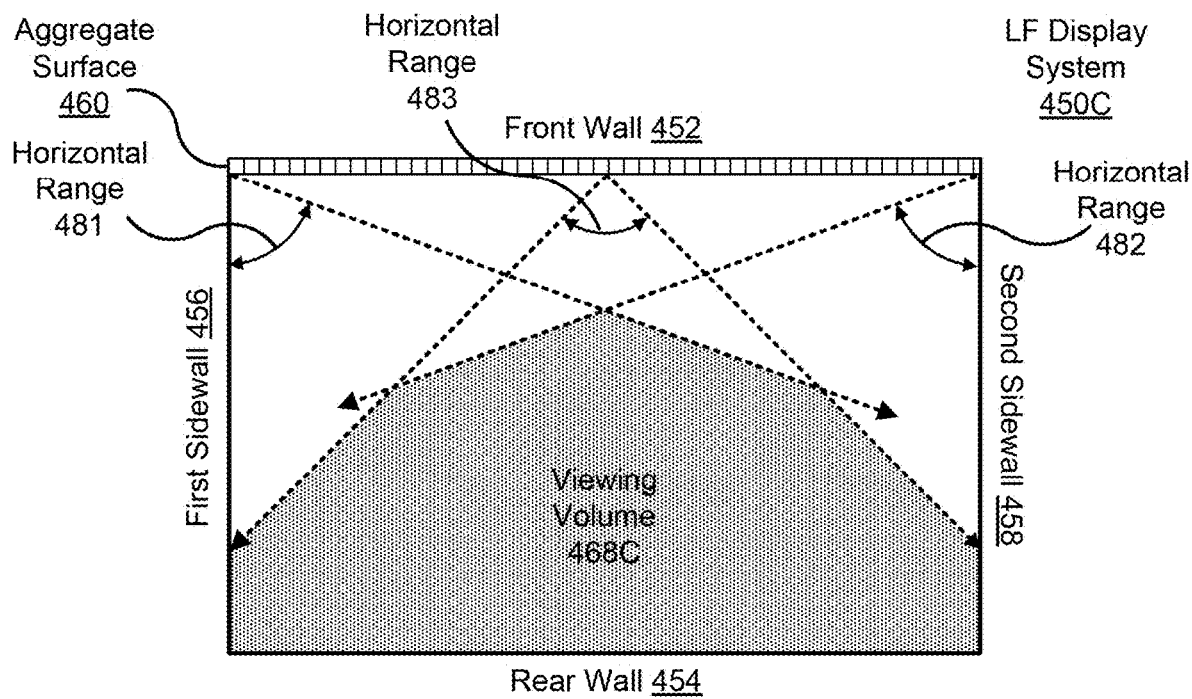
FIG. 4E is a top-down view of a light field display system with an aggregate surface on a front wall of a room, in accordance with one or more embodiments.

FIG. 4E, for example, illustrates a top down view of a LF display system 450C with an aggregate surface 460 on a front wall 452 of a room. In this example, the LF display system 450D is located in a room with a front wall 452, a rear wall 454, a first sidewall 456, a second sidewall 458, a ceiling (not shown), and a floor (not shown).

LF display system 450C projects various rays from the aggregate surface 460. From each position on the display surface, light rays are projected in an angular range that is centered on the viewing volume. The rays projected from the left side of the aggregate surface 460 have horizontal angular range 481, rays projected from the right side of the aggregate surface have horizontal angular range 482, and rays projected from the center of the aggregate surface 460 have horizontal angular range 483. In between these points, the projected rays may take on intermediate values of angle ranges as described below in regard to FIG. 6. Having a gradient deflection angle in the projected rays across the display surface in this manner creates a viewing volume 468C. Further, this configuration avoids wasting resolution of the display on projecting rays into the side walls 456 and 458.

Figure 4F:
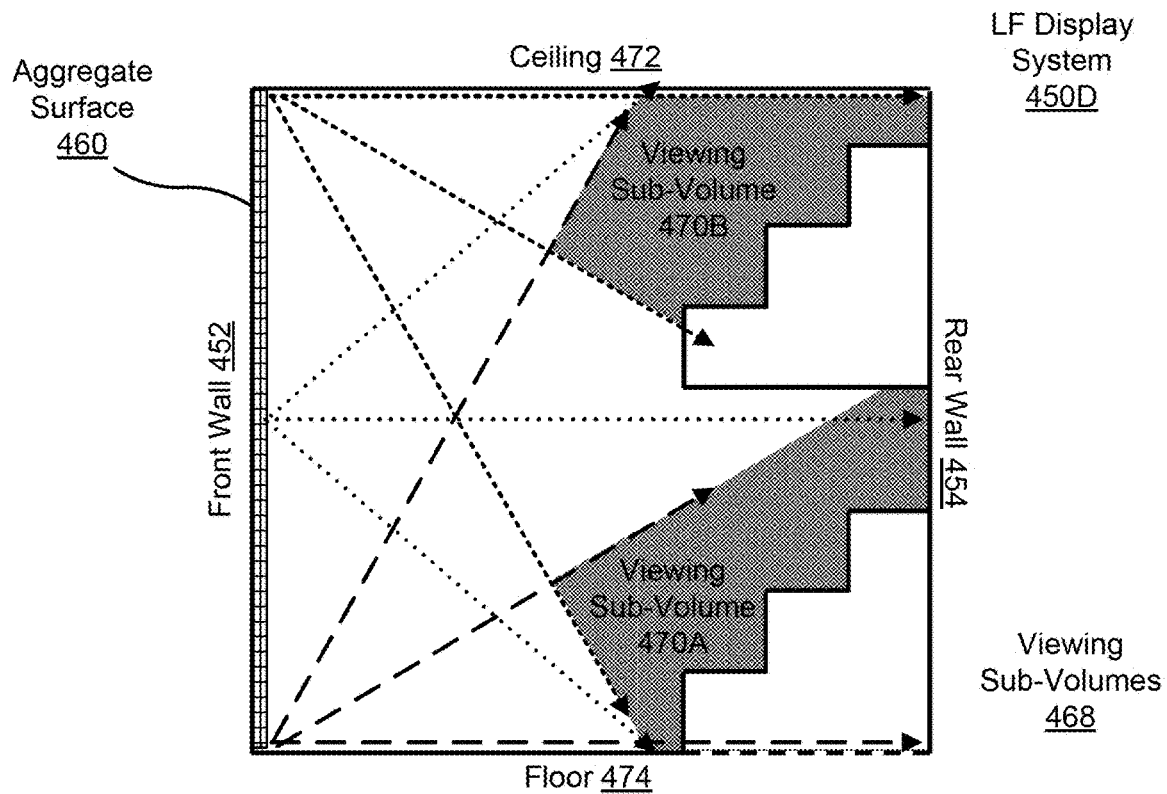
FIG. 4F is a side view of a side view of a LF display system with an aggregate surface on the front wall of the room, in accordance with one or more embodiments.

FIG. 4F illustrates a side view of a LF display system 450D with an aggregate surface 460 on a front wall 452 of a room. In this example, the LF display system 450E is located in a room with a front wall 452, a rear wall 454, a first sidewall (not shown), a second sidewall (not shown), a ceiling 472, and a floor 474. In this example, the floor is tiered such that each tier rises in steps moving from the front wall to the back wall. Here, each tier of the floor includes a viewing sub-volume (e.g., viewing sub volume 470A and 470B). A tiered floor allows for viewing sub-volumes that do not overlap. That is, each viewing sub-volume has a line of sight from the viewing sub-volume to the aggregate surface 460 that does not pass through another viewing sub-volume. In other words, this orientation produces a "stadium seating" effect in which the vertical offset between tiers allows each tier to "see over" the viewing sub-volumes of other tiers. LF display systems including viewing sub-volumes that do not overlap may provide a higher quality viewing experience than LF display systems that have viewing volumes that do overlap. For example, in the configuration shown in FIG. 4F, different holographic content may be projected to the audiences in viewing sub-volumes 470A and 470B.

Control of a LF Display System

Figure 5A:
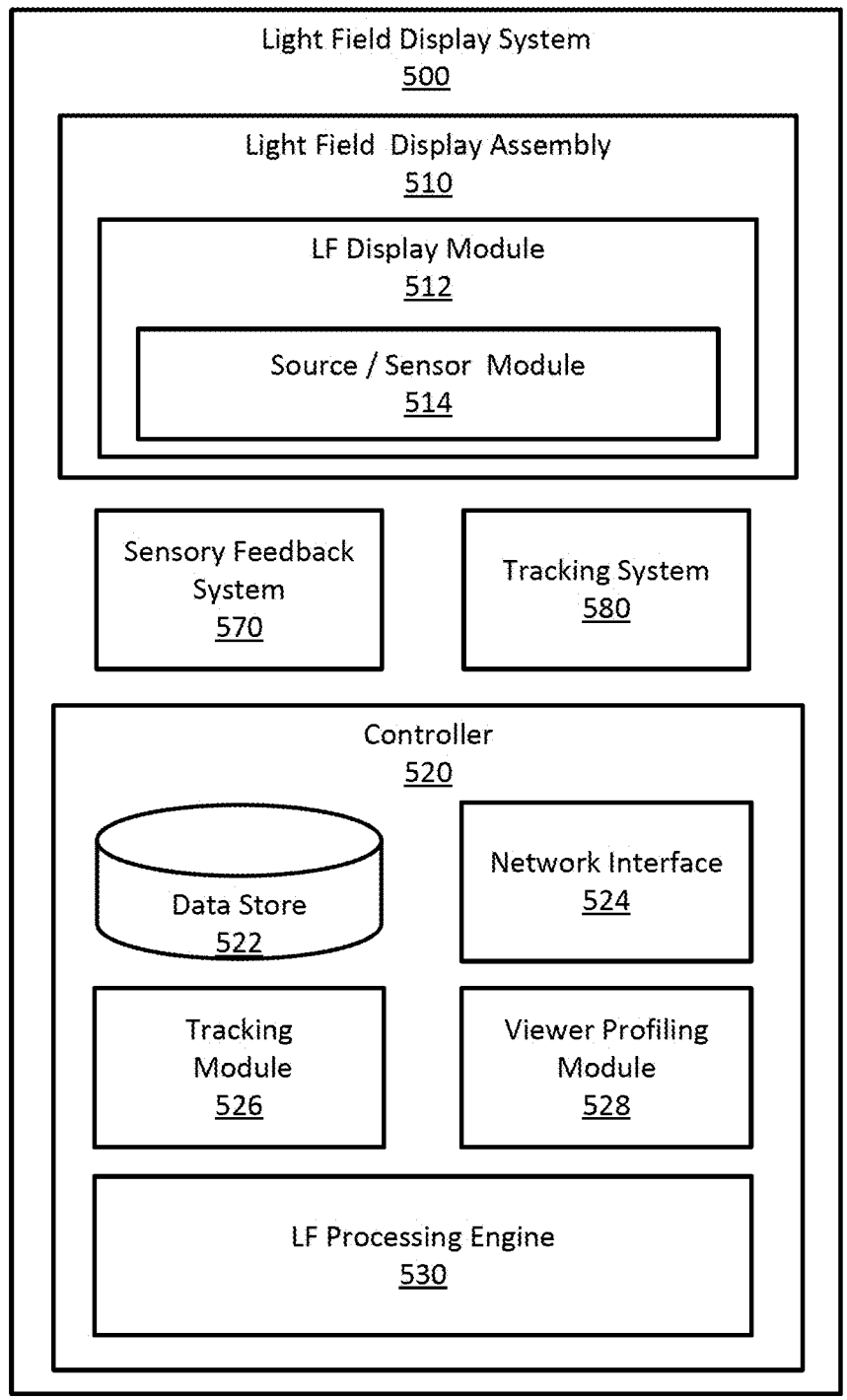
FIG. 5A is a block diagram of a light field display system, in accordance with one or more embodiments.

FIG. 5A is a block diagram of a LF display system 500, in accordance with one or more embodiments. The LF display system 500 comprises a LF display assembly 510 and a controller 520. The LF display assembly 510 includes one or more LF display modules 512 which project a light field. A LF display module 512 may include a source/sensor system 514 that includes an integrated energy source(s) and/or energy sensor(s) which project and/or sense other types of energy. The controller 520 includes a datastore 522, a network interface 524, and a LF processing engine 530. The controller 520 may also include a tracking module 526, and a viewer profiling module 528. In some embodiments, the LF display system 500 also includes a sensory feedback system 570 and a tracking system 580. The LF display systems described in the context of FIGS. 1, 2, 3, and 4 are embodiments of the LF display system 500. In other embodiments, the LF display system 500 comprises additional or fewer modules than those described herein. Similarly, the functions can be distributed among the modules and/or different entities in a different manner than is described here. Applications of the LF display system 500 are also discussed in detail below with regard to FIGS. 6-10.

The LF display assembly 510 provides holographic content in a holographic object volume that may be visible to viewers located within a viewing volume. The LF display assembly 510 may provide holographic content by executing display instructions received from the controller 520. The holographic content may include one or more holographic objects that are projected in front of an aggregate surface the LF display assembly 510, behind the aggregate surface of the LF display assembly 510, or some combination thereof. Generating display instructions with the controller 520 is described in more detail below.

The LF display assembly 510 provides holographic content using one or more LF display modules (e.g., any of the LF display module 110, the LF display system 200, and LF display module 300) included in an LF display assembly 510. For convenience, the one or more LF display modules may be described herein as LF display module 512. The LF display module 512 can be tiled to form a LF display assembly 510. The LF display modules 512 may be structured as various seamless surface environments (e.g., single sided, multi-sided, a wall of a cinema, a curved surface, etc.). That is, the tiled LF display modules form an aggregate surface. As previously described, a LF display module 512 includes an energy device layer (e.g., energy device layer 220) and an energy waveguide layer (e.g., energy waveguide layer 240) that present holographic content. The LF display module 512 may also include an energy relay layer (e.g., energy relay layer 230) that transfers energy between the energy device layer and the energy waveguide layer when presenting holographic content.

The LF display module 512 may also include other integrated systems configured for energy projection and/or energy sensing as previously described. For example, a light field display module 512 may include any number of energy devices (e.g., energy device 340) configured to project and/or sense energy. For convenience, the integrated energy projection systems and integrated energy sensing systems of the LF display module 512 may be described herein, in aggregate, as the source/sensor system 514. The source/sensor system 514 is integrated within the LF display module 512, such that the source/sensor system 514 shares the same seamless energy surface with LF display module 512. In other words, the aggregate surface of an LF display assembly 510 includes the functionality of both the LF display module 512 and the source/sensor module 514. That is, an LF assembly 510 including a LF display module 512 with a source/sensor system 514 may project energy and/or sense energy while simultaneously projecting a light field. For example, the LF display assembly 510 may include a LF display module 512 and source/sensor system 514 configured as a dual-energy surface or bidirectional energy surface as previously described.

In some embodiments, the LF display system 500 augments the generated holographic content with other sensory content (e.g., coordinated touch, audio, or smell) using a sensory feedback system 570. The sensory feedback system 570 may augment the projection of holographic content by executing display instructions received from the controller 520. Generally, the sensory feedback system 570 includes any number of sensory feedback devices external to the LF display assembly 510 (e.g., sensory feedback system 442). Some example sensory feedback devices may include coordinated acoustic projecting and receiving devices, aroma projecting devices, temperature adjustment devices, force actuation devices, pressure sensors, transducers, etc. In some cases, the sensory feedback system 570 may have similar functionality to the light field display assembly 510 and vice versa. For example, both a sensory feedback system 570 and a light field display assembly 510 may be configured to generate a sound field. As another example, the sensory feedback system 570 may be configured to generate haptic surfaces while the light field display 510 assembly is not.

To illustrate, in an example embodiment of a light field display system 500, a sensory feedback system 570 may include one or more acoustic projection devices. The one or more acoustic projection devices are configured to generate one or more pressure waves that complement the holographic content when executing display instructions received from the controller 520. The generated pressure waves may be, e.g., audible (for sound), ultrasonic (for touch), or some combination thereof. Similarly, the sensory feedback system 570 may include an aroma projecting device. The aroma projecting device may be configured to provide scents to some, or all, of the target area when executing display instructions received from the controller. The aroma devices may be tied into an air circulation system (e.g., ducting, fans, or vents) to coordinate air flow within the target area. Further, the sensory feedback system 570 may include a temperature adjustment device. The temperature adjustment device is configured to increase or decrease temperature in some, or all, of the target area when executing display instructions received from the controller 520.

In some embodiments, the sensory feedback system 570 is configured to receive input from viewers of the LF display system 500. In this case, the sensory feedback system 570 includes various sensory feedback devices for receiving input from viewers. The sensor feedback devices may include devices such as acoustic receiving devices (e.g., a microphone), pressure sensors, joysticks, motion detectors, transducers, etc. The sensory feedback system may transmit the detected input to the controller 520 to coordinate generating holographic content and/or sensory feedback.

To illustrate, in an example embodiment of a light field display assembly, a sensory feedback system 570 includes a microphone. The microphone is configured to record audio produced by one or more viewers (e.g., gasps, screams, laughter, etc.). The sensory feedback system 570 provides the recorded audio to the controller 520 as viewer input. The controller 520 may use the viewer input to generate holographic content. Similarly, the sensory feedback system 570 may include a pressure sensor. The pressure sensor is configured to measure forces applied by viewers to the pressure sensor. The sensory feedback system 570 may provide the measured forces to the controller 520 as viewer input.

In some embodiments, the LF display system 500 includes a tracking system 580. The tracking system 580 includes any number of tracking devices configured to determine the position, movement and/or characteristics of viewers in the target area. Generally, the tracking devices are external to the LF display assembly 510. Some example tracking devices include a camera assembly ("camera"), a depth sensor, structured light, a LIDAR system, a card scanning system, or any other tracking device that can track viewers within a target area.

The tracking system 580 may include one or more energy sources that illuminate some or all of the target area with light. However, in some cases, the target area is illuminated with natural light and/or ambient light from the LF display assembly 510 when presenting holographic content. The energy source projects light when executing instructions received from the controller 520. The light may be, e.g., a structured light pattern, a pulse of light (e.g., an IR flash), or some combination thereof. The tracking system may project light in the visible band (~380 nm to 750 nm), in the infrared (IR) band (~750 nm to 1700 nm), in the ultraviolet band (10 nm to 380 nm), some other portion of the electromagnetic spectrum, or some combination thereof. A source may include, e.g., a light emitted diode (LED), a micro LED, a laser diode, a TOF depth sensor, a tunable laser, etc.

The tracking system 580 may adjust one or more emission parameter when executing instructions received from the controller 520. An emission parameter is a parameter that affects how light is projected from a source of the tracking system 580. An emission parameter may include, e.g., brightness, pulse rate (to include continuous illumination), wavelength, pulse length, some other parameter that affects how light is projected from the source assembly, or some combination thereof. In one embodiment, a source projects pulses of light in a time-of-flight operation.

The camera of the tracking system 580 captures images of the light (e.g., structured light pattern) reflected from the target area. The camera captures images when executing tracking instructions received from the controller 520. As previously described, the light may be projected by a source of the tracking system 580. The camera may include one or more cameras. That is, a camera may be, e.g., an array (1D or 2D) of photodiodes, a CCD sensor, a CMOS sensor, some other device that detects some or all of the light project by the tracking system 580, or some combination thereof. In an embodiment, the tracking system 580 may contain a light field camera external to the LF display assembly 510. In other embodiments, the cameras are included as part of the LF display source/sensor module 514 included in the LF display assembly 510. For example, as previously described, if the energy relay element of a light field module 512 is a bidirectional energy layer which interleaves both emissive displays and imaging sensors at the energy device layer 220, the LF display assembly 510 can be configured to simultaneously project light fields and record imaging information from the viewing area in front of the display. In one embodiment, the captured images from the bidirectional energy surface form a light field camera. The camera provides captured images to the controller 520.

The camera of the tracking system 580 may adjust one or more imaging parameters when executing tracking instructions received from the controller 520. An imaging parameter is a parameter that affects how the camera captures images. An imaging parameter may include, e.g., frame rate, aperture, gain, exposure length, frame timing, rolling shutter or global shutter capture modes, some other parameter that affects how the camera captures images, or some combination thereof.

The controller 520 controls the LF display assembly 510 and any other components of the LF display system 500. The controller 520 comprises a data store 522, a network interface 524, a tracking module 526, a viewer profiling module 528, and a light field processing engine 530. In other embodiments, the controller 520 comprises additional or fewer modules than those described herein. Similarly, the functions can be distributed among the modules and/or different entities in a different manner than is described here. For example, the tracking module 526 may be part of the LF display assembly 510 or the tracking system 580.

The data store 522 is a memory that stores information for the LF display system 500. The stored information may include display instructions, tracking instructions, emission parameters, imaging parameters, a virtual model of a target area, tracking information, images captured by the camera, one or more viewer profiles, calibration data for the light field display assembly 510, configuration data for the LF display system 510 including resolution and orientation of LF modules 512, desired viewing volume geometry, content for graphics creation including 3D models, scenes and environments, materials and textures, other information that may be used by the LF display system 500, or some combination thereof. The data store 522 is a memory, such as a read only memory (ROM), dynamic random access memory (DRAM), static random access memory (SRAM), or some combination thereof.

The network interface 524 allows the light field display system to communicate with other systems or environments via a network. In one example, the LF display system 500 receives holographic content from a remote light field display system via the network interface 524. In another example, the LF display system 500 transmits holographic content to a remote data store using the network interface 524.

The tracking module 526 tracks viewers viewing content presented by the LF display system 500. To do so, the tracking module 526 generates tracking instructions that control operation of the source(s) and/or the camera(s) of the tracking system 580, and provides the tracking instructions to the tracking system 580. The tracking system 580 executes the tracking instructions and provides tracking input to the tracking module 526.

The tracking module 526 may determine a position of one or more viewers within the target area (e.g., sitting in the seats of a cinema). The determined position may be relative to, e.g., some reference point (e.g., a display surface). In other embodiments, the determined position may be within the virtual model of the target area. The tracked position may be, e.g., the tracked position of a viewer and/or a tracked position of a portion of a viewer (e.g., eye location, hand location, etc.). The tracking module 526 determines the position using one or more captured images from the cameras of the tracking system 580. The cameras of the tracking system 580 may be distributed about the LF display system 500, and can capture images in stereo, allowing for the tracking module 526 to passively track viewers. In other embodiments, the tracking module 526 actively tracks viewers. That is, the tracking system 580 illuminates some portion of the target area, images the target area, and the tracking module 526 uses time of flight and/or structured light depth determination techniques to determine position. The tracking module 526 generates tracking information using the determined positions.

The tracking module 526 may also receive tracking information as inputs from viewers of the LF display system 500. The tracking information may include body movements that correspond to various input options that the viewer is provided by the LF display system 500. For example, the tracking module 526 may track a viewer's body movement and assign any various movement as an input to the LF processing engine 530. The tracking module 526 may provide the tracking information to the data store 522, the LF processing engine 530, the viewer profiling module 528, any other component of the LF display system 500, or some combination thereof.

To provide context for the tracking module 526, consider an example embodiment of an LF display system 500 that displays a film in which a character in the movie scores a winning touchdown. In response to the scene, a viewer first pumps the air to show their excitement. The tracking system 580 may record the movement of the viewer's hands and transmit the recording to the tracking module 526. The tracking module 526 tracks the motion of the viewer's hands in the recording and sends the input to LF processing engine 530. The viewer profiling module 528, as described below, determines that information in the image indicates that motion of the viewer's hands are associated with a positive response. Accordingly, if enough viewers are recognized having a positive response, the LF processing engine 530 generates appropriate holographic content to celebrate the touchdown. For example, the LF processing engine 530 may project confetti in the scene.

The LF display system 500 includes a viewer profiling module 528 configured to identify and profile viewers. The viewer profiling module 528 generates a profile of a viewer (or viewers) that views holographic content displayed by a LF display system 500. The viewer profiling module 528 generates a viewer profile based, in part, on viewer input and monitored viewer behavior, actions, and reactions. The viewer profiling module 528 can access information obtained from tracking system 580 (e.g., recorded images, videos, sound, etc.) and process that information to determine various information. In various examples, viewer profiling module 528 can use any number of machine vision or machine hearing algorithms to determine viewer behavior, actions, and reactions. Monitored viewer behavior can include, for example, smiles, cheering, clapping, laughing, fright, screams, excitement levels, recoiling, other changes in gestures, or movement by the viewers, etc.

More generally, a viewer profile may include any information received and/or determined about a viewer viewing holographic content from the LF display system. For example, each viewer profile may log actions or responses of that viewer to the content displayed by the LF display system 500. Some example information that can be included in a viewer profile are provided below.

In some embodiments, a viewer profile may describe a response of a viewer with respect to a displayed character, an actor, a scene, etc. For example, a viewer profile may indicate that a viewer generally has positive response to films that display handsome male actors between 25 and 35 years old.

In some embodiments, a viewer profile can indicate characteristics of a viewer viewing a film. For example, a viewer in a cinema is wearing a sweatshirt displaying a university logo. In this case, the viewer profile can indicate that the viewer is wearing a sweatshirt and may prefer holographic content associated with the university whose logo is on the sweatshirt. More broadly, viewer characteristics that can be indicated in a viewer profile may include, for example, age, sex, ethnicity, clothing, viewing location in the venue, etc.

In some embodiments, a viewer profile can indicate preferences for a viewer in regard to desirable film and/or cinema characteristics. For example, a viewer profile may indicate that a viewer prefers only to view holographic content that is age appropriate for everyone in their family. In another example, a viewer profile may indicate holographic object volumes to display holographic content (e.g., on a wall) and holographic object volumes to not display holographic content (e.g., above their head). The viewer profile may also indicate that the viewer prefers to have haptic interfaces presented near them, or prefers to avoid them.

In another example, a viewer profile indicates a history of films viewed for a particular viewer. For instance, viewer profiling module 528 determines that a viewer, or group of viewers, has previously attended a film. As such the LF display system 500 may display holographic content that is different than the previous time the viewers attended the film. As one example, a film including holographic content may have three different endings and LF display system 500 may display different endings based on the viewers in attendance. In another example, each of the three endings may be presented to different viewing volumes in the same cinema.

In some embodiments, a viewer profile may also describe characteristics and preferences for a group of viewers rather than a particular viewer. For example, viewer profiling module 528 may generate a viewer profile for the audience viewing a film in the cinema. In one example, viewer profiling module 528 creates a viewer profile for viewers viewing a film about a teenager falling in love with a vampire. The profile indicates that 86.3% of the viewers are women between the age of 20 and 35 and have a positive response to the film. The profile also indicates that the remaining 23.7% of the viewers are men between the ages of 20 and 35 and are having a negative reaction to the film. Any of the previously described information and characteristics may be applied to a group of viewers.

The viewer profiling module 528 may also access a profile associated with a particular viewer (or viewers) from a third-party system or systems to build a viewer profile. For example, a viewer purchases a ticket for a film using a third-party vendor that is linked to that viewer's social media account. Thus, the viewer's ticket is linked to his social media account. When the viewer enters a venue for the performance using their ticket, the viewer profiling module 528 can access information from his social media account to build (or augment) a viewer profile.

In some embodiments, the data store 522 includes a viewer profile store that stores viewer profiles generated, updated, and/or maintained by the viewer profiling module 528. The viewer profile can be updated in the data store at any time by the viewer profiling module 528. For example, in an embodiment, the viewer profile store receives and stores information regarding a particular viewer in their viewer profile when the particular viewer views holographic content provided by the LF display system 500. In this example, the viewer profiling module 528 includes a facial recognition algorithm that may recognize viewers and positively identify them as they view presented holographic content. To illustrate, as a viewer enters the target area of the LF display system 500, the tracking system 580 obtains an image of the viewer. The viewer profiling module 528 inputs the captured image and identifies the viewer's face using the facial recognition algorithm. The identified face is associated with a viewer profile in the profile store and, as such, all input information obtained about that viewer may be stored in their profile. The viewer profiling module may also utilize card identification scanners, voice identifiers, a radio-frequency identification (RFID) chip scanners, barcode scanners, etc. to positively identify a viewer.

In embodiments where the viewer profiling module 528 can positively identify viewers, the viewer profiling module 528 can determine each visit of each viewer to the LF display system 500. The viewer profiling module 528 may then store the time and date of each visit in the viewer profile for each viewer. Similarly, the viewer profiling module 528 may store received inputs from a viewer from any combination of the sensory feedback system 570, the tracking system 580, and/or the LF display assembly 510 each time they occur. The viewer profile system 528 may additionally receive further information about a viewer from other modules or components of the controller 520 which can then be stored with the viewer profile. Other components of the controller 520 may then also access the stored viewer profiles for determining subsequent content to be provided to that viewer.

The LF processing engine 530 generates holographic content comprised of light field data, as well as data for all of the sensory domains supported by a LF display system 500. For example, LF processing engine 530 may generate 4D coordinates in a rasterized format ("rasterized data") that, when executed by the LF display assembly 510, cause the LF display assembly 510 to present holographic content. The LF processing engine 530 may access the rasterized data from the data store 522. Additionally, the LF processing engine 530 may construct rasterized data from a vectorized data set. Vectorized data is described below. The LF processing engine 530 can also generate sensory instructions required to provide sensory content that augments the holographic objects. As described above, sensory instructions may generate, when executed by the LF display system 500, haptic surfaces, sound fields, and other forms of sensory energy supported by the LF display system 500. The LF processing engine 530 may access sensory instructions from the data store 522, or construct the sensory instructions form a vectorized data set. In aggregate, the 4D coordinates and sensory data represent holographic content as display instructions executable by a LF display system to generate holographic and sensory content. More generally, holographic content can take the form of CG content with ideal light field coordinates, live action content, rasterized data, vectorized data, electromagnetic energy transported by a set of relays, instructions sent to a group of energy devices, energy locations on one or more energy surfaces, the set of energy propagation paths that are projected from the display surface, a holographic object that is visible to a viewer or an audience, and many other similar forms.

The amount of rasterized data describing the flow of energy through the various energy sources in a LF display system 500 is incredibly large. While it is possible to display the rasterized data on a LF display system 500 when accessed from a data store 522, it is untenable to efficiently transmit, receive (e.g., via a network interface 524), and subsequently display the rasterized data on a LF display system 500. Take, for example, rasterized data representing a short film for holographic projection by a LF display system 500. In this example, the LF display system 500 includes a display containing several gigapixels and the rasterized data contains information for each pixel location on the display. The corresponding size of the rasterized data is vast (e.g., many gigabytes per second of film display time), and unmanageable for efficient transfer over commercial networks via a network interface 524. The efficient transfer problem may be amplified for applications including live streaming of holographic content. An additional problem with merely storing rasterized data on data store 522 arises when an interactive experience is desired using inputs from the sensory feedback system 570 or the tracking module 526. To enable an interactive experience, the light field content generated by the LF processing engine 530 can be modified in real-time in response to sensory or tracking inputs. In other words, in some cases, LF content cannot simply be read from the data store 522.

Therefore, in some configurations, data representing holographic content for display by a LF display system 500 may be transferred to the LF processing engine 530 in a vectorized data format ("vectorized data"). Vectorized data may be orders of magnitude smaller than rasterized data. Further, vectorized data provides high image quality while having a data set size that enables efficient sharing of the data. For example, vectorized data may be a sparse data set derived from a denser data set. Thus, vectorized data may have an adjustable balance between image quality and data transmission size based on how sparse vectorized data is sampled from dense rasterized data. Tunable sampling to generate vectorized data enables optimization of image quality for a given network speed. Consequently, vectorized data enables efficient transmission of holographic content via a network interface 524. Vectorized data also enables holographic content to be live-streamed over a commercial network.

In summary, the LF processing engine 530 may generate holographic content derived from rasterized data accessed from the data store 522, vectorized data accessed from the data store 522, or vectorized data received via the network interface 524. In various configurations, vectorized data may be encoded before data transmission and decoded after reception by the LF controller 520. In some examples, the vectorized data is encoded for added data security and performance improvements related to data compression. For example, vectorized data received by the network interface may be encoded vectorized data received from a holographic streaming application. In some examples, vectorized data may require a decoder, the LF processing engine 530, or both of these to access information content encoded in vectorized data. The encoder and/or decoder systems may be available to customers or licensed to third-party vendors.

Vectorized data contains all the information for each of the sensory domains supported by a LF display system 500 in way that may support an interactive experience. For example, vectorized data for an interactive holographic experience may include any vectorized properties that can provide accurate physics for each of the sensory domains supported by a LF display system 500. Vectorized properties may include any properties that can be synthetically programmed, captured, computationally assessed, etc. A LF processing engine 530 may be configured to translate vectorized properties in vectorized data to rasterized data. The LF processing engine 530 may then project holographic content translated from the vectorized data using the LF display assembly 510. In various configurations, the vectorized properties may include one or more red/green/blue/alpha channel (RGBA)+depth images, multi view images with or without depth information at varying resolutions that may include one high-resolution center image and other views at a lower resolution, material properties such as albedo and reflectance, surface normals, other optical effects, surface identification, geometrical object coordinates, virtual camera coordinates, display plane locations, lighting coordinates, tactile stiffness for surfaces, tactile ductility, tactile strength, amplitude and coordinates of sound fields, environmental conditions, somatosensory energy vectors related to the mechanoreceptors for textures or temperature, audio, and any other sensory domain property. Many other vectorized properties are also possible.

The LF display system 500 may also generate an interactive viewing experience. That is, holographic content may be responsive to input stimuli containing information about viewer locations, gestures, interactions, interactions with holographic content, or other information derived from the viewer profiling module 528, and/or tracking module 526. For example, in an embodiment, a LF processing system 500 creates an interactive viewing experience using vectorized data of a real-time performance received via a network interface 524. In another example, if a holographic object needs to move in a certain direction immediately in response to a viewer interaction, the LF processing engine 530 may update the render of the scene so the holographic object moves in that required direction. This may require the LF processing engine 530 to use a vectorized data set to render light fields in real time based a 3D graphical scene with the proper object placement and movement, collision detection, occlusion, color, shading, lighting, etc., correctly responding to the viewer interaction. The LF processing engine 530 converts the vectorized data into rasterized data for presentation by the LF display assembly 510.

The rasterized data includes holographic content instructions and sensory instructions (display instructions) representing the real-time performance. The LF display assembly 510 simultaneously projects holographic and sensory content of the real-time performance by executing the display instructions. The LF display system 500 monitors viewer interactions (e.g., vocal response, touching, etc.) with the presented real-time performance with the tracking module 526 and viewer profiling module 528. In response to the viewer interactions, the LF processing engine may create an interactive experience by generating additional holographic and/or sensory content for display to the viewers.

To illustrate, consider an example embodiment of an LF display system 500 including a LF processing engine 530 that generates a plurality of holographic objects representing balloons falling from the ceiling of a cinema during a film. A viewer may move to touch the holographic object representing the balloon. Correspondingly, the tracking system 580 tracks movement of the viewer's hands relative to the holographic object. The movement of the viewer is recorded by the tracking system 580 and sent to the controller 520. The tracking module 526 continuously determines the motion of the viewer's hand and sends the determined motions to the LF processing engine 530. The LF processing engine 530 determines the placement of the viewer's hand in the scene, adjusts the real-time rendering of the graphics to include any required change in the holographic object (such as position, color, or occlusion). The LF processing engine 530 instructs the LF display assembly 510 (and/or sensory feedback system 570) to generate a tactile surface using the volumetric haptic projection system (e.g., using ultrasonic speakers). The generated tactile surface corresponds to at least a portion of the holographic object and occupies substantially the same space as some or all of an exterior surface of the holographic object. The LF processing engine 530 uses the tracking information to dynamically instruct the LF display assembly 510 to move the location of the tactile surface along with a location of the rendered holographic object such that the viewer is given both a visual and tactile perception of touching the balloon. More simply, when a viewer views his hand touching a holographic balloon, the viewer simultaneously feels haptic feedback indicating their hand touches the holographic balloon, and the balloon changes position or motion in response to the touch. In some examples, rather than presenting and interactive balloon in a film accessed from a data store 522, the interactive balloon may be received as part of holographic content received from a live-streaming application via a network interface 524.

LF processing engine 530 may provide holographic content for concurrent display to viewers in a cinema who are viewing a film. For example, a film being showed in a cinema augmented with a LF display system 500 includes holographic content to be presented to viewers during the film ("holographic content track"). The holographic content track may be received by the distributor of the film and stored in the data store 522. The holographic content track includes holographic content that enhances the viewing experience of a viewer viewing the film in the cinema.

The holographic content in a holographic content track may be associated with any number of temporal, auditory, visual, etc. cues to display the holographic content. For example, the holographic content track can include holographic content to be displayed at a specific time during a film. As an illustration, the holographic content track includes a pod of holographic dolphins to display during the film "Bottlenosed" 35 minutes and 42 seconds after the film begins. In another example, a holographic content track includes holographic content to be presented when sensory feedback system 570 records a specific audio cue. As an illustration, a holographic content track includes a holographic ghost turkey to present during the film "Poultrygeist" when audio recorded by sensory feedback assembly 570 indicates that people are laughing during the film. In another example, a holographic content track includes holographic content to display when the tracking system 580 records a specific visual cue. As an illustration, a holographic content track includes a holographic sign saying "LEAVER!" to display during the film "Don't Leave Me, Bro!" when a tracking system 580 records information indicating that a viewer is exiting the cinema. Determining auditory and visual cues is described in more detail below.

The holographic content track may also include spatial rendering information. That is, the holographic content track may indicate the spatial location for presenting holographic content in a cinema. For example, the holographic content track may indicate that certain holographic content is to be presented in some holographic viewing volumes while not others. To illustrate, LF processing engine 530 may present a murder of crows in a holographic viewing volume above viewer's heads rather than on the walls of a cinema. Similarly, the holographic content track may indicate holographic content to present to some viewing volumes while not others. For example, the LF processing engine may present the murder of crows to a viewing volume near the rear of the theater while a kaleidoscope of butterflies is presented to a viewing volume near the front of a cinema.

LF processing engine 530 may provide holographic content to display to viewers in a cinema before, during, and/or after a film to augment the cinema experience. The holographic content may be provided by the publisher of the film, provided by the cinema, provided by an advertiser, generated by a LF processing engine 530, etc. The holographic content may be content associated with the film, the genre of the film, the location of the venue, advertisements, etc. In any case, the holographic content may be stored in the data store 522, or streamed to the LF display system 500 in vectorized format through the network interface 524. For example, a film may be shown in a cinema augmented with LF display modules on the walls. The distributor of the film may provide holographic content to present on the wall displays before the film begins. The LF processing engine 530 accesses the holographic content and presents the accessed content from the displays on the walls of the cinema before the film begins. In another example, a cinema with an LF display system 500 is located in San Francisco. The cinema stores a holographic representation of the Golden Gate Bridge to present in cinemas before a film if no film specific content is provided. Here, as no film-specific holographic content is provided, the LF processing engine 530 accesses and presents the Golden Gate Bridge in the cinema. In another example, an advertiser has provided holographic content of its products as advertisements to a cinema to display after a film. After the film concludes, the LF processing engine 530 presents the advertisements to the viewers as they leave the cinema. In other examples, as described below, a LF processing engine may dynamically generate holographic content to display on the walls of the theater.

The LF processing engine 500 may also modify holographic content to suit the cinema that is presenting the holographic content. For example, not every cinema is the same size, has the same number of seats, or has the same technical configuration. As such, LF processing engine 530 may modify holographic content such that it will be appropriately displayed in a cinema. In an embodiment, the LF processing engine 530 may access a configuration file of a cinema including the layout, resolution, field-of-view, other technical specifications, etc. of the cinema. The LF processing engine 530 may render and present the holographic content based on information included in the configuration file.

The LF processing engine 530 may also create holographic content for display by the LF display system 500. Importantly, here, creating holographic content for display is different from accessing, or receiving, holographic content for display. That is, when creating content, the LF processing engine 530 generates entirely new content for display rather than accessing previously generated and/or received content. The LF processing engine 530 can use information from the tracking system 580, the sensory feedback system 570, the viewer profiling module 528, the tracking module 526, or some combination thereof, to create holographic content for display. In some examples, LF processing engine 530 may access information from elements of the LF display system 500 (e.g., tracking information and/or a viewer profile), create holographic content based on that information, and display the created holographic content using the LF display system 500 in response. The created holographic content may be augmented with other sensory content (e.g., touch, audio, or smell) when displayed by the LF display system 500. Further, the LF display system 500 may store created holographic content such that it may be displayed in the future.

Dynamic Content Generation for a LF Display System

In some embodiments, the LF processing engine 530 incorporates an artificial intelligence (AI) model to create holographic content for display by the LF display system 500. The AI model may include supervised or unsupervised learning algorithms including but not limited to regression models, neural networks, classifiers, or any other AI algorithm. The AI model may be used to determine viewer preferences based on viewer information recorded by the LF display system 500 (e.g., by tracking system 580) which may include information on a viewer's behavior.

The AI model may access information from the data store 522 to create holographic content. For example, the AI model may access viewer information from a viewer profile or profiles in the data store 522 or may receive viewer information from the various components of the LF display system 500. To illustrate, the AI model may determine a viewer enjoys seeing holographic content in which an actor wears a bow tie. The AI model may determine the preference based on a group of viewer's positive reactions or responses to previously viewed holographic content including a bow-tie wearing actor. That is, the AI model may create holographic content personalized to a set of viewers according to the learned preferences of those viewers. So, for example, the AI model may create bow-ties for actors displayed in the holographic content viewed by a group of viewers using the LF display system 500. The AI model may also store the learned preferences of each viewer in the viewer profile store of the data store 522. In some examples, the AI model may create holographic content for an individual viewer rather than a group of viewers.

One example of an AI model that can be used to identify characteristics of viewers, identify reactions, and/or generate holographic content based on the identified information is a convolutional neural network model with layers of nodes, in which values at nodes of a current layer are a transformation of values at nodes of a previous layer. A transformation in the model is determined through a set of weights and parameters connecting the current layer and the previous layer. For example, and AI model may include five layers of nodes: layers A, B, C, D, and E. The transformation from layer A to layer B is given by a function $W_1$, the transformation from layer B to layer C is given by $W_2$, the transformation from layer C to layer D is given by $W_3$, and the transformation from layer D to layer E is given by $W_4$.

In some examples, the transformation can also be determined through a set of weights and parameters used to transform between previous layers in the model. For example, the transformation $W_4$ from layer D to layer E can be based on parameters used to accomplish the transformation $W_1$ from layer A to B.

The input to the model can be an image taken by tracking system 580 encoded onto the convolutional layer A and the output of the model is holographic content decoded from the output layer E. Alternatively or additionally, the output may be a determined characteristic of a viewer in the image. In this example, the AI model identifies latent information in the image representing viewer characteristics in the identification layer C. The AI model reduces the dimensionality of the convolutional layer A to that of the identification layer C to identify any characteristics, actions, responses, etc. in the image. In some examples, the AI model then increases the dimensionality of the identification layer C to generate holographic content.

The image from the tracking system 580 is encoded to a convolutional layer A. Images input in the convolutional layer A can be related to various characteristics and/or reaction information, etc. in the identification layer C. Relevance information between these elements can be retrieved by applying a set of transformations between the corresponding layers. That is, a convolutional layer A of an AI model represents an encoded image, and identification layer C of the model represents a smiling viewer. Smiling viewers in a given image may be identified by applying the transformations $W_1$ and $W_2$ to the pixel values of the image in the space of convolutional layer A. The weights and parameters for the transformations may indicate relationships between information contained in the image and the identification of a smiling viewer. For example, the weights and parameters can be a quantization of shapes, colors, sizes, etc. included in information representing a smiling viewer in an image. The weights and parameters may be based on historical data (e.g., previously tracked viewers).

Smiling viewers in the image are identified in the identification layer C. The identification layer C represents identified smiling viewers based on the latent information about smiling viewers in the image.

Identified smiling viewers in an image can be used to generate holographic content. To generate holographic content, the AI model starts at the identification layer C and applies the transformations $W_2$ and $W_3$ to the value of the given identified smiling viewers in the identification layer C. The transformations result in a set of nodes in the output layer E. The weights and parameters for the transformations may indicate relationships between an identified smiling viewers and specific holographic content and/or preferences. In some cases, the holographic content is directly output from the nodes of the output layer E, while in other cases the content generation system decodes the nodes of the output layer E into a holographic content. For example, if the output is a set of identified characteristics, the LF processing engine can use the characteristics to generate holographic content.

Additionally, the AI model can include layers known as intermediate layers. Intermediate layers are those that do not correspond to an image, identifying characteristics/reactions, etc., or generating holographic content. For example, in the given example, layer B is an intermediate layer between the convolutional layer A and the identification layer C. Layer D is an intermediate layer between the identification layer C and the output layer E. Hidden layers are latent representations of different aspects of identification that are not observed in the data, but may govern the relationships between the elements of an image when identifying characteristics and generating holographic content. For example, a node in the hidden layer may have strong connections (e.g., large weight values) to input values and identification values that share the commonality of "laughing people smile." As another example, another node in the hidden layer may have strong connections to input values and identification values that share the commonality of "scared people scream." Of course, any number of linkages are present in a neural network. Additionally, each intermediate layer is a combination of functions such as, for example, residual blocks, convolutional layers, pooling operations, skip connections, concatenations, etc. Any number of intermediate layers B can function to reduce the convolutional layer to the identification layer and any number of intermediate layers D can function to increase the identification layer to the output layer.

In one embodiment, the AI model includes deterministic methods that have been trained with reinforcement learning (thereby creating a reinforcement learning model). The model is trained to increase the quality of the performance using measurements from tracking system 580 as inputs, and changes to the created holographic content as outputs.

Reinforcement learning is a machine learning system in which a machine learns 'what to do'—how to map situations to actions—so as to maximize a numerical reward signal. The learner (e.g. LF processing engine 530) is not told which actions to take (e.g., generating prescribed holographic content), but instead discovers which actions yield the most reward (e.g., increasing the quality of holographic content by making more people cheer) by trying them. In some cases, actions may affect not only the immediate reward but also the next situation and, through that, all subsequent rewards. These two characteristics—trial-and-error search and delayed reward—are two distinguishing features of reinforcement learning.

Reinforcement learning is defined not by characterizing learning methods, but by characterizing a learning problem. Basically, a reinforcement learning system captures those important aspects of the problem facing a learning agent interacting with its environment to achieve a goal. That is, in the example of generating a song for a performer, the reinforcement learning system captures information about viewers in the venue (e.g., age, disposition, etc.). Such an agent senses the state of the environment and takes actions that affect the state to achieve a goal or goals (e.g., creating a pop song for which the viewers will cheer). In its most basic form, the formulation of reinforcement learning includes three aspects for the learner: sensation, action, and goal. Continuing with the song example, the LF processing engine 530 senses the state of the environment with sensors of the tracking system 580, displays holographic content to the viewers in the environment, and achieves a goal that is a measure of the viewer's reception of that song.

One of the challenges that arises in reinforcement learning is the trade-off between exploration and exploitation. To increase the reward in the system, a reinforcement learning agent prefers actions that it has tried in the past and found to be effective in producing reward. However, to discover actions that produce reward, the learning agent selects actions that it has not selected before. The agent 'exploits' information that it already knows in order to obtain a reward, but it also 'explores' information in order to make better action selections in the future. The learning agent tries a variety of actions and progressively favors those that appear to be best while still attempting new actions. On a stochastic task, each action is generally tried many times to gain a reliable estimate to its expected reward. For example, if the LF processing engine creates holographic content that the LF processing engine knows will result in a viewer laughing after a long period of time, the LF processing engine may change the holographic content such that the time until a viewer laughs decreases.

Further, reinforcement learning considers the whole problem of a goal-directed agent interacting with an uncertain environment. Reinforcement learning agents have explicit goals, can sense aspects of their environments, and can choose actions to receive high rewards (i.e., a roaring crowd). Moreover, agents generally operate despite significant uncertainty about the environment they face. When reinforcement learning involves planning, the system addresses the interplay between planning and real-time action selection, as well as the question of how environmental elements are acquired and improved. For reinforcement learning to make progress, important sub problems have to be isolated and studied, the sub problems playing clear roles in complete, interactive, goal-seeking agents.

The reinforcement learning problem is a framing of a machine learning problem where interactions are processed and actions are carried out to achieve a goal. The learner and decision-maker is called the agent (e.g., LF processing engine 530). The thing it interacts with, comprising everything outside the agent, is called the environment (e.g., viewers in a venue, etc.). These two interact continually, the agent selecting actions (e.g., creating holographic content) and the environment responding to those actions and presenting new situations to the agent. The environment also gives rise to rewards, special numerical values that the agent tries to maximize over time. In one context, the rewards act to maximize viewer positive reactions to holographic content. A complete specification of an environment defines a task which is one instance of the reinforcement learning problem.

To provide more context, an agent (e.g., LF processing engine 530) and environment interact at each of a sequence of discrete time steps, i.e. t=0, 1, 2, 3, etc. At each time step t the agent receives some representation of the environment's state $s_t$ (e.g., measurements from tracking system 580). The states $s_t$ are within S, where S is the set of possible states. Based on the state $s_t$ and the time step t, the agent selects an action at (e.g., making the performer do the splits). The action at is within $A(s_t)$, where $A(s_t)$ is the set of possible actions. One time state later, in part as a consequence of its action, the agent receives a numerical reward $r_{t+1}$. The states $r_{t+1}$ are within R, where R is the set of possible rewards. Once the agent receives the reward, the agent selects in a new state $s_{t+1}$.

At each time step, the agent implements a mapping from states to probabilities of selecting each possible action. This mapping is called the agent's policy and is denoted $\pi_t$ where $\pi_t(s,a)$ is the probability that $a_t=a$ if $s_t=s$. Reinforcement learning methods can dictate how the agent changes its policy as a result of the states and rewards resulting from agent actions. The agent's goal is to maximize the total amount of reward it receives over time.

This reinforcement learning framework is flexible and can be applied to many different problems in many different ways (e.g. generating holographic content). The framework proposes that whatever the details of the sensory, memory, and control apparatus, any problem (or objective) of learning goal-directed behavior can be reduced to three signals passing back and forth between an agent and its environment: one signal to represent the choices made by the agent (the actions), one signal to represent the basis on which the choices are made (the states), and one signal to define the agent's goal (the rewards).

Of course, the AI model can include any number of machine learning algorithms. Some other AI models that can be employed are linear and/or logistic regression, classification and regression trees, k-means clustering, vector quantization, etc. Whatever the case, generally, the LF processing engine 530 takes an input from the tracking module 526 and/or viewer profiling module 528 and a machine learning model creates holographic content in response. Similarly, the AI model may direct the rendering of holographic content.

LF processing engine 530 can create holographic content based on a film being shown in the cinema. For example, a film being shown in the cinema may be associated with a set of metadata describing the film's characteristics. The metadata may include, for example, the setting, genre, actors, actresses, themes, titles, run-times, ratings, etc. LF processing engine 530 may access any of the metadata describing the film and generate holographic content to present in the cinema in response. For example, a film titled "The Last Merman" is about to be played in a cinema augmented with a LF display system 500. The LF processing engine 530 accesses the metadata of the film to create holographic content for the walls of the cinema before the film begins. Here, the metadata includes that the setting is underwater and the genre is romance. The LF processing engine 530 inputs the metadata into an AI model and receives holographic content to display on the walls of the cinema in response. In this example, the LF processing engine 530 creates a beachside sunset to display on the walls of the cinema before the film begins to play.

In an example, the LF processing engine 530 can convert a traditional two dimensional (2D) film to holographic content for display by a LF display system. For example, the LF processing engine 530 can input a traditional film into an AI model and the AI model converts any part of the traditional film into holographic content. In an example, the AI model may convert a traditional film into holographic content by using machine learning algorithms trained by converting two-dimensional data to holographic data. In various circumstances, the training data may be previously generated, created, or some combination of the two. The LF display system 500 may then display the holographic version of the film rather than the traditional two-dimensional version of the film.

In an example, the LF processing engine 530 creates holographic content based on the viewers present at a cinema including a LF display system 500. For example, a group of viewers enters a cinema to view a film augmented by holographic content displayed by the LF display system 500. Viewer profiling module 528 generates a viewer profile for the viewers in the cinema and an aggregate viewer profile representing all of the viewers in the cinema. LF processing engine 530 accesses the aggregate viewer profile and creates holographic content to display to the viewers in the cinema. For example, the viewers in a cinema are a group of couples viewing a romance film, and, therefore, the aggregate viewer profile includes information indicating that they may enjoy holographic content commensurate with a couple on a dates (e.g., through parameterization and input into an AI model). As such, the LF processing engine 530 generates holographic content such that the cinema is a more romantic atmosphere (e.g., candles, dim lighting, Marvin Gaye music, etc.).

In an example, the LF processing engine 530 creates holographic content based on the responses of viewers viewing a film. For example, viewers in a cinema are viewing a film in a cinema augmented by a LF display system 500. The tracking module 526 and the viewer profiling module 528 monitor the reaction of the viewers viewing the film. For example, tracking system 580 may obtain images of viewers as the view the film. Tracking module 526 identifies the viewer and viewer profiling module 528 uses machine vision algorithms to determine a reaction of the viewer based on information included in the image. For example, an AI model can be used to identify if a viewer viewing the film is smiling and, accordingly, viewer profiling module 528 can indicate in the viewer profile if the viewer has a positive or negative response to the film based on the smile. Other reactions may also be determined. By way of illustration, a comedy film is being shown in a cinema. As the film is shown on the display surface, the tracking module 526 and viewer profiling module 528 monitor the reactions of the viewers. In this instance, the viewers are laughing at a montage of a cat learning to play piano in the film. The viewer profiling module 528 recognizes the laughter and, in response, the LF processing engine 530 displays holographic content of kittens doing silly things on the walls of the theater.

In a similar example, the LF processing engine 530 may create holographic content based on previously existing or provided advertisement content. That is, for example, the LF processing engine 530 can request an advertisement from a network system via network interface 524, the network system provides the holographic content in response, and the LF processing engine 530 creates holographic content for display including the advertisement. Some examples of advertisement can include, products, text, videos, etc. Advertisements may be presented to specific viewing volumes based on the viewers in that viewing volume. Similarly, holographic content may augment a film with an advertisement (e.g., a product placement). Most generally, the LF processing engine 530 can create advertisement content based on any of the characteristics and/or reactions of the viewers in the venue as previously described.

The preceding examples of creating content are not limiting. Most broadly, LF processing engine 530 creates holographic content for display to viewers of a LF display system 500. The holographic content can be created based on any of the information included in the LF display system 500.

Holographic Content Distribution Networks

Figure 5B:
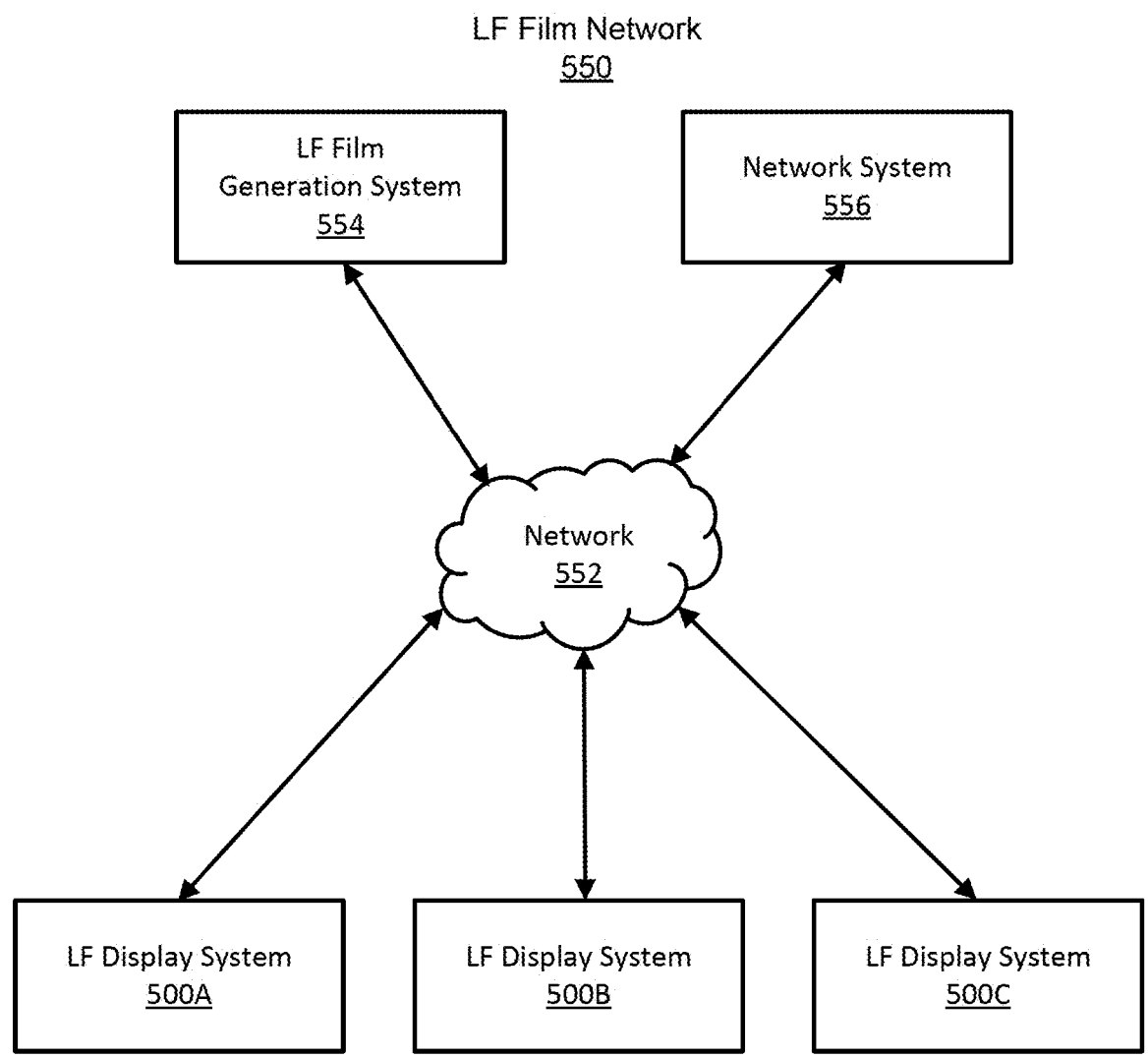
FIG. 5B illustrates an example LF film network 550, in accordance with one or more embodiments.

FIG. 5B illustrates an example LF film network 550, in accordance with one or more embodiments. One or more LF display systems may be included in the LF film network 550. The LF film network 550 includes any number of LF display systems (e.g., 500A, 500B, and 500C), a LF film generation system 554, and a networking system 556 that are coupled to each other via a network 552. In other embodiments, the LF film network 550 comprises additional or fewer entities than those described herein. Similarly, the functions can be distributed among the different entities in a different manner than is described here.

In the illustrated embodiment, the LF film network 550 includes LF display systems 500A, 500B, and 500C that may receive holographic content via the network 552 and display the holographic content to viewers. The LF display systems 500A, 500B, and 500C are collectively referred to as LF display systems 500.

The LF film generation system 554 is a system that generates holographic content for display in a cinema including a LF display system. The holographic content may be a film or may be holographic content that augments a traditional film. A LF film generation system 554 may include any number of sensors and/or processors to record information and generate holographic content. For example, the sensors can include cameras for recording images, microphones for recording audio, pressure sensors for recording interactions with objects, etc. The LF film generation system 554 may also be a computer system that generates synthetic light field data using processors to generate computer-generated imagery (CGI) animations rendered as a light field. The synthetic light field data may be from, for example, a virtual world or animated movie. The LF film generation system 554 combines the recorded information and encodes the information as holographic and sensory content. The LF film generation system 554 may transmit the encoded holographic content to one or more of the LF display systems 500 for display to viewers. As previously discussed, for efficient transfer speeds, data for the LF display system 500A, 500B, 500C, etc., may be transferred over the network 552 as vectorized data.

More broadly, the LF film generation system 554 generates holographic content for display in a cinema by using any recorded sensory data or synthetic data that may be used by a LF display system when showing a film. For example, the sensory data may include recorded audio, recorded images, recorded interactions with objects, etc. Many other types of sensory data may be used. To illustrate, the recorded visual content may include: 3D graphics scenes, 3D models, object placement, textures, color, shading, and lighting; 2D film data which can be converted to a holographic form using an AI model and a large data set of similar film conversions; multi-view camera data from a camera rig with many cameras with or without a depth channel; plenoptic camera data; CG content; or many other types of content.

In some configurations, the LF film generation system 554 may use a proprietary encoder to perform the encoding operation that reduces the sensory data recorded for a film into a vectorized data format as described above. That is, encoding data to vectorized data may include image processing, audio processing, or any other computations that may result in a reduced data set that is easier to transmit over the network 552. The encoder may support formats used by film-making industry professionals.

Each LF display system (e.g., 500A, 500B, 500C) may receive the encoded data from the network 552 via a network interface 524. In this example, each LF display system includes a decoder to decode the encoded LF display data. More explicitly, a LF processing engine 530 generates rasterized data for the LF display assembly 510 by applying decoding algorithms provided by the decoder to the received encoded data. In some examples, the LF processing engine may additionally generate rasterized data for the LF display assembly using input from the tracking module 526, the viewer profiling module 528, and the sensory feedback system 570 as described herein. Rasterized data generated for the LF display assembly 510 reproduces the holographic content recorded by the LF film generation system 554. Importantly, each LF display system 500A, 500B, and 500C generates rasterized data suitable for the particular configuration of the LF display assembly in terms of geometry, resolution, etc. In some configurations, the encoding and decoding process is part of a proprietary encoding/decoding system pair which may be offered to display customers or licensed by third parties. In some instances, the encoding/decoding system pair may be implemented as a proprietary API that may offer content creators a common programming interface.

In some configurations, various systems in the LF film network 550 (e.g., LF display system 500, the LF film generation system 554, etc.) may have different hardware configurations. Hardware configurations can include arrangement of physical systems, energy sources, energy sensors, haptic interfaces, sensory capabilities, resolutions, LF display module configurations, or any other hardware description of a system in the LF film network 550. Each hardware configuration may generate, or utilize, sensory data in different data formats. As such, a decoder system may be configured to decode encoded data for the LF display system on which it will be presented. For example, a LF display system (e.g., LF display system 500A) having a first hardware configuration receives encoded data from a LF film generation system (e.g., LF film generation system 554) having a second hardware configuration. The decoding system accesses information describing the first hardware configuration of the LF display system 500A. The decoding system decodes the encoded data using the accessed hardware configuration such that the decoded data can be processed by the LF processing engine 530 of the receiving LF display system 500A. The LF processing engine 530 generates and presents rasterized content for the first hardware configuration despite being recorded in the second hardware configuration. In a similar manner, holographic content recorded by the LF film generation system 554 can be presented by any LF display system (e.g., LF display system 500B, LF display system 500C) whatever the hardware configurations.

The network system 556 is any system configured to manage the transmission of holographic content between systems in a LF film network 550. For example, the network system 556 may receive a request for holographic content from a LF display system 500A and facilitate transmission of the holographic content to the LF display system 500A from the LF film generation system 554. The network system 556 may also store holographic content, viewer profiles, holographic content, etc. for transmission to, and/or storage by, other LF display systems 500 in the LF film network 550. The network system 556 may also include a LF processing engine 530 that can create holographic content as previously described.

The network system 556 may include a digital rights management (DRM) module to manage the digital rights of the holographic content. For example, the LF film generation system 554 may transmit the holographic content to the network system 556 and the DRM module may encrypt the holographic content using a digital encryption format. In other examples, the LF film generation system 554 encodes recorded light field data into a holographic content format that can be managed by the DRM module. The network system 556 may provide a key to the digital encryption to a LF display system such that each LF display system 500 can decrypt and, subsequently, display the holographic content to viewers. Most generally, the network system 556 and/or the LF film generation system 554 encodes the holographic content and a LF display system may decode the holographic content.

The network system 556 may act as a repository for previously recorded and/or created holographic content. Each piece of holographic content may be associated with a transaction fee that, when received, causes the network system 556 to transmit the holographic content to the LF display system 500 that provides the transaction fee. For example, A LF display system 500A may request access to the holographic content via the network 552. The request includes a transaction fee for the holographic content. In response, network system 556 transmits the holographic content to the LF display system for display to viewers. In other examples, the network system 556 can also function as a subscription service for holographic content stored in the network system. In another example, LF recording system 554 is recording light field data of a performance in real-time and generating holographic content representing that performance. A LF display system 500 transmits a request for the holographic content to the LF recording system 554. The request includes a transaction fee for the holographic content. In response, the LF recording system 554 transmits the holographic content for concurrent display on the LF display system 500. The network system 556 may act as a mediator in exchanging transaction fees and/or managing holographic content data flow across the network 552.

The network 552 represents the communication pathways between systems in a LF film network 550. In one embodiment, the network is the Internet, but can also be any network, including but not limited to a local area network (LAN), a metropolitan area network (MAN), a wide area network (WAN), a mobile, wired or wireless network, a cloud computing network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Cinemas Including an LF Display System

Figure 7A:
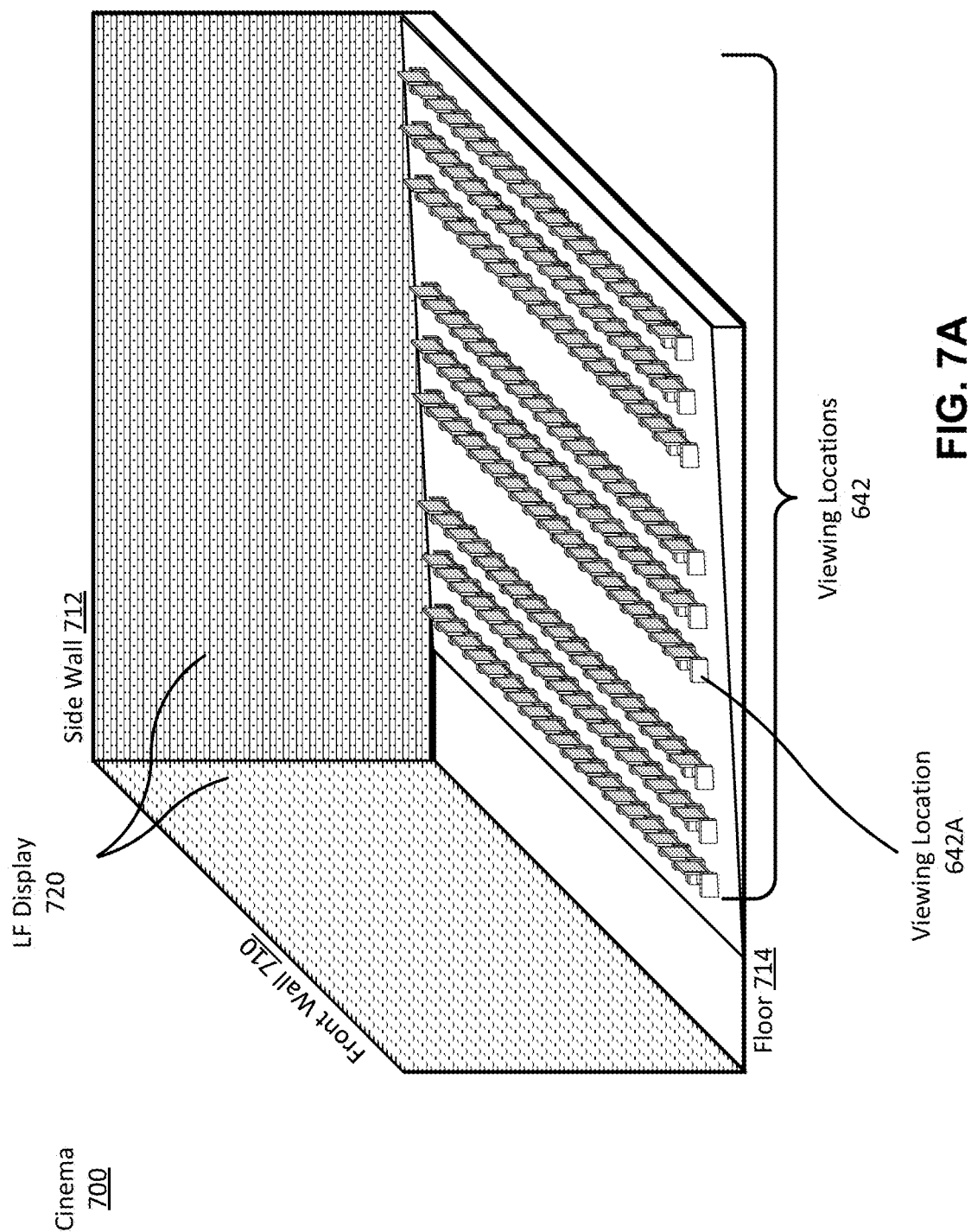
FIG. 7A is a perspective view of a cinema including a light field display system, in accordance with one or more embodiments.
Figure 7B:
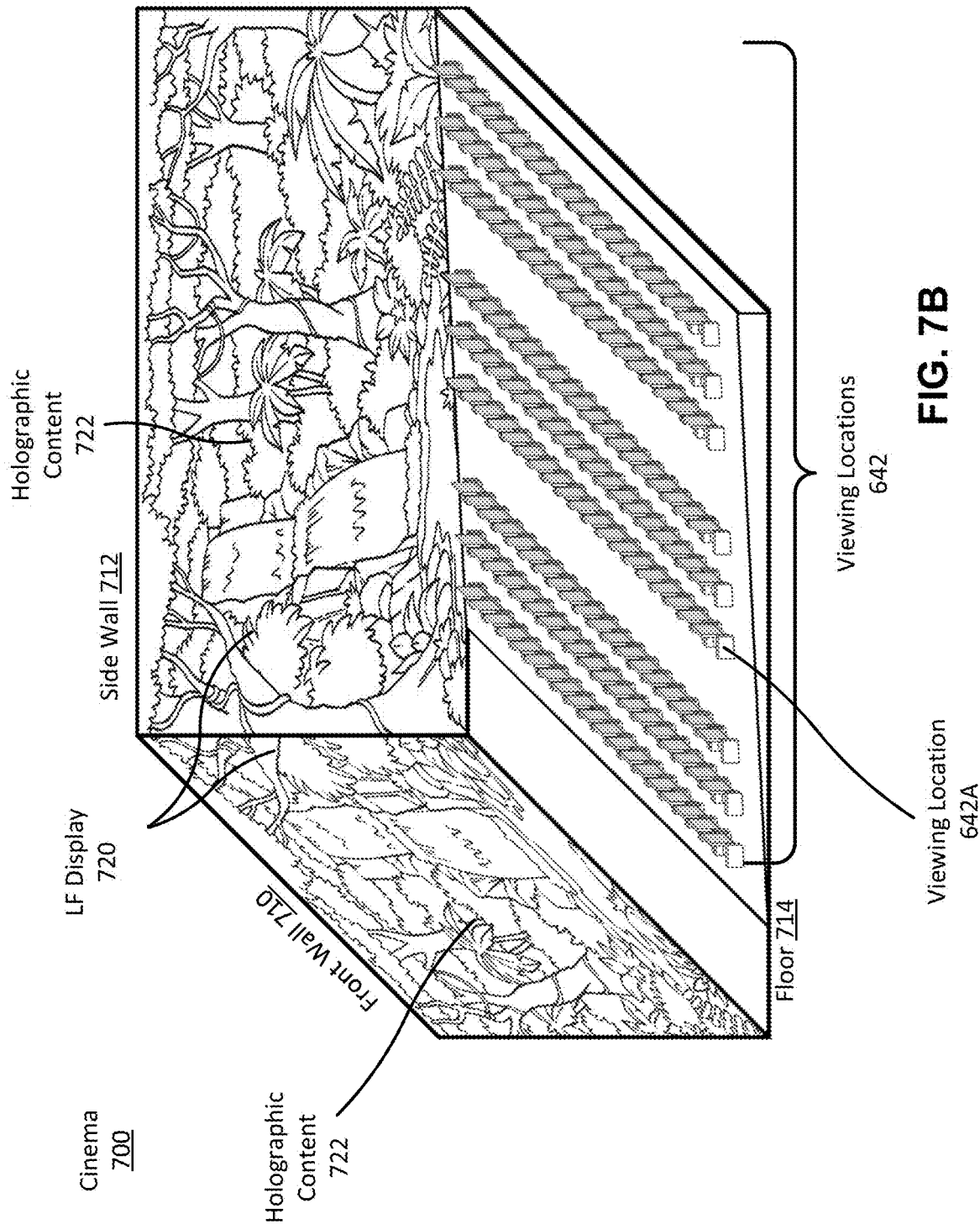
FIG. 7B is a perspective view of a cinema including a light field display system that is displaying holographic content, in accordance with one or more embodiments.
Figure 8:
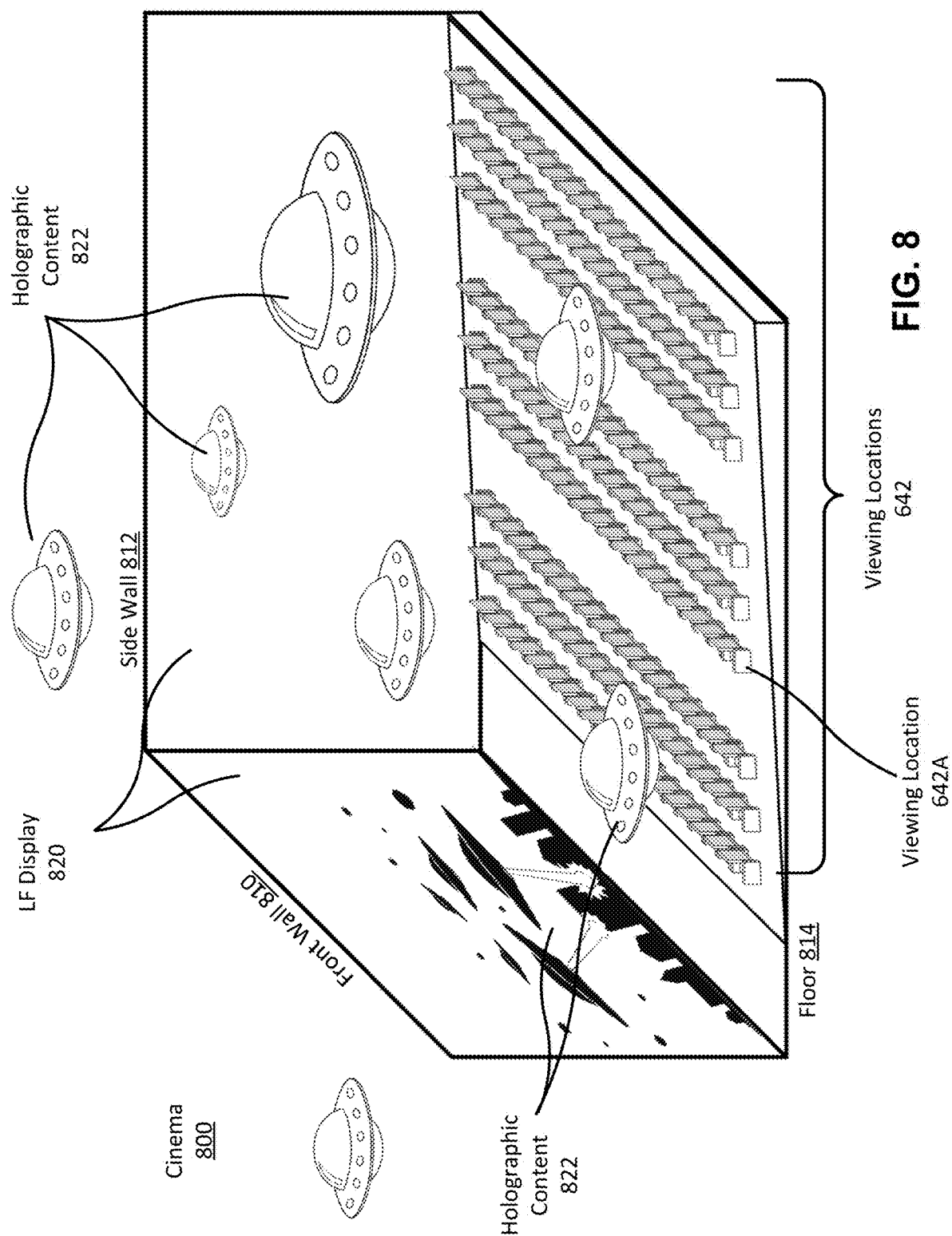
FIG. 8 is a perspective view of a cinema including a light field display system presenting holographic content, in accordance with one or more embodiments.

FIGS. 6-8 illustrate several example cinemas that may display holographic content using a LF display system (e.g., LF display system 500). The holographic content can include a film and/or any other holographic content that can augment the experience of viewing the film in the cinema as previously described. Within a cinema, any number of viewers are located at viewing locations within any number of viewing volumes. The LF display system is configured to display the holographic content in a holographic object volume within the cinema such that viewers in the viewing volume(s) can perceive the holographic content. Generally, a LF display system in a cinema includes one or more LF display assemblies (e.g., LF display assembly 510), each containing an array of LF display modules (e.g., LF display module 512) that form a seamless aggregate surface. This aggregate surface may be located on multiple surfaces having various relative orientations, e.g., on two orthogonal walls. As such, the holographic object volume in the cinema may be the aggregate holographic object display volume of the array of LF display modules.

Figure 6A:
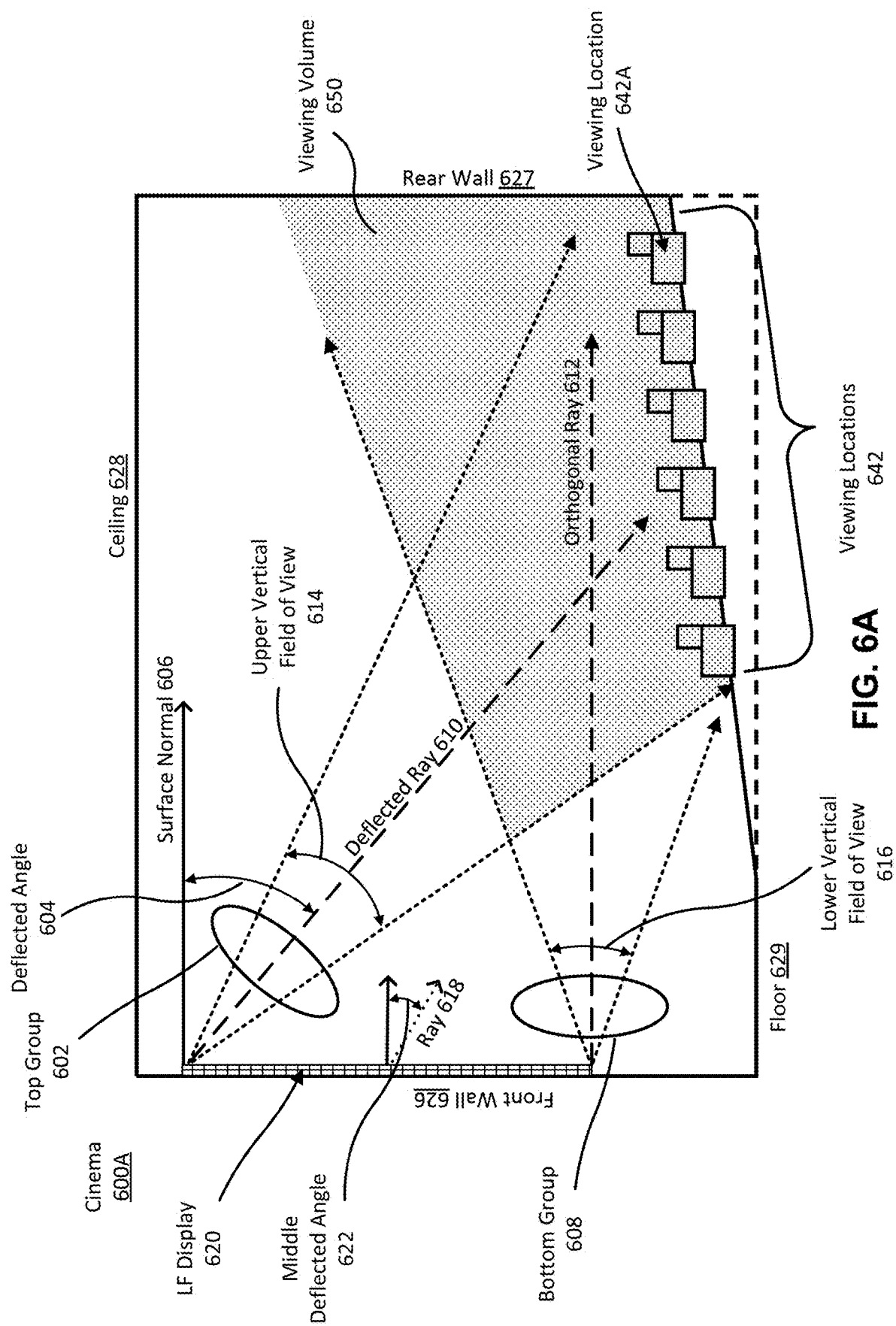
FIG. 6A is a side view of a cinema including a light field display system, in accordance with one or more embodiments.

FIG. 6A illustrates a cinema 600A including a LF display system, in accordance with one or more embodiments. Some, or all, of the walls of the cinema 600A are lined with an array of LF display modules. The array of LF display modules form an aggregate surface of an LF display 620. For example, as illustrated, the front wall 626 of the cinema includes the LF display 620. While not illustrated, the side walls of the cinema may, in some examples, may also include portions of the LF display. The cinema 600A includes a number of viewing locations 642 arranged in rows and positioned to view holographic content presented by the LF display 620. The viewing locations 642 are portions of a viewing volume 650 from which holographic objects (that are unobstructed) presented by the LF display system are fully viewable. For example, a user at a particular viewing location, e.g., a viewing location 642A, would be able to view holographic objects presented in a holographic object volume of the LF display 620. In the illustrated embodiment, at least some of the viewing locations 642 include a chair for a viewer to sit (e.g., the viewing location 642A). There are also locations where no chair is present. The viewing locations 642 in the cinema 600A are also positioned such that viewers in the viewing locations 642 may perceive holographic content presented from the LF display 620. While not illustrated, some, or all, of the ceiling, the floor, or both, may also be lined with the LF display 620. In FIG. 6A the LF display system is an embodiment of LF display system 500. Further, the LF display modules in the LF display 620 are an embodiment of the LF display module 512, and may be the same as LF display module 300A, 210 or 110.

The LF display system in the cinema 600A is optimized for a particular viewing volume (e.g., viewing volume 650). In the illustrated example, the viewing volume 650 includes all of the viewing locations 642 such that viewers at the viewing locations can view holographic content presented by the LF display 620. As shown, the LF display 620 is mounted on the front wall 626 of the cinema 600A. In FIG. 6, the viewing locations 642 are located within the viewing volume 650 below the midpoint height of the LF display 620, but the viewing locations 642 could be above the midpoint in other configurations. Viewing volumes other than the one illustrated are also possible depending on the configuration of the LF display system and/or cinema.

FIG. 6A illustrates the projection angles of holographic content presented from the display surface of the LF display 620. The front wall 626, the ceiling 628, the floor 629, and the rear wall 627 of the cinema 600A are illustrated, although the cinema also includes two side walls. In the illustrated example, the rays are optimized for the geometry of the cinema 600A. Here, light rays (or rays, light, etc.) represent one or more of the projection paths of holographic content projected from the display surface of the LF display 620. The light rays may be projected from one or more of the energy surface locations on the display surface. For example, light rays representing a first portion of the holographic content are projected along a plurality of projection paths from a first subset of energy surface locations on the display surface (e.g., the "top" of an LF display). Similarly, light rays representing a second portion of the holographic content are projected along a plurality of projection paths from a second subset of energy locations on the display surface (e.g., the "bottom" of an LF display).

In the configuration of FIG. 6A, the LF display 620 produces a top group 602 of light rays and a bottom group 608 of light rays from the top and the bottom of the LF display 620, respectively. The top group of light rays 602, centered around deflected ray 610, are projected from the top of the LF display 620 at a deflected angle 604. A deflected (or deflection) angle is the angle at which some of the holographic content may be projected from the display surface. The deflected angle may be different than the original projection angle of the holographic content. For example, as described above, the LF display system may generate the holographic content for projection at an original projection angle (e.g., normal the display surface 620), and the LF display system (i.e., as in cinema 600a) modifies the light rays of the holographic content (e.g., via optics, films, waveguides, etc.) to project the holographic content at a deflected angle 624.

The deflected angle 604 may be defined in a variety of manners. For example, the deflected angle may be (i) the angle between deflected ray 610 relative to the LF array surface normal 606, (ii) an average angle of the plurality of projection paths of a portion of the holographic content projected from one or more energy locations, (iii) a median angle of the plurality of projection paths of a portion of the holographic content projected from one or more energy locations, or (iv) another appropriate definition of a deflected angle 604. Further, as described above, the deflected angle 604 may be measured relative to an original projection angle of the holographic content. The original deflected angle may be defined in a variety of manners. For example, the original projected angle may be (i) a measure (e.g., average, median, etc.) of the plurality of projection paths of a portion of holographic content not projected at a projection angle, (ii) a normal to the display surface, (iii) a measure of the paths projected from energy devices generating the holographic content, or (iv) another appropriate definition of the original projection angle.

In another example, the original projection angle and the deflected angle 604 may be defined relative to an optical axis (or axes) of the LF display system. The optical axis may be defined in a variety of ways. For example, the optical axis may be (i) the direction of the propagation paths for light rays projected from an energy surface location on the display surface (ii) the average energy vector for all light rays being projected from an energy surface location (iii) a light ray (e.g., a centermost light ray) about which projected holographic content is symmetric (e.g., rotationally, horizontally, vertically, etc.), or (iv) another appropriate definition for the optical axis.

The optical axis may be an original optical axis or a deflected optical axis. An original optical axis is the optical axis for holographic content projected at the original projection angle. A deflected optical axis is the optical axis for holographic content projected at the deflected projection path. In this manner, a deflected angle 604 is the angle between the original optical axis and the deflected optical axis.

The deflected angle 604 is oriented downwards to the viewing locations 642 in the cinema 600A. The bottom group of light rays 608, centered around orthogonal ray 612, are projected from the bottom of the LF display 620 straight ahead toward towards the rear of the cinema 600A (i.e., with no deflection angle). In other words, the bottom group 608 of light rays are centered on a light ray projected normal to the LF display 620 surface (illustrated as orthogonal ray 612). The orthogonal ray 612 from the bottom of the LF display 620 and deflected ray 610 from the top of the LF display 620 are illustrated in different directions, but, in some examples, could be in a substantially similar direction.

The angular spread of the top group 602 of light rays about the deflected ray 610 is the upper vertical field of view 614. The angular spread of the bottom group 608 of light rays about the orthogonal ray 612 is the lower vertical field of view 616. As illustrated, the angular spread of the upper vertical field of view 614 and the lower vertical field of view 616 are approximately equal, but could be dissimilar. The upper vertical field of view 614 and the lower vertical field of view 616 overlap to form the viewing volume 650 in the cinema 600A. Horizontal fields of view are formed by groups of light rays projected from the left and right side of the LF display 620. An example of horizontal fields of view are illustrated in FIG. 4E.

In some embodiments, the light rays projected from locations between the top and bottom of the LF display 620 may be defined by a ray whose angle relative to the surface normal 606 varies between the deflected angle 604 at the top of the display and the zero at the bottom of the display corresponding to the normal formed by the orthogonal ray 612. In other words, rays projected from different points on the LF display 620 may be deflected at different angles between the deflected angle 604 and a normal 606 to the LF display 620. In some configurations, the variation of deflection angle may be a gradient across the surface of the LF display 620. For example, light rays (e.g., ray 618) projected from the middle of the LF display 620 may be projected with a middle deflection angle 622. The middle deflection angle 622 has a value between a zero angle (because the orthogonal ray 612 has no deflection angle) and the deflection angle 604. The advantage of gradient deflection angles is that a viewing volume for holographic objects projected from LF display 620 may be maximized for a fixed display FOV.

Additionally, holographic content projected at different deflected angles from the display surface 620 may be viewable from different fields of view. For example, a first portion of holographic content is projected from energy surface locations near, for example, the top of the display surface 620 at a first deflection angle. Similarly, a second portion of holographic content is projected from energy surface locations near, for example, the middle of the display surface at a second deflection angle. In this case, depending on the first and second deflection angle, the first portion of holographic content may be perceived from a first field of view, and the second portion of holographic content may be perceived from a second field of view. The first field of view and the second field of view may be similar or dissimilar depending on the configuration of the LF display and the desired deflected angles.

In some configurations, an optics layer causes projected light rays to be deflected at a deflection angle. In some examples, the optics layer may be located in front of a waveguide layer on the display surface. In this case, the deflection angle may be a function of location of the optics on the LF display 620. In various embodiments, the optics layer may include a layer of refractive optics including prisms with varying properties, layers of glass with varying indices of refraction, or with mirrored layers, thin films, diffraction gratings, or the like. The layer of optics may be optimized for a particular viewing geometry and coupled to an LF display surface allowing viewing volume customization with relatively lesser expense. In another configuration, the energy waveguide layer causes projected light rays leaving the waveguides to be deflected at the deflection angle. The waveguides may be tilted, contain sloped sections or facets, or contain multiple refractive elements with a tilted optical axis.

Figure 6B:
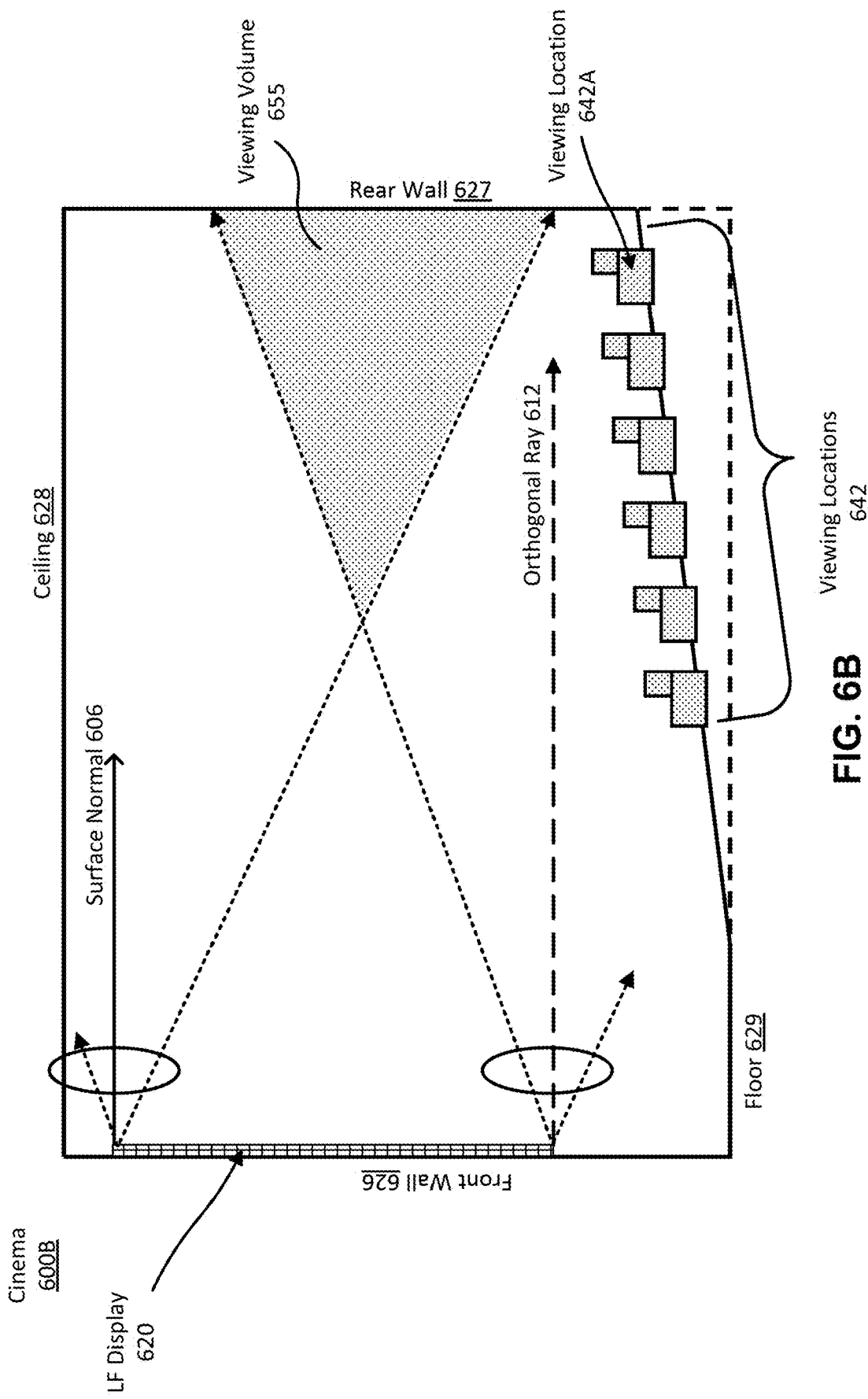
FIG. 6B is a side view of a cinema including a light field display system, in accordance with one or more embodiments.

FIG. 6B illustrates a cinema 600B including a LF display system, in accordance with one or more embodiments. The array of LF display modules form an aggregate surface of an LF display 620 on the front wall of the cinema. While not illustrated, some or all of the ceiling, some or all of the floor, or both, may also be lined with the LF display 620. The cinema 600B includes a number of viewing locations 642 arranged in rows and positioned to view holographic content presented by the LF display 620. In FIG. 6B the LF display system is an embodiment of LF display system 500. Further, the LF display modules in the LF display 620 are an embodiment of the LF display modules of the LF display assembly 510.

The LF display system of the cinema 600B does not include varying ray deflection angles similar to those of the cinema 600A as described in FIG. 6A. That is, in FIG. 6B, there is no deflected ray (e.g., deflected ray 610) at a deflected angle (e.g., deflected angle 604). The top group of light rays 602 is centered around the surface normal 606 and the bottom group of light rays 608 is centered around the orthogonal ray 612. In other words, the group of light rays from each location of the display surface are projected symmetrically around the normal to the display surface. The result is that the holographic viewing volume is symmetrically positioned with the center of the display, and the LF display system is not optimized to present holographic content to all of the viewing locations 642 in the cinema. For example, in the illustrated configuration, the LF display 620 presents holographic content to a viewing volume 655 that does not include any of the viewing locations 642.

Therefore, cinemas capable of projecting light rays at a deflected angle have an increased overall field of view of the LF display system (relative to a cinema not capable of deflecting light rays). Similarly, the separation between the viewing volume and the LF display decreases, and the proximity between the holographic object volume and the viewing volume increases when rays are projected at a deflected angle. The reason for these improvements is similar to the description in regarding FIGS. 4C and 4D and surrounding surfaces. Put differently, projecting light rays at a deflected angle, in effect, creates a surrounding surface from a wholly planar surface.

In various examples, a LF display may be configured to deflect light rays in the infrared, visible, or ultraviolet electromagnetic spectrums. In some cases, deflection optics configured for deflecting light rays from one or more of those regimes may be employed by the LF display system. Other types of energy may also be deflected by the LF display system. For example, if the aggregate surface is a dual energy surface that projects both electromagnetic energy as well as ultrasound energy, a layer of acoustic material may be used to deflect the sound at different angles. The deflected sound waves may achieve similar benefits to those described with deflected light rays. Some materials that may be used to deflect sound waves may include acoustic metamaterials that exhibit a negative acoustic impedance, or other materials with the appropriate acoustic properties.

FIG. 7A illustrates a perspective view of a cinema 700 including a LF display system, in accordance with one or more embodiments. The front wall 710, a sidewall 712, and the floor 714 of the cinema 700 are illustrated, although the cinema 700 also includes another side wall, a ceiling, and a rear wall. Here, the front wall and sidewalls (e.g., sidewall 712) of the cinema 700 are lined with an array of LF display modules. The array of LF display modules form an aggregate surface of an LF display 720. While not illustrated, some or all of the ceiling, some or all of the floor, or both, may also be lined with the LF display 720. The viewing locations 642 in the cinema are positioned such that viewers in the viewing locations 642 may perceive a film and/or holographic content presented from the LF display 720. In FIG. 7A the LF display system is an embodiment of LF display system 500. Further, the LF display modules in the array 720 are an embodiment of the LF display modules 512 within a LF display assembly 510. The LF display system may include deflection optics as described in FIG. 6.

FIG. 7B illustrates perspective view of the cinema 700 of FIG. 7A with holographic content 722 presented from the LF display 720. In this example, the cinema 700 is showing the film "Jungle Book II: Shere Khan's Revenge" using the LF display 720. As such, the holographic content 722 includes jungle scenes projected by the LF display 720 in front of, and to the sides of, the viewers at viewing locations 642 in the cinema 700. Showing holographic video from multiple display surfaces that surrounds the viewers results in a more immersive experience than displaying the video from a single surface in front of the viewers. In this case, the distributor of the film has provided the holographic content 722 to present from the LF display 720 when the cinema 700 shows the film. That is, the jungle scenes are provided by the distributor of the film, stored in a data store (e.g., data store 522), accessed by the LF display system, and, subsequently, presented by LF display 720 on the walls of the cinema 700. In another example, the film distributor sends the holographic content via a commercial network (e.g., network 552) as vectorized data which is agnostic to the geometry of the receiving cinema locations. The LF display system 500 of the cinema 700 decodes the vectorized data and generates the holographic content for the particular geometry and resolution of the LF display 720 of the cinema.

FIG. 8 illustrates a perspective view of a cinema 800 including a LF display system presenting holographic content, in accordance with one or more embodiments. The front wall 810, a sidewall 812, and the floor 814 of the cinema 800 are illustrated, although the cinema also includes another side wall, a ceiling, and a rear wall. The front wall 810 and side walls (e.g., side wall 812) of the cinema 800 are lined with an array of LF display modules. The array of LF display modules form an aggregate surface of an LF display 820. Additionally, some or all of the ceiling (not shown), some or all of the floor 814, or both, may also be lined with the LF display 820. The cinema 800 includes a number of viewing locations 642 arranged in rows and positioned such that viewers in the viewing locations 642 may perceive holographic content presented from the LF display 820. In FIG. 8 the LF display system is an embodiment of LF display system 500. Further, the LF display modules in the array 820 are an embodiment of the LF display modules 512 of the LF display assembly 510.

FIG. 8 illustrates the cinema 800 with holographic content 822 presented from the LF display 820. In this example, the classic film "Invasion of the AA Aliens!" is being projected from the LF display 820 on the front wall such that viewers in the viewing locations 642 can view the film. The LF display 820 also presents holographic content 822 in the holographic object volume above the viewing locations 642. Here, the array 820 presents holographic content 822 including a number of flying saucers floating dauntingly through the holographic object volume, which is not shown, but extends in front of and behind every LF display surface. The LF display system 820 displays the ominous flying saucers because the film, as received from the distributor, includes a holographic content track for the film. The holographic content track includes holographic content for concurrent presentation in cinemas 800 showing the film with a LF display system. Thus, as the film is projected from the array 820, the LF display system accesses the corresponding holographic content 822 from a data store (e.g., data store 522) and presents the holographic content 822 in the holographic object volume, which extends both in front of and behind each surface of the LF display 820. The holographic content 822 of the flying saucers presented in the cinema 800 by the LF display system may enhance the viewers experience by increasing the feelings of "tension" and "impending doom."

Figure 9A:
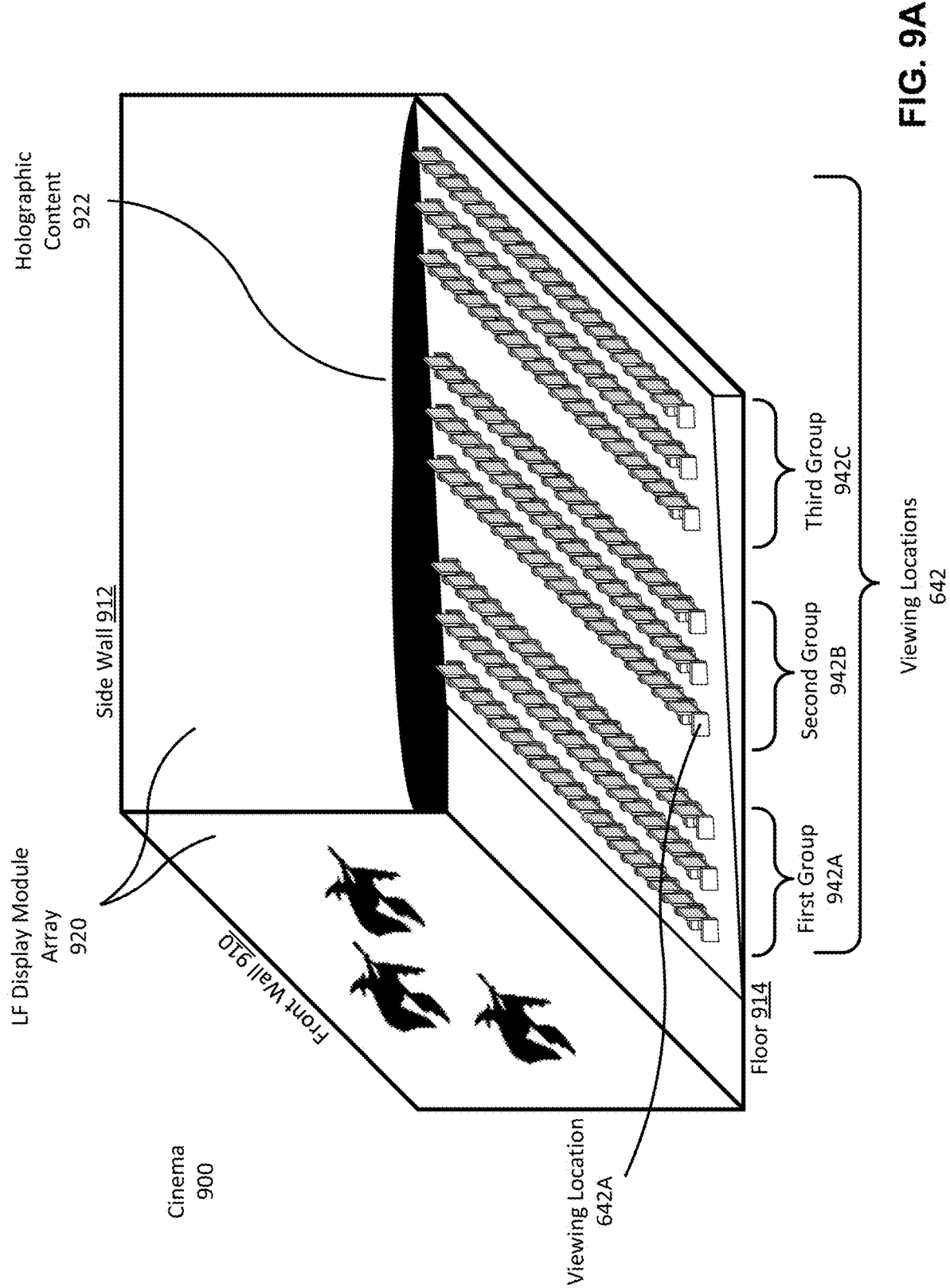
FIG. 9A is a perspective view of a cinema including a light field display system illustrating holographic content presented to a group of viewing locations in the front of the cinema, in accordance with one or more embodiments.
Figure 9B:
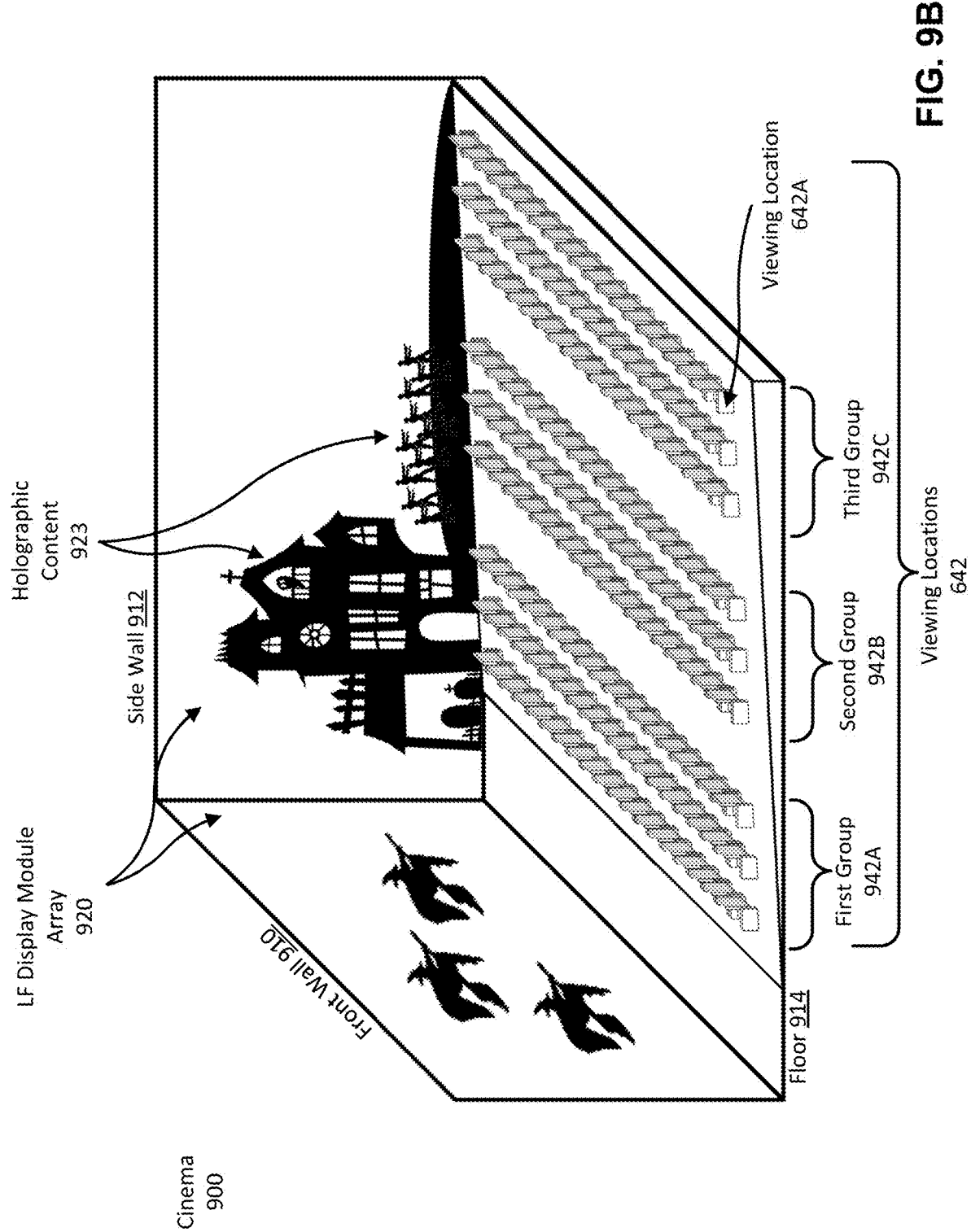
FIG. 9B is a perspective view of a cinema including a LF display system illustrating holographic content presented to a group of viewing locations in the rear of the cinema, in accordance with one or more embodiments.

FIGS. 9A and 9B illustrate a cinema 900 with a LF display system presenting holographic content to different groups of viewing locations, in accordance with one or more embodiments. FIG. 9A illustrates the holographic content presented to a first group of viewing locations in the front of the cinema and FIG. 9B illustrates the holographic content presented to a second group of viewing locations in the rear of the cinema. The front wall 910, a sidewall 912, and the floor 914 of the cinema 900 are illustrated, although the cinema 900 also includes another side wall, a ceiling, and a rear wall. The front wall 910 and side walls (e.g., side wall 912) of the cinema 900 are lined with an array of LF display modules. The array of LF display modules form an aggregate surface of an LF display 820. Additionally, some or all of the ceiling (not shown), some or all of the floor, or both, may also be lined with the LF display 920. The cinema 900 includes a number of viewing locations 642 arranged in rows and positioned such that viewers in the viewing locations 642 may perceive holographic content presented from the LF display 920. In this example, for convenience of description, the viewing locations are divided into a first group 942A, a second group 942B and a third group 942C. In FIGS. 9A and 9B the LF display system is an embodiment of LF display system 500. Further, the LF display modules in the array 920 are an embodiment of the LF display modules 512 of the LF display assembly 510.

The cinema 900 also includes several different viewing sub-volumes. Due to the complexity of their shape, the viewing sub-volumes are not illustrated. The viewing sub-volumes are sub-volumes of the viewing volume of the LF display 920. The viewing volume of the LF display 920, as illustrated, is approximately the size of the cinema 900. Therefore, the viewing sub-volumes are some portion of the volume of the cinema 900. For example, a viewing sub-volume may correspond to a volume surrounding the first group 942A of viewing locations, the second group of viewing locations 942B, the third group of viewing locations 942C, or some combination thereof.

In this example, the film "Basic Witches" is being projected by the LF display 920 such that viewers in the viewing locations 642 can view the film. Further, all viewers in the cinema 900 view the film projected from the LF display 920 from the front wall 910 of the cinema 900 in a similar manner. That is, holographic content presented from the front wall 910 of the cinema 900 may be seen by all of the viewers in the cinema 900. However, the LF display system in the cinema is configured such that that the holographic content projected from the LF display on the sidewall 912 is different for viewing sub-volumes surrounding groups 942A, 942B, and 942C. That is, the LF display system may present different holographic content to different viewing sub-volumes. To illustrate, for example, a viewer at a viewing location in the third group 942C at the back of the cinema 900 may perceive holographic content that a viewer at a viewing location in the first group 942A at the front of the cinema 900 may not. This principle may be true for any of the viewing sub-volumes in the cinema 900.

FIGS. 9A and 9B illustrate the LF display system of the cinema 900 presenting different holographic content to viewers in different viewing sub-volumes.

For example, in FIG. 9A, the LF display 920 on the side wall 912 presents holographic content 922 to the viewers in the first group 942A (e.g., a first particular viewing sub-volume) in the front of the cinema 900. Viewers at the viewing locations in the other groups (e.g., 942B and 942C) in the cinema 900 may not see the same holographic content 922. In this example, LF display 920 presents holographic content including a mournful field in the moors of Scotland to viewers in the first group 942A of viewing locations nearest the front wall 910 of the cinema 900.

In FIG. 9B, the LF display 920 presents holographic content 923 to the third group 942C of viewing locations (e.g., a second particular viewing sub-volume) in the rear of the cinema 900 such that viewers in the viewing locations in that group may perceive the holographic content 923 generated for viewers in the third group 942C. Viewers at the viewing locations in the other groups (e.g., 942A and 942B) in the cinema 900 do not see the same holographic content (e.g., they may instead view holographic content 922). In this example, LF display 920 presents holographic content 923 including a zombie horde exiting the haunted house situated in the mournful field in the moors of Scotland to the third group 942C in the rear of the cinema 900.

Presenting different holographic content (e.g., holographic content 922 or 923) to viewers in different viewing sub-volumes allows LF display system to augment the viewing experience for viewers in different viewing sub-volumes in a different manner. For example, the "atmosphere" in the theater may be different in each of the viewing sub-volumes. To illustrate, referencing FIGS. 9A-9B, the holographic content 923 presented to users in the third group 942C in the rear of the cinema 900 is more intense than the holographic content 922 presented to the viewers in the first group 942A at the front of the cinema 900. In this case, the cinema may have a different rating for the film for viewing locations in different viewing sub-volumes. For example, Basic Witches may be rated PG for viewers in the first group 942A and R for viewers in the third group 942C. In another example, audio content of the holographic content can be targeted to different viewing sub-volumes (e.g., using audio beam forming). Thus, for example, viewers in the first group 942A may hear audio holographic content without swear words while viewers in the third group 942C hear audio holographic content with swear words.

Notably, FIGS. 6-9 illustrate cinemas that are similarly structured. That is, each cinema has a similar configuration including a particular orientation of walls and floors and a particular positioning of viewing locations within the cinema. The configuration includes a front wall, two side walls, a rear wall, and a ceiling that are approximately orthogonal. The configuration also includes a sloped floor that rises at a gradient from the front wall to the rear wall. The LF display of the cinema is configured such that viewers, primarily, view holographic content presented from the front wall and/or sidewall(s). The configuration includes viewing locations arranged in three sections with each section including three rows of twenty seats. Each row of seats is positioned approximately parallel to the front wall. Each section of viewing locations corresponds to a viewing volume. The configuration of the cinema in FIGS. 6-9 are given as an example, but many other configurations are possible. For example, any of the configurations in FIG. 4C-4F may be applicable to a LF display system in a cinema.

Displaying Content to Viewers in a Cinema

Figure 10:
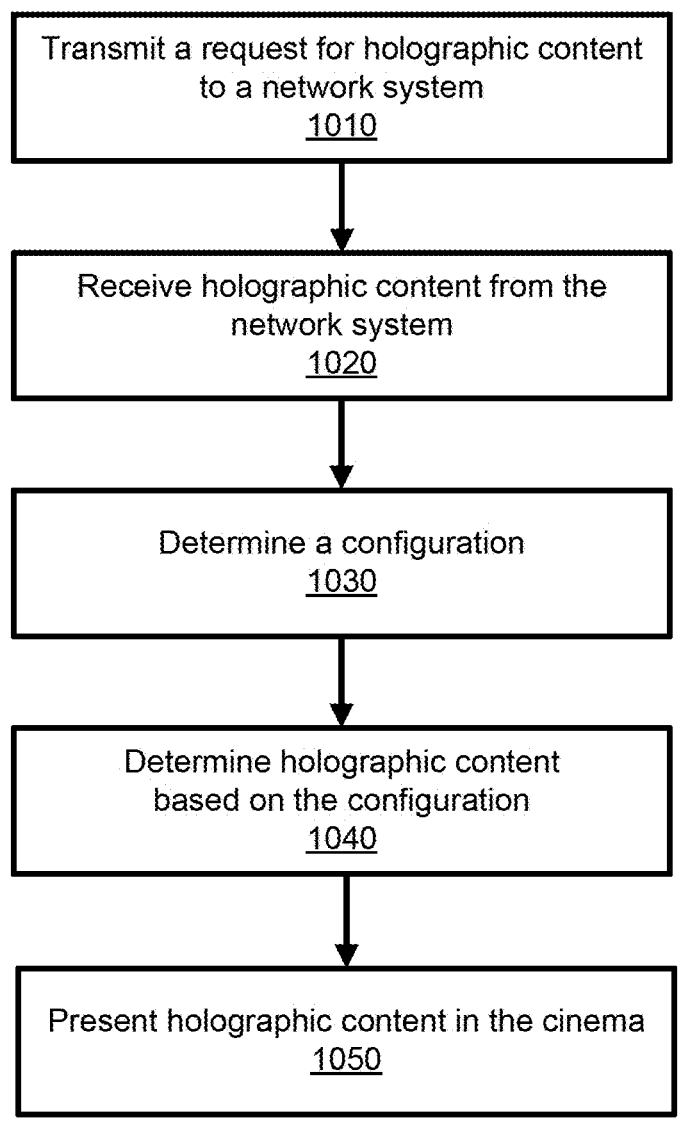
FIG. 10 is a flow diagram illustrating a method for displaying holographic content of a film in within a LF film distribution network, in accordance with one or more embodiments.

FIG. 10 is a flow diagram of a method 1000 for displaying holographic content to viewers in a cinema (e.g., cinema 700, cinema 800, or cinema 900) in the context of a LF film network (e.g., LF film network 550). The method 1000 may include additional or fewer steps and the steps may occur in a different order. Further, various steps, or combinations of steps, can be repeated any number of times during execution of the method.

A LF display system 500 transmits 1010 a request for holographic content (e.g., of a film and/or to augment a film) to a network system 556 via the network 552.

In an embodiment, a LF film generation system 554 creates holographic content and transmits the corresponding holographic content to the network system 556. In other embodiments, the network system 556 may access previously-generated holographic content from a data store. The network system 556 transmits the holographic content to the LF display system 500 such that it can be presented to viewers in a cinema.

The LF display system 500 receives 1020 the holographic content from the network system 556 via the network 552.

The LF display system 500 determines 1030 a configuration of the cinema and/or the LF display system. For example, the LF display system 500 may access a configuration file including a number of parameters describing the layout and/or configuration of the cinema, as well as the hardware configuration of the LF display system 500 included in the cinema. The parameters may include, for example, the LF display FOV, panel configuration, panel resolution, seating viewing sub-volumes, holographic object volume geometry, volumetric haptic projection parameters, layout of 2D panels to augment the film, other available sensory devices, any other details of the theater hardware, etc. To illustrate, the configuration file may include the locations, separations, and sizes of viewing locations in the cinema. As such, LF display system 500 may determine that viewing locations in the front three rows are in a first viewing sub-volume, viewing locations in the middle three rows are in a second viewing sub-volume, and viewing locations in the rear three rows are in a third viewing sub-volume. In various other embodiments, a LF display system 500 may determine any number and configuration of viewing sub-volumes at any location within a cinema. In some cases, the number and configuration of viewing sub-volumes may be based on the size of the cinema. For example, a small cinema may have fewer viewing locations in each viewing sub-volume as compared to a large cinema. In some examples, a viewing sub-volume may be the entire cinema or some other part of the cinema. In other examples, the content may be adjusted for different audience viewing volumes depending on the instructions from the content provider.

The LF display system 500 generates 1040 the holographic content (and other sensory content) for presenting on the LF display system, based on the hardware configuration of the LF display system within the cinema, and the particular layout and configuration of the cinema. In various examples the film may be displayed on a theater screen or from a LF display system in a cinema. Determining the holographic content for display can include appropriately rendering the holographic content for the cinema or viewing sub-volumes. For example, the LF display system 500 may augment the film for a particular viewing sub-volume by displaying interactive holographic content (e.g., that a viewer can touch) to that viewing sub-volume. Other viewing sub-volumes may not have interactive holographic content.

The LF display system 500 presents 1050 the holographic content in a holographic object volume in the cinema such that viewers at viewing locations in each viewing volume perceives the appropriate performance content. As an example, viewers in the particular viewing sub-volume perceive interactive holographic content while viewers in the other viewing sub-volumes do not. Additionally, the LF display system may present different audio content such that viewers in different viewing sub-volumes perceive different audio content.

The LF display system 500 may determine information about viewers in the viewing sub-volumes while the viewers view the film or holographic content at any time. For example, the tracking system may monitor the facial responses of viewers in the viewing sub-volumes and the viewer profiling module may access information regarding characteristics of the viewers in those viewing sub-volumes.

The LF display system may create (or modify) holographic content for presenting to the viewers based on the determined information. For example, the LF processing engine may create a fireworks show for display during the credits of the film based on the determined information about the viewers.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure. Notably, the foregoing description described presenting holographic content using a light field display assembly to viewers in a cinema. However, the principals, methods, and systems, described herein can be more broadly applied to presenting holographic content to an audience in various other locations. For example, the content may be displayed in an outdoor theater, on a billboard or advertisement, a wall of a building, etc.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A light field (LF) display system comprising:
a processing engine configured to generate holographic content for display by an aggregate light field display surface; and
a light field display assembly comprising a plurality of light field displays, each light field display comprising:
one or more energy devices configured to generate the holographic content received from the processing engine,
a light field display surface comprising a plurality of display surface locations, each surface location configured to project a portion of the holographic content, the plurality of display surface locations comprising:
a first subset of the display surface locations configured to project a first portion of the holographic content at a deflection angle relative to an original projection angle, and
wherein the plurality of light field displays are tiled such that their light field display surfaces form the aggregate light field display surface operable to project holographic content from all of the plurality of display surface locations of the light field display surfaces;
wherein, for a first light field display of the plurality of light field displays, the deflection angle is an average deflection of a plurality of projection paths of the portion of holographic content projected from the first subset of display surface locations of the first light field display.

2. A light field (LF) display system comprising:
a processing engine configured to generate holographic content for display by an aggregate light field display surface; and
a light field display assembly comprising a plurality of light field displays, each light field display comprising:
one or more energy devices configured to generate the holographic content received from the processing engine,
a light field display surface comprising a plurality of display surface locations, each surface location configured to project a portion of the holographic content, the plurality of display surface locations comprising:
a first subset of the display surface locations configured to project a first portion of the holographic content at a deflection angle relative to an original projection angle, and
wherein the plurality of light field displays are tiled such that their light field display surfaces form the aggregate light field display surface operable to project holographic content from all of the plurality of display surface locations of the light field display surfaces;
wherein, for a first light field display of the plurality of light field displays, the deflection angle is a median deflection of the projection paths of the portion of holographic content projected from the first subset of display surface locations of the first light field display.

3. A light field (LF) display system comprising:
a processing engine configured to generate holographic content for display by an aggregate light field display surface; and
a light field display assembly comprising a plurality of light field displays, each light field display comprising:
one or more energy devices configured to generate the holographic content received from the processing engine,
a light field display surface comprising a plurality of display surface locations, each surface location configured to project a portion of the holographic content, the plurality of display surface locations comprising:
a first subset of the display surface locations configured to project a first portion of the holographic content at a deflection angle relative to an original projection angle, and
wherein the plurality of light field displays are tiled such that their light field display surfaces form the aggregate light field display surface operable to project holographic content from all of the plurality of display surface locations of the light field display surfaces;
wherein, for a first light field display of the plurality of light field displays, the deflection angle is an angle of an optical axis of the plurality of projection paths of the first portion of holographic content relative to an optical axis of the remaining display surface locations projecting the remaining portion of holographic content.

4. The LF display system of claim 3, wherein the optical axis for each display surface location is an axis of symmetry of a plurality of projection paths of the holographic content projected from the display surface location.

5. A light field (LF) display system comprising:
a processing engine configured to generate holographic content for display by an aggregate light field display surface; and
a light field display assembly comprising a plurality of light field displays, each light field display comprising:
one or more energy devices configured to generate the holographic content received from the processing engine,
a light field display surface comprising a plurality of display surface locations, each surface location configured to project a portion of the holographic content, the plurality of display surface locations comprising:
a first subset of the display surface locations configured to project a first portion of the holographic content at a deflection angle relative to an original projection angle, and
wherein the plurality of light field displays are tiled such that their light field display surfaces form the aggregate light field display surface operable to project holographic content from all of the plurality of display surface locations of the light field display surfaces;
wherein, for a first light field display of the plurality of light field displays, the original projection angle is a measure of a plurality of projection paths of the holographic content projected from the plurality of display surface locations other than the first subset of display surface locations of the first light field display.

6. A light field (LF) display system comprising:

a processing engine configured to generate holographic content for display by an aggregate light field display surface; and a light field display assembly comprising a plurality of light field displays, each light field display comprising:
  one or more energy devices configured to generate the holographic content received from the processing engine,
  a light field display surface comprising a plurality of display surface locations, each surface location configured to project a portion of the holographic content, the plurality of display surface locations comprising:
    a first subset of the display surface locations configured to project a first portion of the holographic content at a deflection angle relative to an original projection angle, and
wherein the plurality of light field displays are tiled such that their light field display surfaces form the aggregate light field display surface operable to project holographic content from all of the plurality of display surface locations of the light field display surfaces;
wherein, for a first light field display of the plurality of light field displays, the original projection angle is an angle of the optical axis of the display surface locations other than the first subset of the display surface locations of the first light field display.

7. A light field (LF) display system comprising:
a processing engine configured to generate holographic content for display by an aggregate light field display surface; and
a light field display assembly comprising a plurality of light field displays, each light field display comprising:
  one or more energy devices configured to generate the holographic content received from the processing engine,
  a light field display surface comprising a plurality of display surface locations, each surface location configured to project a portion of the holographic content, the plurality of display surface locations comprising:
    a first subset of the display surface locations configured to project a first portion of the holographic content at a deflection angle relative to an original projection angle, and
wherein the plurality of light field displays are tiled such that their light field display surfaces form the aggregate light field display surface operable to project holographic content from all of the plurality of display surface locations of the light field display surfaces;
wherein, for a first light field display of the plurality of light field displays, the deflection angle is based on a position of the first subset of display surface locations on the first light field display assembly of the plurality of light field displays.

8. A light field (LF) display system comprising:
a processing engine configured to generate holographic content for display by an aggregate light field display surface; and
a light field display assembly comprising a plurality of light field displays, each light field display comprising:
  one or more energy devices configured to generate the holographic content received from the processing engine,
  a light field display surface comprising a plurality of display surface locations, each surface location configured to project a portion of the holographic content, the plurality of display surface locations comprising:
    a first subset of the display surface locations configured to project a first portion of the holographic content at a deflection angle relative to an original projection angle, and
wherein the plurality of light field displays are tiled such that their light field display surfaces form the aggregate light field display surface operable to project holographic content from all of the plurality of display surface locations of the light field display surfaces;
wherein, for a first light field display of the plurality of light field displays:
the first portion of holographic content is projected at the deflection angle relative to the original projection angle such that the first portion of holographic content is viewable from a first field of view, and
holographic content projected at the original projection angle is viewable from a second field of view.

9. The LF display system of claim 8, wherein the first field of view and the second field of view are substantially dissimilar.

10. A light field (LF) display system comprising:
a processing engine configured to generate holographic content for display by an aggregate light field display surface; and
a light field display assembly comprising a plurality of light field displays, each light field display comprising:
  one or more energy devices configured to generate the holographic content received from the processing engine,
  a light field display surface comprising a plurality of display surface locations, each surface location configured to project a portion of the holographic content, the plurality of display surface locations comprising:
    a first subset of the display surface locations configured to project a first portion of the holographic content at a deflection angle relative to an original projection angle, and
wherein the plurality of light field displays are tiled such that their light field display surfaces form the aggregate light field display surface operable to project holographic content from all of the plurality of display surface locations of the light field display surfaces;
wherein projecting the first portion of holographic content at the deflection angle results in at least one of:
a modified field-of-view greater than a planar field of view, the modified field of view including holographic content projected with the deflection angle, and the planar field of view including holographic content projected only at the original projection angle;
at least a viewing volume in the audience which is projected nearer the aggregate light field display surface than a planar threshold separation, the planar threshold separation describing the distance between a nearest viewing volume and the aggregate display surface when the holographic content is projected at the original projection angle; and
at least one holographic object which is projected nearer the viewing volume than a planar threshold proximity, the planar threshold proximity describing the distance between a nearest projected holographic object and the aggregate display surface when the holographic content is projected at the original projection angle.

11. A light field (LF) display system comprising:
a processing engine configured to generate holographic content for display by an aggregate light field display surface; and
a light field display assembly comprising a plurality of light field displays, each light field display comprising:
one or more energy devices configured to generate the holographic content received from the processing engine,
a light field display surface comprising a plurality of display surface locations, each surface location configured to project a portion of the holographic content, the plurality of display surface locations comprising:
a first subset of the display surface locations configured to project a first portion of the holographic content at a deflection angle relative to an original projection angle, and
wherein the plurality of light field displays are tiled such that their light field display surfaces form the aggregate light field display surface operable to project holographic content from all of the plurality of display surface locations of the light field display surfaces;
wherein, for a first light field display of the plurality of light field displays, the plurality of display surface locations further comprises:
a second subset of the display surface locations configured to project a second portion of the holographic content at an additional deflection angle relative to the original projection angle.

12. The LF display system of claim 11, wherein
the second subset of display surface locations projects the second portion of holographic content such that it is viewable from a second field of view, and the first portion of holographic content is viewable from a first field of view.

13. The LF display system of claim 12, wherein the first field of view and the second field of view are dissimilar.

14. The LF display system of claim 12, wherein the first field of view and the second field of view are substantially similar.

15. The LF display system of claim 11, wherein the deflection angle is dissimilar from the additional deflection angle.

16. A light field (LF) display system comprising:
a processing engine configured to generate holographic content for display by an aggregate light field display surface; and
a light field display assembly comprising a plurality of light field displays, each light field display comprising:
one or more energy devices configured to generate the holographic content received from the processing engine,
a light field display surface comprising a plurality of display surface locations, each surface location configured to project a portion of the holographic content, the plurality of display surface locations comprising:
a first subset of the display surface locations configured to project a first portion of the holographic content at a deflection angle relative to an original projection angle, and
wherein the plurality of light field displays are tiled such that their light field display surfaces form the aggregate light field display surface operable to project holographic content from all of the plurality of display surface locations of the light field display surfaces;
wherein the LF display system further comprises:
an optical system including a plurality of optical elements, the plurality of optical elements configured to, for the first portion of the holographic content deflected at the deflection angle for a first light field display of the plurality of light field displays, redirect the first portion of holographic content projecting at the original projection angle to the deflection angle.

17. The LF display system of claim 16, wherein the optical system is coupled to the first light field display of the plurality of light field display in the LF display system.

18. A light field (LF) display system comprising:
a processing engine configured to generate holographic content for display by an aggregate light field display surface; and
a light field display assembly comprising a plurality of light field displays, each light field display comprising:
one or more energy devices configured to generate the holographic content received from the processing engine,
a light field display surface comprising a plurality of display surface locations, each surface location configured to project a portion of the holographic content, the plurality of display surface locations comprising:
a first subset of the display surface locations configured to project a first portion of the holographic content at a deflection angle relative to an original projection angle, and
wherein the plurality of light field displays are tiled such that their light field display surfaces form the aggregate light field display surface operable to project holographic content from all of the plurality of display surface locations of the light field display surfaces;
wherein, the deflection angle for a first light field display of the plurality of light field displays is based on a position of the first subset of display surface locations on the first light field display in the aggregate light field display surface.

* * * * *